US008972233B2

(12) United States Patent
Bohacs et al.

(10) Patent No.: US 8,972,233 B2
(45) Date of Patent: Mar. 3, 2015

(54) RETRODICTING SOURCE-ROCK QUALITY AND PALEOENVIRONMENTAL CONDITIONS

(75) Inventors: Kevin M. Bohacs, Houston, TX (US); Brian P. West, Houston, TX (US); George J. Grabowski, The Woodlands, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 1012 days.

(21) Appl. No.: 12/601,895

(22) PCT Filed: Jun. 9, 2008

(86) PCT No.: PCT/US2008/007185
§ 371 (c)(1),
(2), (4) Date: Nov. 25, 2009

(87) PCT Pub. No.: WO2009/011737
PCT Pub. Date: Jan. 22, 2009

(65) Prior Publication Data
US 2010/0175886 A1    Jul. 15, 2010

Related U.S. Application Data

(60) Provisional application No. 60/959,654, filed on Jul. 16, 2007.

(51) Int. Cl.
*G06G 7/48* (2006.01)
*G06G 7/56* (2006.01)
(Continued)

(52) U.S. Cl.
CPC  *G01V 99/00* (2013.01); *G06G 7/57* (2013.01); *G06G 7/50* (2013.01); *G01V 99/005* (2013.01);
(Continued)

(58) Field of Classification Search
CPC ............. G06F 2217/16; G01V 99/05; G01V 2210/665; G06G 7/57; G06G 7/50; G06T 2210/24
USPC .................................................. 703/10, 5, 9
See application file for complete search history.

(56) References Cited

U.S. PATENT DOCUMENTS 5,444,619 A    8/1995  Hoskins et al.
5,835,883 A    11/1998 Neff et al.
(Continued)

FOREIGN PATENT DOCUMENTS

GB        2344172 A       5/2005
WO    WO 2006/016942     2/2006 .............. B01V 9/00
(Continued)

OTHER PUBLICATIONS

Dr. Christopher R. Schotese, "GANDOLPH, Paleogeographic and Paleoclimatic controls on hydrocarbon source rock deposition", 2005, pp. 1-10.*
(Continued)

*Primary Examiner* — Omar Fernandez Rivas
*Assistant Examiner* — Angel Calle
(74) *Attorney, Agent, or Firm* — ExxonMobil Upstream Research Company Law Dept.

(57) ABSTRACT

A method for retrodicting source-rock quality and/or paleoenvironmental conditions are disclosed. A first set of system variables associated with source-rock quality is selected (705). A second set of system variables directly or indirectly causally related to the first set of variables is also selected (710). Data for variables selected to be known quantities are estimated or obtained (720). A network with nodes including both sets of variables is formed (715). The network has directional links connecting interdependent nodes (715). The directional links preferably honor known causality relations. A Bayesian network algorithm is used with the data to solve the network for the unknown variables and their associated uncertainties (725). The variables selected to be unknowns can be input nodes (paleoenvironmental conditions), intermediate nodes, output nodes (source rock quality), or any combination thereof.

21 Claims, 15 Drawing Sheets

(51) Int. Cl.
*G06G 7/50* (2006.01)
*G01V 99/00* (2009.01)
*G06G 7/57* (2006.01)
*G06N 7/00* (2006.01)

(52) U.S. Cl.
CPC ............ *G06N 7/005* (2013.01); *G06T 2210/24* (2013.01); *G06F 2217/16* (2013.01); *G01V 2210/665* (2013.01)
USPC ...................................... 703/10; 703/5; 703/9

(56) References Cited

U.S. PATENT DOCUMENTS

| | | | |
|---|---|---|---|
| 6,408,290 B1 | 6/2002 | Thiesson et al. | 706/52 |
| 6,654,692 B1 | 11/2003 | Neff | |
| 6,721,661 B2 | 4/2004 | Anstey et al. | |
| 7,091,719 B2 | 8/2006 | Freedman | |
| 7,153,688 B2 | 12/2006 | Mango | |
| 7,162,463 B1 | 1/2007 | Wentland et al. | 706/48 |
| 7,309,983 B2 | 12/2007 | Freedman | |
| 7,433,851 B2 | 10/2008 | Mirowski | |
| 8,061,444 B2 * | 11/2011 | Mullins et al. | 175/50 |
| 2002/0013687 A1 * | 1/2002 | Ortoleva | 703/10 |
| 2002/0120429 A1 | 8/2002 | Ortoleva | 703/2 |
| 2006/0184488 A1 | 8/2006 | Wentland | 706/45 |
| 2007/0226158 A1 * | 9/2007 | Woronow et al. | 706/17 |
| 2009/0012746 A1 * | 1/2009 | Kairo et al. | 702/181 |

FOREIGN PATENT DOCUMENTS

| | | | | |
|---|---|---|---|---|
| WO | WO 2006016942 A1 * | 2/2006 | | G01V 9/00 |
| WO | WO 2006/112864 | 10/2006 | | A01H 1/00 |
| WO | WO 2006112864 A2 * | 10/2006 | | |
| WO | WO 2009/011737 | 1/2009 | | G06F 19/00 |

OTHER PUBLICATIONS

Clifford C. Walters, NPL, "The origin of petroleum, chapter 2", Dec. 2006, pp. 79-97.*
Leslie, Magoon, NPL, "Petroleum Systems, Chapters 3", May 15, 2000, pp. 3-1 to 3-34.*
Rivas, T, et al (2007), "Application of Bayesian networks to the evaluation of roofing slate quality", *Engineering Geology 94* (2007) 27-37.
Ruffo, P. et al. (2006), "Hydrocarbon risk evaluation through uncertainty and sensitivity analyses techniques", *Reliability Engineering and system Safety 91* (2006) 1155-1162.
*European Search Report*, Dec. 17, 2007, RS115779, US95965407.
*International Search Report*, Sep. 16, 2008, PCT/US2008/07185.

* cited by examiner

RETRODICTING SOURCE-ROCK QUALITY AND PALEOENVIRONMENTAL CONDITIONS

This application claims the benefit of U.S. Provisional Application No. 60/959,654 filed on Jul. 16, 2007.

FIELD OF THE INVENTION

This invention relates generally to the field of geophysical or geological prospecting and resource development. Specifically, the invention is a method for evaluating the potential of an area to contain hydrocarbon source rocks.

BACKGROUND OF THE INVENTION

In the oil and gas industry, experts evaluate the potential of an area to contain hydrocarbon source rocks in order to identify, assess, and exploit potential hydrocarbon resources. Source-rock presence is a critical aspect of all hydrocarbon systems, and a robust and systematic means to evaluate source-rock presence and quality is a key business need. Neither source-rock presence nor quality nor the processes that control source-rock presence and quality can be detected or measured directly from the remote sensing data (e.g., seismic data, well logs) typically available in exploration settings.

Hydrocarbon source rocks are defined as fine-grained rocks that in their natural state can generate commercial quantities of hydrocarbons. This definition convolves the original organic-matter content of a rock upon deposition with its subsequent burial and heating of the organic matter to yield hydrocarbons that can migrate into an oil or gas field. In this document, the more generic term organic-matter-rich rock ("ORR") is used to denote the original state of the rock upon deposition and early burial (up to about 3 m deep) and its original content of organic matter. Source-rock quality refers to the amount and type of hydrocarbon that an ORR can generate assuming subsequent burial and heating; it is typically characterized by total organic carbon content ("TOC", defined as the weight percentage of organic carbon per gram of rock sample), hydrogen content (typically measured as hydrogen index, "HI," defined as "an indication of the remaining hydrocarbon-generative capacity of a kerogen, as measured by Rock-Eval pyrolysis; hydrogen index is expressed as mg of hydrocarbon per g of TOC" (Waples, *Geochemistry in Petroleum Exploration*, IHRDC, Boston (1985)), and lithology, and classified according to source-rock rating categories and potential for generating hydrocarbons (oil, condensate, and/or gas). Thus the term ORR refers to prehistoric time and the term source rock refers to the present day character.

Geoscientists are commonly interested in source-rock quality, which is commonly related to the likelihood of generating commercial quantities of hydrocarbons from a source rock. Early examples of simplistic or empirical source-rock predictions relied almost exclusively upon estimates of primary organic-matter production driven by nutrients supplied by ocean upwelling through direct comparisons with organic-matter production rates in modern oceans (As discussed below in the description of the present invention, this is not appropriate for estimates of organic-matter production throughout geological time intervals because of significant changes through evolution in the types of organisms that produce organic matter.) Examples claiming this approach include: Parrish, "Upwelling and petroleum source beds, with reference to Paleozoic," *American Association of Petroleum Geologists Bulletin* 66, 750-774 (1982); Barron, "Numerical climate modeling, a frontier in petroleum source rock prediction: results based on Cretaceous simulations," *American Association of Petroleum Geologists Bulletin* 69, 448-459 (1985); and Kruis and Barron, "Climate model prediction of paleoproductivity and potential source-rock distribution," *American Association of Petroleum Studies in Geology* 30, 195-216 (1990). Another system that claimed to provide source-rock predictions concentrated on preservation of organic matter in deep-marine environments and relied almost exclusively on estimating dissolved oxygen content at the sediment-water interface using semi-quantitative and deterministic algorithms: Westrich et al., 1993, "SORCER; a comprehensive paleogeographic, stratigraphic, and geochemical model for marine source rock prediction," *American Association of Petroleum Geologists* 1993 annual convention, *Annual Meeting Abstracts*, American Association of Petroleum Geologists and Society of Economic Paleontologists and Mineralogists, p. 199 (1993). Yet another approach, the "Source Rock Prediction System" was an early computer system that claimed to provide source-rock prediction—"a simple, microcomputer-implemented, knowledge—based system designed around a decision tree structure," it relied exclusively on deterministic combinations of a subset of controlling factors to provide a single deterministic estimate of source-rock quality at a single point: Fowler, "Knowledge-Based System for Source Rock Prediction" (meeting abstract), *American Association of Petroleum Geologists Bulletin*, 71, 557 (1987).

Currently existing predictive schemes for source-rock quality emphasize primary organic-matter production or organic-matter preservation to the practical exclusion of other processes, and use only empirical relations, or rely on a single linear/serial pathway from primary production of organic-matter to accumulation of potential source rocks to estimate source-rock quality. Following are summaries of three models in the recent published literature: OF-Mod, Merlin, and SourceRocker.

OF-Mod

"OF-Mod" is software for organic facies/source rock forward modeling developed by SINTEF, www.sintef.no/content/page1__1074.aspx. The abbreviation SINTEF means The Foundation for Scientific and Industrial Research at the Norwegian Institute of Technology ("NTH"). The SINTEF Group is the largest independent research organization in Scandinavia. SINTEF cooperates closely with the Norwegian University of Science and Technology ("NTNU") and the University of Oslo.

OF-Mod claims to simulate processes that affect the deposition and preservation of organic matter in a sedimentary basin and the interactions among these processes. It claims to consider marine and terrigenous organic matter supply, upwelling, oxygen minimum zones, degradation in the water column, and burial efficiency. Models in OF-Mod are based on only two input parameters: 1) present-day geometry (thickness and area) of postulated source rock interval or intervals (i.e., multiple geological ages) and 2) reconstructions of palaeo-bathymetry for the top and base of each postulated source-rock interval. Marine organic-matter production is modeled primarily as a function of the distance from shore. Additional areas of higher marine organic-matter production (e.g. upwelling zones) must be explicitly defined by the user as a function of distance offshore. Preservation conditions during deposition and burial are modeled as a function of water depth when oxic water conditions are assumed. Two optional scenarios to represent oxygen deficiency in the water column can be chosen arbitrarily by the user: 1) an oxygenminimum-zone scenario that is modeled as a function of surface-water productivity or 2) an anoxic-bottom-water scenario. Each scenario includes only a single pathway from input parameters to predicted source-rock potential. The model requires calibration with analytical data from well samples to provide a quantitative prediction of source-rock potential and type away from well control. OF-Mod uses the same set of processes and functions for all geological ages. OF-Mod publications include: Mann et al., "OF-Mod: an organic facies modelling tool," *Applications of numerical modelling in stratigraphy and basin analysis*, Mountney and Burgess, Editors, London, UK, page 31 (2000); Knies and Mann, "Depositional environment and source rock potential of Miocene strata from the central Fram Strait: introduction of a new computing tool for simulating organic facies variations," *Marine and Petroleum Geology*, 19(7), 811-828 (2002); and Mann and Zweigel, "Modelling source rock distribution and quality variations: The OF-Mod approach," *Analogue and Numerical Forward Modelling of Sedimentary Systems; from Understanding to Prediction*, de Boer et al. ed's., Special Publication number 39 of the International Association of Sedimentologists (2007).

Merlin

"Merlin" claims to be a deterministic linear/serial workflow for forward source-rock prediction within a Geographic Information System (GIS) framework developed by Fugro-Robertson (Harris et al., 2006, "Palaeogeographic and Geological Constraints on Coupled Ocean-Atmosphere Palaeo-Earth Systems Modeling for Source Rock Prediction in Frontier Basins," (2006) http://aapg.confex.com/aapg/2006int/techprogram/A106819.htm). A palaeo-environment map, gridded in GIS, provides the topographic and bathymetric boundary conditions for coupled ocean-atmosphere general circulation models and a barotropic model to simulate palaeotides. A series of "predictive masks" (also known as spatial filters) are combined in series (Boolean intersections) in a single pathway to derive a map of predicted source-rock potential in terms of total organic carbon content (TOC). The predicted source potential at each point is represented by a single deterministic value of TOC. The "predictive masks" are applied uniformly across all latitudes and are intended to account for the processes responsible for nutrient supply, organic productivity, and accumulation of organic-matter rich sediments together with dilutional processes responsible for the elimination of source rock potential. The current implementation of this process includes only six "masks": 1) upwelling productivity, 2) storm productivity, 3) decay during settling, 4) tidal bed stress, 5) consumption by growth of benthic carbonates, and 6) organic-matter focusing (or "tidal sweep"). An area must pass all six "predictive masks" (i.e., satisfy all six spatial filters) to have significant source potential.

Thus, in general terms,

Merlin Source-Rock Quality={Organic Matter Production}*{Fraction lost by Decay, Consumption, & Non-accumulation}*{Fraction concentrated or dispersed by gravity flow} or in concise algebraic form,

Merlin Source-Rock Quality=$\{X+Y\}*A*B*C*D$ where: X=amount of primary production of organic carbon due to Number of months of upwelling (in $mgC/m^2/year$),
Y=amount of primary production of organic carbon due to Atmospheric Eddy Kinetic Energy (in $mgC/m^2/year$),
A=fraction decrease due to Decay with settling through water column ($\leq 1$)
B=fraction decrease due to Non-accumulation through tidal bed shear stress ($\leq 1$),
C=fraction decrease due to Carbonate consumption ($\leq 1$)
D=fraction increase or decrease due to Gravity resedimentation.

a form which is, by inspection and mathematical definition, a linear function. For all geological ages the "predictive masks" are the same and are combined in the same linear/serial deterministic manner with the same relative weighting factors.

SourceRocker

The Gandolph proposal by Geomark and Scotese (2005, p. 10) claims that

"SourceRocker is a heuristic computer program that incorporates predictive criteria relating geography, climate, and ocean state to hydrocarbon source bed deposition. ["*Heuristic: providing aid or direction in the solution of a problem but otherwise unjustified or incapable of justification . . . " Webster's Third New International Dictionary of the English Language* (1986)] Using pattern-recognition and expert system-type rules, SourceRocker incorporates information about primary productivity, the likelihood of organic carbon preservation, and other important environmental effects, such as dilution due to [clastic] sediment influx, to estimate the type, quality, and quantity of potential source rocks on an basin/sub-basin scale."

Its goal is to derive a single set of empirical "rules" for forward source prediction from ocean and atmospheric conditions that apply to all geological ages using pattern-recognition and expert system-type rules. It postulates no physical, chemical, or biological processes or controls a priori. This approach uses a paleogeographic map for a particular geological time as input to an ocean-atmosphere model (FOAM: Fast Ocean-Atmosphere Model—developed as a joint effort between scientists in the Mathematics and Computer Science Division of Argonne National Laboratory and the Space Science and Engineering Center at the University of Wisconsin-Madison; http://www-unix.mcs.anl.gov/foam/index.html). In parallel, it classifies a series of oil and rock samples from that particular geological time into geochemical families. It then compares the outputs of the ocean-atmosphere model to only the geochemical families of the oils to establish empirical correlations that enable the prediction of source rocks away from sample control on that particular paleogeographic map. (Paleogeography is used almost exclusively as a boundary condition for the ocean-atmosphere forward modeling.) Thus it attempts to predict the type, quality, and quantity of potential source rocks from direct correlations of oil families to ocean-atmosphere conditions. These conditions are "hand-crafted" for each time interval to fit the paleo-reconstructions. (This description is derived from promotional materials written by GeoMark Ltd and Scotese in 2005: [www.geomarkresearch.com/res/Other%20Proposals/Gandolph%20Proposal%20(short)%2011.pdf]; it is unclear from the published literature what progress has been made on constructing a working program.)

In contrast to these linear, deterministic approaches, it has been shown recently that ORRs accumulate through a wide range of combinations of the competing processes of primary organic matter production, organic matter destruction, and organic matter dilution (Bohacs et al., "Production, Destruction, Dilution, and Accommodation—the many paths to source-rock development.," in Harris, N. (editor) *The deposition of organic carbon-rich sediments: Mechanisms, Models and Consequences*, SEPM Special Publication 82, p. 61-101 (2005)). These authors report on case studies of three source-rock units wherein each unit is interpreted in terms of varying combinations of all the proximate factors of production, destruction, and dilution. The paper concentrates on demonstrating that hydrocarbon source rocks accumulate in a range of depositional settings. What is needed is a source rock predictive method that takes such nonlinear complexity into consideration. The present invention satisfies this need.

SUMMARY OF THE INVENTION

In one embodiment, the present invention is a method for relating measurable or observable characteristics of hydrocarbon source rocks to estimated conditions at their time of formation, comprising:

(a) selecting a first set of variables representing measurable or observable characteristics describing presence, quantity or quality of hydrocarbon source rocks;

(b) selecting a second set of variables representing historical quantities that influence source rock formation, comprising at least one variable representing each of the following three types of influencing factors: (i) geologic age factors; (ii) paleogeographic factors; and (iii) paleoenvironmental conditions, said second set of variables being classifiable according to whether they affect rate of production, destruction or dilution of organic matter that forms hydrocarbon source rocks;

(c) forming a network with nodes comprising both sets of variables, said network having directional links connecting causally-related nodes;

(d) selecting one or more variables from either set to be unknowns and assigning at least one data value to each of the other variables along with associated probabilities of having the respective data values, said values and probabilities being estimated from measurement, observation or inferred indirectly; and (e) solving the network including the data and probability distributions for at least one of the one or more unknown variables using a Bayesian Network algorithm programmed on a computer and conservation of organic matter expressible as:

organic matter enrichment=production−(destruction+dilution)

and downloading or saving the results to computer memory or storage.

In preferred embodiments of the inventive method, one variable/node represents geologic age, so that changes of other variables with time during the source rock evolution may be treated. Also in preferred embodiments, the network is nonlinear as evidenced by alternative pathways (connecting links) or by nonlinear probability distributions of discrete states assigned to variables, or both. The network solutions may be used, among other uses, to develop a model for predicting hydrocarbon source rock occurrence, character or distribution.

BRIEF DESCRIPTION OF THE DRAWINGS

The present invention and its advantages will be better understood by referring to the following detailed description and the attached drawings in which.

Figure 1:
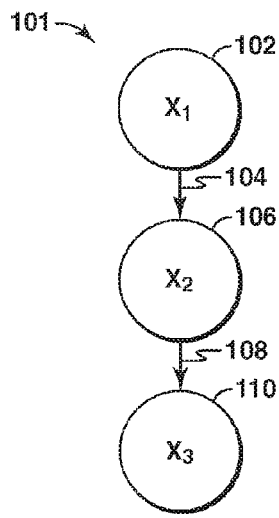
FIG. 1 is a representation of a simple Bayesian network.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications, and equivalents that may be included within the scope of the invention, as defined by the appended claims.

DETAILED DESCRIPTION OF PREFERRED EMBODIMENTS

Retrodict is defined as: "to infer a past state of affairs from present observational data" (Webster's Third New International Dictionary, 1986). Retrodiction is the act of making such an inference. A common synonym in the geological and hydrocarbon exploration literature is 'prediction', used in the sense of making an inference about a state of affairs before observational data is obtained, rather than before the occurrence of that particular state of affairs.

Organic-matter-rich rocks ("ORRs") are accumulations of organic matter of photosynthetic-protist and bacterial origin that survived the processes of deposition and burial to be incorporated in rock strata. The deposition of ORRs and their ultimate source-rock quality are controlled by three sets of competing proximate controls: production, destruction, and dilution. The processes that control ORR accumulation cannot be detected or measured directly from the remote sensing data (e.g., seismic, well logs) typically available in exploration settings. The present invention retrodicts the occurrence, character/quality, and distribution of ORRs by reconstructing the natural conditions that promoted the growth, preservation, and concentration of organic matter and combining those conditions in a multi-path, non-linear, probabilistic manner. This may be contrasted with previous approaches which attempt to simulate some of the actual processes through analytical or numerical modeling and combine them in a single, linear/serial path/manner for a deterministic solution.

The organic matter in potential source rocks is dominantly microscopic plants ('algae' and other unicellular photosynthetic organisms such as cyanobacteria or blue-green algae) that grow in the shallow portion of the water column in the ocean or lakes where sunlight penetrates to a depth of about 100 meters (the photic zone). When the organism dies, its organic matter sinks towards the bottom of the water body. Most of the organic matter is consumed by other organisms (e.g. bacteria, zooplankton, metazoans) or degraded by oxidants in the water column or shortly after it settles on the bottom. If water conditions are inimical to these consuming organisms or have minimal oxidant content, some of the organic matter can be preserved to be buried into the sediment column and eventually become part of the rock strata. The organic matter must also be preserved in sufficient concentration to serve as an effective source rock, so it must not be mixed with too much non-hydrogen rich material and therefore diluted. Hence, the three sets of competing processes that must operate in appropriate combinations to accumulate an ORR are: Primary Organic Production (or growth), Organic Matter Destruction (or its inverse, Preservation), and Organic Matter Dilution (or its inverse, Concentration) (hereinafter called Production, Destruction, and Dilution). These proximate controls are, in turn, influenced by many intermediate processes.

Geoscientists are commonly interested in source-rock quality, which is commonly related to the likelihood of generating commercial quantities of hydrocarbons from a source rock. A reliable and accurate system for estimating present-day source-rock properties needs to incorporate all aspects of the pre-historic depositional environment (physical, chemical, biological mechanisms and processes), because excluding consideration of the many intermediate mechanisms, processes, and factors that will be called contingencies herein, that govern ORR accumulation limits the scope, applicability, and accuracy of simplified or empirical source-rock-prediction systems such as those discussed in the following paragraphs.

The present invention uses many aspects of the depositional environment of ORRs as input to make quantitative reconstructions of the key proximate controls of Production, Destruction, and Dilution and of the consequent source-rock quality. These inputs include key states of the ocean and atmosphere as well as geological contingencies such as geological age, paleogeographic setting, and climate mode. The present inventive method convolves these inputs through a series of intermediate mechanisms that incorporate all major aspects of the natural system. A Bayesian network is used to model this system, honoring various non-linear interactions among natural controls, mechanisms, processes and contingencies, and tracking their probabilistic relations. The output parameters quantifying source-rock quality comprise both ORR Character and Source Rock Potential attributes.

Bayesian networks are a tool for modeling systems. A description of Bayesian networks is provided in U.S. Pat. No. 6,408,290, to Thiesson, et al., which description is repeated in the next four paragraphs, with omissions indicated by ellipses. FIG. 1 from that patent is reproduced herein as FIG. 1.

"A Bayesian network is a representation of the probabilistic relations among distinctions about the world. Each distinction, sometimes called a variable, can take on one of a mutually exclusive and exhaustive set of possible states. A Bayesian network is expressed as an acyclic-directed graph where the variables correspond to nodes and the relations between the nodes correspond to arcs. FIG. 1 depicts an exemplary Bayesian network 101. In FIG. 1 there are three variables, $X_1$, $X_2$, and $X_3$, which are represented by nodes 102, 106 and 110, respectively. This Bayesian network contains two arcs 104 and 108. Associated with each variable in a Bayesian network is a set of probability distributions. Using conditional probability notation, the set of probability distributions for a variable can be denoted by $p(x_i|\Pi_i, \zeta)$ where "p" refers to the probability distribution, where "$\Pi_i$" denotes the parents of variable $X_i$ and where "$\zeta$" denotes the knowledge of the expert. The Greek letter "$\zeta$" indicates that the Bayesian network reflects the knowledge of an expert in a given field. Thus, this expression reads as follows: the probability distribution for variable $X_i$ given the parents of $X_i$ and the knowledge of the expert. For example, $X_i$ is the parent of $X_2$. The probability distributions specify the strength of the relations between variables. For instance, if $X_1$ has two states (true and false), then associated with $X_1$ is a single probability distribution $p(x_1|\zeta)$ and associated with $X_2$ are two probability distributions $p(x_i|x_1=t, \zeta)$ and $p(x_i|x_1=f, \zeta)$ . . .

"The arcs in a Bayesian network convey dependence between nodes. When there is an arc between two nodes, the probability distribution of the first node depends upon the value of the second node when the direction of the arc points from the second node to the first node. For example, node 106 depends upon node 102. Therefore, nodes 102 and 106 are said to be conditionally dependent. Missing arcs in a Bayesian network convey conditional independencies. For example, node 102 and node 110 are conditionally independent given node 106. However, two variables indirectly connected through intermediate variables are conditionally dependent given lack of knowledge of the values ("states") of the intermediate variables. Therefore, if the value for node 106 is known, node 102 and node 110 are conditionally dependent.

"In other words, sets of variables X and Y are said to be conditionally independent, given a set of variables Z, if the probability distribution for X given Z does not depend on Y. If Z is empty, however, X and Y are said to be "independent" as opposed to conditionally independent. If X and Y are not conditionally independent, given Z, then X and Y are said to be conditionally dependent given Z.

"The variables used for each node may be of different types. Specifically, variables may be of two types: discrete or continuous. A discrete variable is a variable that has a finite or countable number of states, whereas a continuous variable is a variable that has an uncountably infinite number of states . . . . An example of a discrete variable is a Boolean variable. Such a variable can assume only one of two states: "true" or "false." An example of a continuous variable is a variable that may assume any real value between −1 and 1. Discrete variables have an associated probability distribution. Continuous variables, however, have an associated probability density function ("density"). Where an event is a set of possible outcomes, the density p(x) for a variable "x" and events "a" and "b" is defined as:

$$p(x) = \lim_{a \to b}\left[\frac{p(a \le x \le b)}{|(a-b)|}\right] \quad 5$$

where p(a≤x≤b) is the probability that x lies between a and b." [End of quoted passage from U.S. Pat. No. 6,408,290]

Bayesian networks also make use of Bayes Rule, which states:

$$p(B|A) = \frac{p(B) \cdot p(A|B)}{p(A)} \quad 15$$

for two variables, where p(B|A) is sometimes called an a posteriori probability. Similar equations have been derived for more than two variables. The set of all variables associated with a system is known as the domain.

U.S. Pat. No. 6,408,290 is not an example of application of Bayesian networks to petroleum exploration or development; however, examples of that do exist. See PCT patent application publications WO 2006/016942 and WO 2006/112864.

Building a network with the nodes related by Bayes Rule allows changes in the value of variables associated with a particular node to propagate through the probabilities in the network. For example, referring to FIG. 1, assuming that $X_1$, $X_2$ and $X_3$ have probability distributions and that each of the probability distributions is related by Bayes Rule to those to which it is connected by arcs, then a change to the probability distribution of $X_2$ may cause a change in the probability distribution of $X_1$ (through induction) and $X_3$ (through deduction). Those mechanisms also establish a full joint probability of all domain variables (i.e. $X_1$, $X_2$, $X_3$) while allowing the data associated with each variable to be uncertain.

The present invention takes aspects, preferably many aspects, of the depositional environment of ORRs as qualitative or quantitative input to make quantitative reconstructions of and assign confidence probabilities to the key proximate controls of Production, Destruction, and Dilution and of the consequent source-rock quality using multiple pathways. These inputs may include key states of the ocean and atmosphere as well as geological contingencies such as geological age, paleogeographic restriction, basin phase, and climate mode; the invention does not require sample calibration. Models that do not include contingencies lack an essential component of how natural systems operate and misrepresent those natural systems by implicitly assuming that all processes are available to operate equally in time and space. Processes are natural mechanisms (physical, chemical, biological) that generally operate in the same manner throughout geological time. Contingencies are aspects of a particular geological setting or age that influence or condition the relative importance of those processes and how a natural system responds to changes. Contingencies may be thought of as the initial and boundary conditions for a system of mathematical equations which represent the processes. In other words, contingencies are the previously established aspects of the geological setting that influence the existence and relative importance of processes that operate in that geological setting. Important geological contingencies include:

a. Geological Age—influences the system through the biological evolution of primary producers, land plants, consumer organisms, etc. as well as evolution state of the sun (see item (d) below). All primary producers of organic matter were not present throughout all of geological history; green algae and photosynthetic bacteria were present early in geological history, but such significant primary producers as land plants, coccolithophorids, and Bacillariophyceae (diatoms) evolved later in geological history. This makes direct calibrations of primary production to processes in the modern ocean inaccurate for the full range of geological time. The present invention explicitly incorporates this important contingency through several nodes: for example, the Geological Age root node (310 in the example embodiment of FIG. 3) has 14 possible states (in the example embodiments of FIGS. 4-6) and its widespread effect is reflected by the fact that this node feeds (in FIG. 3) into 44 intermediate nodes (8 directly and 36 indirectly); the Geological Age, Plants node (315) has 5 possible states to account for the main stages of land plant evolution. Incorporating geological age into the model as a contingency is not the same as making estimates of paleoenvironmental conditions for prehistoric time because geological age as a contingency speaks to the existence of a certain process at a given prehistoric (geological) time whereas estimates of paleoenviromental conditions at a given prehistoric time speak to the magnitude of that process. For example, the amount of rainfall governs the growth of land plants in the current world and for much of geological history, but land plants did not evolve until about 420 Million years ago, so no matter how much it rained before that time, there could be no growth of land plants. This is important for retrodicting source-rock quality because the existence and distribution of land plants governs the amount of rainfall that runs off continents into the oceans and carries land-plant organic matter and clastic sediments. In addition, the type and growth rates of the primary organic producers (planktonic algae) changed significantly through geological time, so an estimate of the influence of nutrient supply on growth of plankton (organic matter) made based on present-day oceanographic observations (as used in the published models discussed previously) would not be applicable before the prehistoric time at which all of the present-day planktonic algae evolved. Thus models based on this assumption would be inaccurate.

b. Paleogeographic Restriction—is an inherited boundary condition that is not determined by processes at a particular time. It affects destruction processes mainly. It is incorporated in the FIG. 3 embodiment of the present invention as a root node that influences 39 nodes (3 directly and 36 indirectly).

c. Sea level—the height, variation, and frequency of change of sea level changes throughout geological time. It is incorporated in the FIG. 3 embodiment of the present invention as a root node that influences 12 nodes (2 directly and 10 indirectly).

d. Solar insolation—the amount of energy generated by the sun has increased significantly over the last 4.5 billion years. This energy is a key input to the primary production of organic matter. It is incorporated in the FIG. 3 embodiment of the present invention as an intermediate node that influences 7 nodes.

e. Basin Phase (i.e., rift, sag, drift, convergence)—another inherited boundary condition that affects the destruction process through its influence on water depth, accommodation, and distribution of clastic sediment supply.

As far as the inventors know, none of the published predictive schemes include geological contingencies as part of their predictive method.

The present inventive method convolves the inputs of processes and contingencies through a series of intermediate mechanisms that incorporate all the major aspects of the natural system, faithfully representing fundamental physical, chemical, and biological processes, multiple paths of interactions of processes, and key contingencies. (Convolution is a mathematical operation well known to geoscientists and others by which elements such as the "inputs" described above are combined in a manner that honors systems interrelations and conditional dependencies to yield an estimate of system behavior or of a desired output.) The system can also take observations or measurements of source-rock quality to make quantitative reconstructions of many aspects of the depositional environment, including geological age, paleoenvironmental conditions, and paleogeography. Thus the invention can function in a forward mode, such as retrodicting source-rock quality, or an inverse mode, such as retrodicting paleoenvironmental conditions. It can also function in a hybrid forward-inverse mode to be explained later.

In one embodiment, the invention is a method for retrodicting source-rock quality (source-rock quality includes ORR Character and Source-Rock Potential for generating hydrocarbons). The method includes selecting a first set of system variables associated with source-rock quality and a second set of system variables directly or indirectly causally related to the first set of variables. The method further includes obtaining or estimating data for each variable in the second set and forming a network with nodes including both sets of variables. The network has directional links connecting interdependent nodes. The directional links honor known causality relations. The method includes using a Bayesian network algorithm with the data to solve the network for the first set of variables and their associated uncertainties.

Features of the inventive method may include one or more of the following. The method may include appraising the quality of selected data and including the quality appraisals in the network and in the application of the Bayesian network algorithm. The system may have a behavior and the method may further include selecting the first set of variables and the second set of variables so that together they are sufficiently complete to account for the behavior of the system.

Forming the network may include forming a third set of variables called intermediate nodes interposed between at least some of the nodes representing the first set of system variables and at least some of the nodes representing the second set of system variables. Selecting the first set of system variables may include selecting one or more system variables associated with source-rock quality. Selecting the second set of system variables may include selecting one or more system variables associated with geological age effects, selecting one or more system variables associated with paleogeography, and selecting one or more system variables associated with paleoenvironmental conditions (that include paleoclimatic and paleo-oceanographic conditions).

In another embodiment, the invention is a method for retrodicting source-rock quality wherein the method includes establishing one or more root nodes in a Bayesian network, establishing one or more leaf nodes in the Bayesian network, coupling the root nodes to the leaf nodes to better enable the Bayesian network to retrodict source-rock quality. Root nodes have only outputs or child nodes, i.e. no nodes that provide input upstream of the root node; thus root nodes have no parent nodes. Leaf nodes have only inputs or parent nodes; there are no nodes downstream of a leaf node. Intermediate nodes have both parent and child nodes; that is, input (upstream) and output (downstream) nodes. Features of this embodiment of the invention may include one or more of the following. Establishing the one or more root nodes may include establishing one or more root nodes for geological age effects, establishing one or more root nodes for paleogeography, and establishing one or more root nodes for paleoenvironmental conditions. Establishing one or more root nodes for geological age effects may include establishing a root node for geological age. Establishing one or more root nodes for paleogeography may include establishing a root node for paleolatitude, establishing a root node for geographic restriction, establishing a root node for oceanality, and establishing a root node for water depth. Establishing one or more root nodes for paleoenvironmental conditions may include establishing one or more root nodes for annual average and range of upwelling, establishing a root node for surface currents, establishing one or more root nodes for annual average and seasonality of wetness, and establishing one or more root nodes for annual minimum and seasonality of sea-surface temperature.

Establishing one or more leaf nodes may include establishing one or more leaf nodes for source rock quality. Establishing one or more leaf nodes for source-rock quality may include establishing a leaf node for retrodicted lithology, establishing a leaf node for total organic carbon content, establishing a leaf node for hydrogen index, establishing a leaf node for source-rock rating, and establishing a leaf node for oil/gas total potential.

The present inventive method may further include establishing one or more intermediate nodes. Coupling the root nodes to the leaf nodes to enable the Bayesian network to retrodict source-rock quality may include coupling at least some of the one or more root nodes to at least some of the one or more leaf nodes through the one or more intermediate nodes. Coupling the root nodes to the leaf nodes to enable the Bayesian network to retrodict source-rock quality may include coupling the root nodes to the leaf nodes in causal relations that honor observations of natural systems. Coupling the root nodes to the leaf nodes to enable the Bayesian network to retrodict source-rock quality may include defining for each root node one or more outputs that connect to other nodes that the root node causes, and defining for each intermediate node: one or more inputs that connect to the other nodes that cause the intermediate node, one or more outputs that connect to other nodes that the intermediate node causes, and defining for each leaf node one or more inputs that connect to other nodes that cause the leaf node.

Establishing the one or more root nodes may include creating a probability table for each root node, each probability table having one or more predefined states, and each predefined state having associated with it a probability that the root node is in that state. Creating the probability table for each root node may include completing the probability table based on quantitative observations of a natural system associated with the root node. The method may further include modifying the probability table based on quantitative observations of the natural system associated with the root node. The method may further include completing the probability table based on forward modeling of a natural system associated with the root node or other estimates of the state of the natural system.

Establishing the one or more leaf nodes may include creating a probability table for each leaf node, each probability table having a respective one or more predefined states, and each predefined state having associated with it a probability that the leaf node is in that state. Each leaf node may have a predefined number of inputs and creating the probability table for each leaf node may include creating a probability table having the respective predefined number of input dimensions. Creating the probability table for each leaf node may include completing the probability table with data reflecting quantitative observations of a natural system associated with the leaf node. The method may further include modifying the probability table based on quantitative observations of the natural system associated with the leaf node.

Establishing the one or more intermediate nodes may include creating a probability table for each intermediate node, each probability table having a respective one or more predefined states, and each predefined state having associated with it a probability that the intermediate node is in that state. Each intermediate node may have a predefined number of inputs and creating the probability table for each intermediate node may include creating a probability table having the respective predefined number of input dimensions. Creating the probability table for each intermediate node may include completing the probability table with data reflecting quantitative observations of a natural system associated with the intermediate node. The method may further include modifying the probability table based on quantitative observations of the natural system associated with the intermediate node. The method may further include completing the probability table based on forward modeling of a natural system associated with the intermediate node or other estimates of the state of the natural system.

In some embodiments, the invention features a Bayesian network including one or more root nodes and one or more leaf nodes. The root nodes are coupled to the leaf nodes to enable the Bayesian network to retrodict source-rock quality.

In some embodiments, the invention features a method for retrodicting source-rock quality, including organic-matter-rich rock character and source-rock potential, from geological age effects, paleogeography, and paleoenvironmental conditions using a Bayesian network, and retrodicting lithology, total organic carbon content, and hydrogen index from the retrodicted source-rock quality (this method termed the "forward mode").

In some embodiments, the invention features a method for retrodicting geological age, paleogeography, and paleoenvironmental conditions from observed or measured source-rock quality including lithology, total organic carbon content, and hydrogen index using a Bayesian network constructed as above (this method termed the "inverse mode").

In some embodiments, the invention features a method for retrodicting a time history of changes in geological age, paleogeography, and paleoenvironmental conditions from a vertical series of observed or measured source-rock quality including lithology, total organic carbon content, and hydrogen index using a Bayesian network constructed as above (an application of the "inverse mode" to a vertical sequence of observations or measurements of source-rock quality, each observation or measurement in the vertical sequence representing the state of the system at a different geological time according the Principle of Superposition).

In some embodiments, the invention features a method for retrodicting paleoenvironmental conditions from observed or measured source-rock quality including lithology, total organic carbon content, and hydrogen index along with geological age and paleogeography using a Bayesian network constructed as above (this method is termed the "hybrid forward-inverse mode").

In some embodiments, the invention features a method for retrodicting a time history of changes in paleoenvironmental conditions from a vertical series of observed or measured source-rock quality including lithology, total organic carbon content, and hydrogen index along with geological age and paleogeography using a Bayesian network constructed as above (an application of the "hybrid forward-inverse mode" to a vertical sequence of observations or measurements of source-rock quality).

In some embodiments, the invention features a method for retrodicting combinations of paleoenvironmental conditions (including production, destruction, and dilution conditions) represented by the set of intermediate nodes that are useful in themselves in hydrocarbon exploration: paleogeographic reconstructions, paleoclimatology, and paleo-oceanography from specified states of at least some of the root and leaf nodes, including observed or measured source-rock quality including lithology, total organic carbon content, and hydrogen index along with geological age and paleogeography using a Bayesian network constructed as above. These features may be used in all modes of application of the invention: forward, inverse, and hybrid forward-inverse.

The present inventive method will next be described in more detail.

Organic matter is the essential component of a hydrocarbon source rock. The accumulation of organic matter in depositional environments is controlled by complex, nonlinear interactions of three main variables: rates of production, destruction, and dilution. Significant accumulations of organic-matter-rich sediments can arise from many combinations of these factors. Although a few organic accumulations are dominated by one or another of these factors, most organic-matter-rich sediments and rocks record a variety of optimized interactions of all variables. Conceptually, organic-matter enrichment can be expressed as an overall simple relation that is quite complex in detail because of the functional (f) interdependencies of the variables: Organic-matter enrichment=Production (Destruction+Dilution), where: Production=f(Insolation, Nutrient supply, Water supply, and Geological Age), Destruction=((Consumer population growth as a f(Production & Geological Age))+f(Consumer access (=f(Eh, pH, rheology)))+f(Oxidant exposure time)+f(Sedimentation rate<burial-efficiency threshold), and Dilution=f(Clastic sedimentation rate>burial-efficiency threshold)+f(Production of biogenic silica, carbonate, or charcoal, as a function of primary Production and Geological Age); cf. the previously cited 2005 article by Bohacs, et al. Significant enrichment of organic matter occurs where organic-matter production is maximized, destruction is minimized, and dilution by clastic or biogenic material is minimized. Hence there are various depositional settings in which source rocks accumulate. The existence of multiple possible pathways to organic matter enrichment requires a modeling system that incorporates the complex nonlinear interactions of the controls and highlights propitious combinations. Understanding the quality of a source rock can lead to a greater understanding of hydrocarbon generation and of its variation in space.

Figure 2:
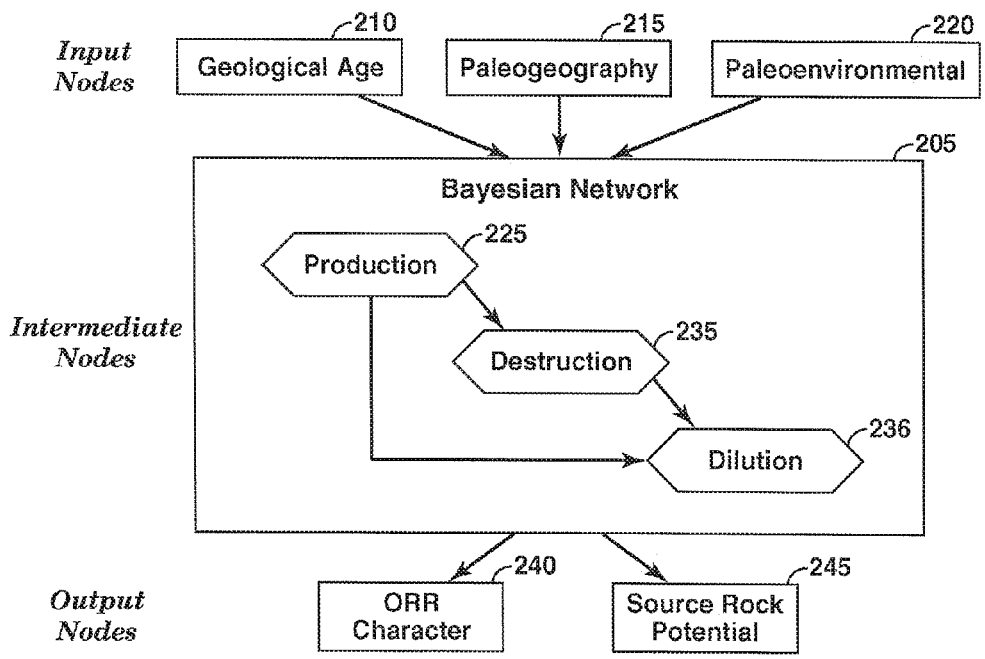
FIG. 2 is an overview block diagram of a system for retrodicting source-rock quality using a Bayesian network.
Figure 3:
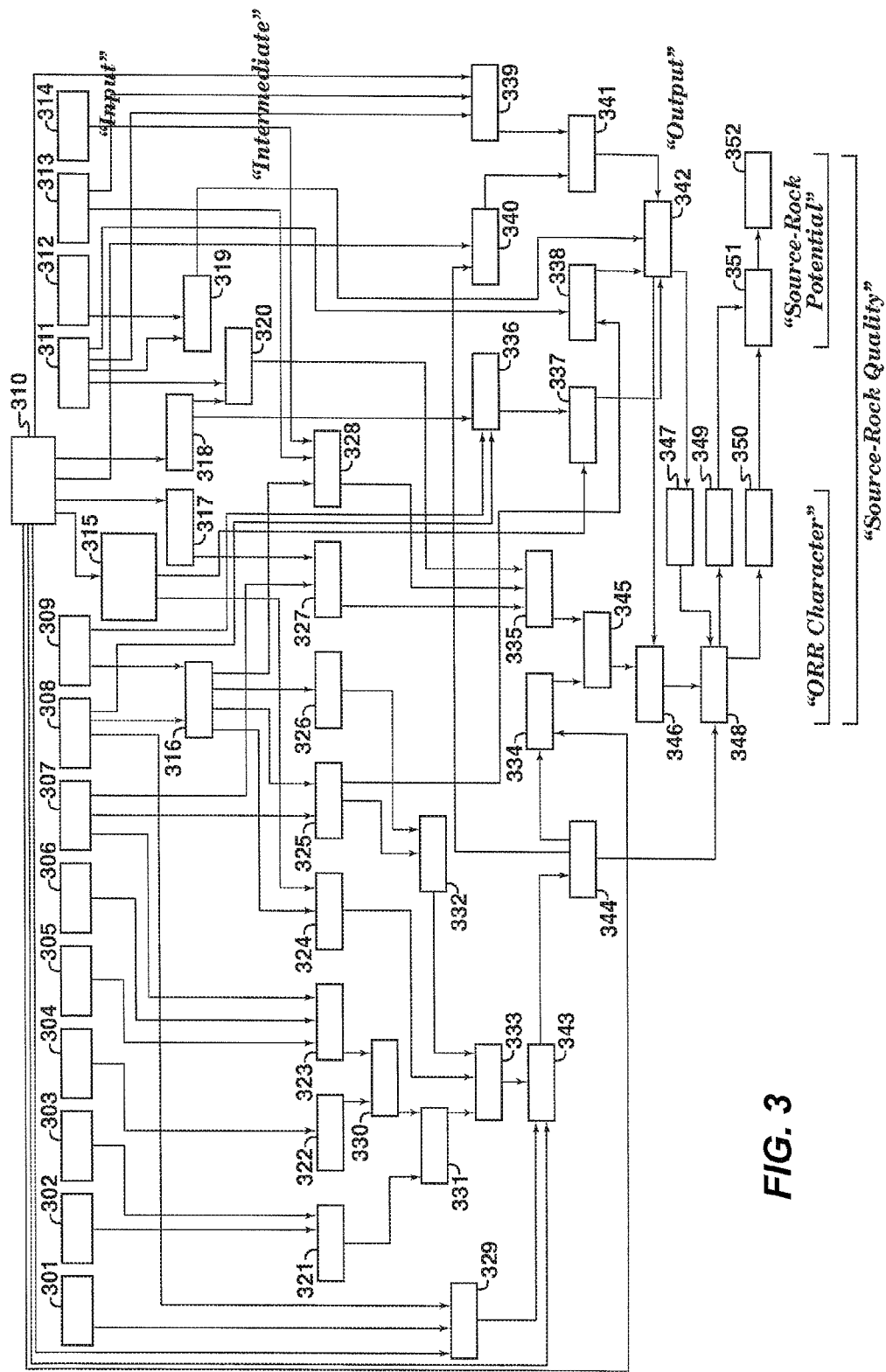
FIG. 3 is a detailed representation of a Bayesian network to retrodict source-rock quality.

An example system to retrodict source-rock quality according to the present invention uses a Bayesian network to model the relation among (1) depositional setting (e.g. geological age, paleogeography, and paleoenvironmental conditions), (2) organic matter producing, destroying, and diluting processes, and (3) the resulting source-rock quality (e.g. total organic carbon content (TOC), hydrogen index (HI), source rock rating, and oil/gas total potential). This use is termed "forward mode." FIGS. 2 and 3 show examples of such Bayesian networks.

TABLE 1

Modeling modes of the present invention

| Mode | Input | Output | see FIG.: |
|---|---|---|---|
| 1) Forward: | Paleogeography<br>Geological Age<br>Paleoclimate<br>Paleo-oceanography | Expected Lithology<br>TOC<br>HI<br>Source Rock Rating<br>Oil v. Gas Potential | 4 |
| 2) Inverse: | Lithology<br>TOC<br>HI | Paleoclimate<br>Paleo-oceanography<br>Paleogeography<br>Geological Age | 5 |
| 3) Hybrid Forward-Inverse: | Lithology<br>TOC<br>HI<br>Geological Age<br>Paleogeography | Paleoclimate<br>Paleo-oceanography | 6 |

This system can also be used in an "inverse mode" or "hybrid forward-inverse mode". Thus, the three modes are: 1) Forward, from geological age, paleogeography, and paleoenvironmental conditions to source-rock quality at some later time, usually present day; 2) Inverse, from source-rock quality to geological age, paleogeography, and paleoenvironmental conditions; and 3) Hybrid forward-inverse, typically from geological age, paleogeography, and source-rock quality to paleoenvironmental conditions. (See Table 1.)

The forward mode is valuable for, among other things: 1. Actual retrodiction of source-rock quality, 2. Confidence probability of prediction, 3. Ability to track influence of each control, 4. Assessing key influences on ultimate prediction and using them to design further investigation and determine value of additional information to prediction, 5. Interacting with the Bayesian network to determine fully the critical pathways to each prediction, follow derivation at each step and evaluate the effects of each input datum. This enables rigorous and comprehensive scenario testing—the full range of "what if" situations—to evaluate the impact of alternative scenarios on ultimate prediction. The interaction provides quantitative assessment of the value of information within the overall prediction and supplies a rational basis for design of data-acquisition strategy to inform business decisions (to buy or trade for data).

The inverse mode is valuable for, among other things: 1) Quantitative reconstructions of paleoenvironmental conditions provide insights for source rock prediction away from areas with sample control as well as for prediction of other hydrocarbon play elements. For example, one can use sample data to reconstruction paleoenvironmental conditions in one geographical area and then switch to the forward mode and use the paleoenvironmental conditions thus determined as input to predict source-rock quality in an adjacent, geologically related area from which no samples are available. 2) Comparison against other paleoenvironmental indicators or calibration data (climate sensitive lithologies such as coal, coral reefs, etc.). Where others might use paleoclimate indicators to reconstruct paleoenvironmental conditions to predict source-rock quality, this embodiment of the present invention uses source-rock quality to reconstruct paleoenvironmental conditions and then can test those modeled paleoenvironmental conditions against an independent, unrelated set of paleoclimate indicators. This yields a more robust and potentially more accurate methodology. 3) Useful reconstructions of paleoenvironmental conditions from source-rock quality data that is relatively widely available—thus yielding reconstructions that are of use to people studying climate change, paleo-oceanography, and paleoclimate. 4) Tracking changes in paleoenvironmental conditions (especially changes in paleoclimate) over periods of geological time by running the present inventive method in the inverse mode on a vertical sequence of source-rock quality data (TOC, HI, lithology).

Hybrid forward-inverse mode is valuable for: 1) Providing stronger paleoenvironmental reconstructions through supplying more constraints—from both some key inputs and ultimate output. Inputs typically are of three classes: a) Geological Age—well known if samples are available, b) Paleogeography—relatively well constrained with commonly available geological information, and c) Paleoenvironmental conditions—relatively poorly constrained in most situations, and derived from forward models or sparsely calibrated inverse models. 2) The hybrid forward-inverse mode can use input classes (a) and (b) in combination with output observations from sample data to reconstruct paleoenvironmental conditions which then can be applied as in the forward mode for adjacent geologically related areas.

Such a system, whose main elements are shown in FIG. 2, can be used to retrodict source-rock quality. An example Bayesian network 205 has the following inputs: geological age 210, paleogeography 215, and paleoenvironmental conditions 220. The outputs of the Bayesian network are retrodictions of source-rock quality that include organic-matter-rich rock character 240 (lithology, total organic carbon content (TOC), hydrogen index (HI)), and source-rock potential 245 (source rock rating and oil/gas total potential). The words "input" and "output" might be considered arbitrarily assigned in this context. The probability distributions of any node in this network can be adjusted. The adjustments may cause changes in the probability distributions associated with other nodes in the network depending on the interconnections between the nodes. Thus, for example, a user of the Bayesian network may adjust the probability distribution of the source-rock rating 245, producing an effect on the paleoenvironmental conditions "input" 220. A more common use of the Bayesian network, however, is to adjust the inputs 210, 215, and 220 and to monitor the effect on the outputs 240 and 245, although other modes of use are detailed in Table 1 and following paragraphs.

As mentioned above, a Bayesian network is a formal statistical structure for reasoning in the face of uncertainty, which propagates evidence (or information), along with its associated uncertainties, through cause-and-effect, correlation or functional relations to yield the probabilities of various inferences that could be drawn from the evidence. A Bayesian network can be formulated by a variety of computational techniques, including use of commercial software (for example, Netica (Norsys Software Corporation), MSBNx (Microsoft Corporation), or BNet™ (Charles River Analytics, Inc)), or by programming directly in standard computing languages.

The Bayesian network 205 makes detailed, quantitative retrodictions about lithology, total organic carbon content (TOC), hydrogen index (HI), source rock rating, and oil/gas total potential simultaneously. Source-rock quality, a combination of ORR character and source-rock potential, may be parameterized as lithology, total organic carbon content (TOC), hydrogen index (HI), source rock rating, and oil/gas total potential, as indicated at the bottom of FIG. 3. As indicated in FIG. 2, Bayesian networks of the present invention are built around the basic conservation principle, Organic-matter enrichment=Production−(Destruction+Dilution).

Although FIG. 2 does not show individual nodes (see FIG. 3), the nodes of the Bayesian network 205 are intermediate nodes between the input nodes 210, 215, and 220 and output nodes 240 and 245. Data or other observations can be specified for some intermediate nodes directly, as part of input.

The retrodictions about source-rock quality are detailed enough to use for making further retrodictions about hydrocarbon properties in reservoirs. The simultaneous retrodiction of all aspects of source-rock quality derives from the holistic, cause-and-effect geoscience thinking that underlies the model. Using the Bayesian network 205:

a. All potential states of the system are explicitly defined, through the choice of specific nodes, and defined states of each node;

b. All relations within the system are defined and quantified, by the specific structure of the network and probability tables;

c. The model can be updated from data, via modification of the probability tables;

d. Inferences can be drawn inductively (child nodes from parent nodes) or deductively (parent nodes from child nodes).

An expanded representation of the Bayesian network 205, in fact an expanded version of all of FIG. 2, is shown in detail in FIG. 3. It includes nodes, and arcs between the nodes. The network includes three varieties of nodes: (a) a root node, which has only arcs with the direction of the arc being away from the root node (i.e. the root node is only a parent node and not a child node), (b) leaf nodes, which have only arcs with the direction of the arc being toward the nodes (i.e., leaf nodes are only child nodes and not parent nodes), and (c) intermediate nodes, which have arcs directed toward the nodes and arcs directed away from the nodes (i.e., intermediate nodes are both parent nodes and child nodes). Table 2 lists all nodes in FIG. 3 with each node's reference number and type.

TABLE 2

Reference table of Node Number, Name, and Type

| Node Number | Node Name | Node Type |
|---|---|---|
| 301 | Paleolatitude_Sunlight | Root |
| 302 | UpwellingAnnAvg | Root |
| 303 | UpwellingSeasonality | Root |
| 304 | Paleolatitude_Storms | Root |
| 305 | Paleolatitude_Mixing | Root |
| 306 | Surface Currents | Root |
| 307 | Restriction | Root |
| 308 | Wetness, Annual Average | Root |
| 309 | Wetness, Seasonality | Root |
| 310 | Geological Age | Root |
| 311 | Water Depth | Root |
| 312 | Oceanality | Root |
| 313 | SeaSurfaceTemperature, Annual Minimum | Root |
| 314 | SeaSurfaceTemperature, Seasonality | Root |
| 315 | Geologic Age_Plants | Intermediate |
| 316 | Water Supply | Intermediate |
| 317 | Climate Mode | Intermediate |
| 318 | Eustatic Sea Level | Intermediate |
| 319 | Proximity to Land | Intermediate |
| 320 | Sea Level Effects | Intermediate |
| 321 | Upwelling | Intermediate |
| 322 | Cyclonic Mixing | Intermediate |
| 323 | Water Mass Mixing | Intermediate |
| 324 | Runoff | Intermediate |
| 325 | Evaporative Cross Flow | Intermediate |
| 326 | Aeolian Input | Intermediate |
| 327 | Deep Water Oxygenation | Intermediate |
| 328 | Water Column Stratification | Intermediate |
| 329 | Insolation | Intermediate |
| 330 | Mixing, Total | Intermediate |
| 331 | Nutrients, Circulation | Intermediate |

TABLE 2-continued

Reference table of Node Number, Name, and Type

| Node Number | Node Name | Node Type |
|---|---|---|
| 332 | Nutrients, Other | Intermediate |
| 333 | Nutrient Supply | Intermediate |
| 334 | Consumer Population | Intermediate |
| 335 | Oxidant Supply | Intermediate |
| 336 | Clastic Transport Rate | Intermediate |
| 337 | Clastic Supply Rate | Intermediate |
| 338 | Chemical Supply Rate | Intermediate |
| 339 | Biogenic Supply Rate-Benthic | Intermediate |
| 340 | Biogenic Supply Rate-Pelagic | Intermediate |
| 341 | Biogenic Supply Rate Total | Intermediate |
| 342 | Linear Sed Rate | Intermediate |
| 343 | Marine Organic Production | Intermediate |
| 344 | Organic Production | Intermediate |
| 345 | Destruction Processes | Intermediate |
| 346 | Organic Destruction | Intermediate |
| 347 | Dilution of OM | Intermediate |
| 348 | Retrodicted Lithology* | Intermediate |
| 349 | Total Organic C* | Intermediate |
| 350 | Hydrogen Index* | Intermediate |
| 351 | Source Rock RatingTOCHI* | Intermediate |
| 352 | Oil/Gas Total Potential | Leaf | cf. FIG. 3 for a picture of network structure.
*indicates nodes that are key outputs of the system and may be considered also as Leaf Nodes In one example system, each node in the Bayesian network 205 has associated with it one or more states. Each node also has associated with it a probability distribution, representing the probability of being in a particular state. The following sections, which disclose an example Bayesian network 205 in detail, are included at the end of this application before the claims and are a part of this application: (a) Description of Nodes; (b) Node States; and (c) Node Probability Distribution.

FIG. 3 illustrates a Bayesian network 205 for at least one embodiment of the present invention. The same relation between the root and leaf nodes could be achieved with a different set of intermediate nodes interconnected in a different manner. The system described by the Bayesian network 205 could also be described with different root, leaf, and intermediate nodes, greater or fewer in number. Thus, the Bayesian network of FIG. 3 and Table 2 is presented as a non-unique example of a network that is suitable for the present inventive method.

The details of the Bayesian network structure and conditional probabilities may be changed depending on modeling conditions and level of knowledge about the system being modeled. The model has the greatest retrodictive power when input probabilities are well constrained by sample data and the conditional probability states of the intermediate nodes are well conditioned with data.

Figures 4, 4A, 4B:
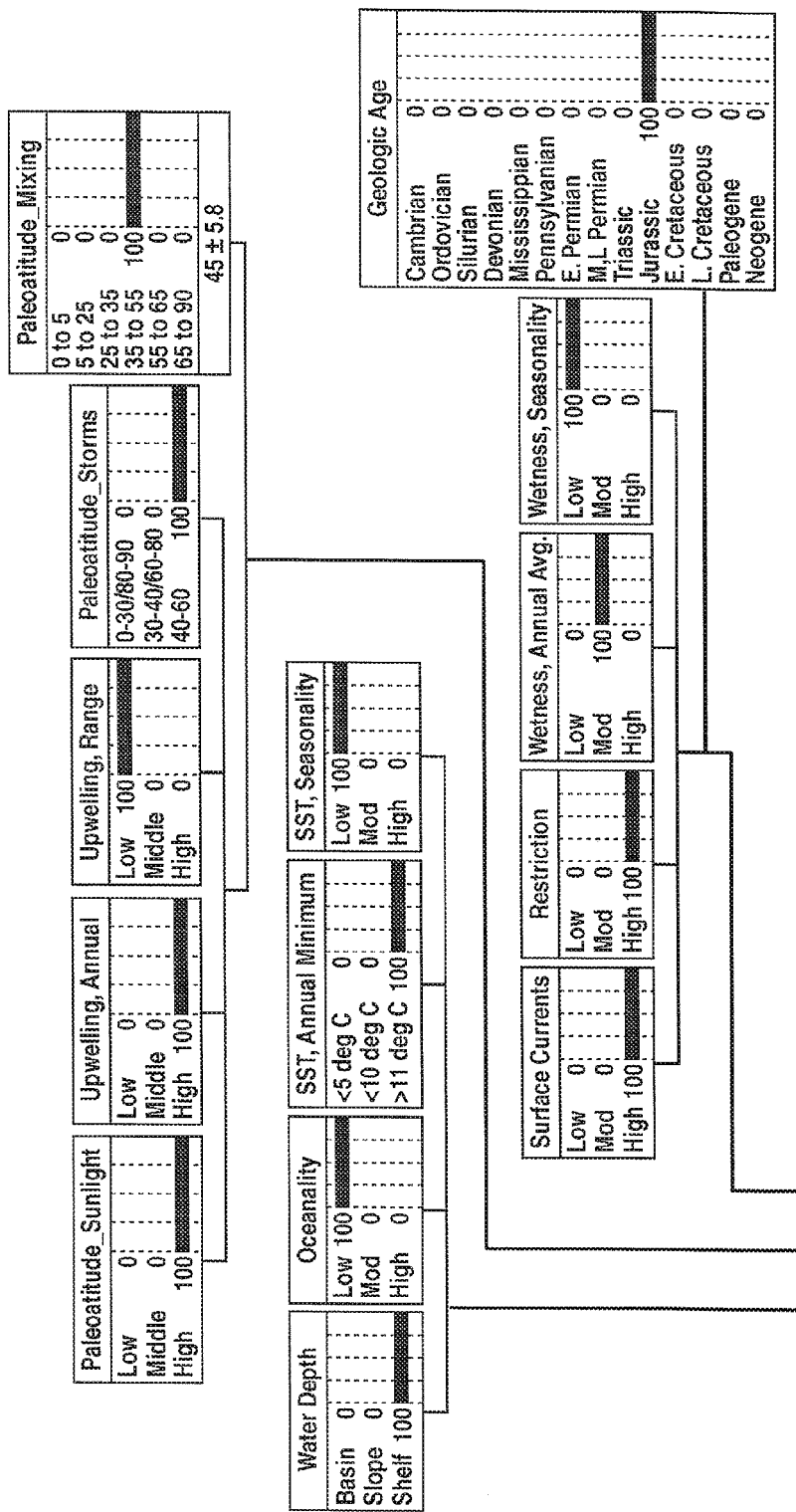
FIG. 4 is an example of a portion of the Bayesian network of FIG. 3 showing the retrodiction of source-rock quality ("forward mode").
Figure 4B:
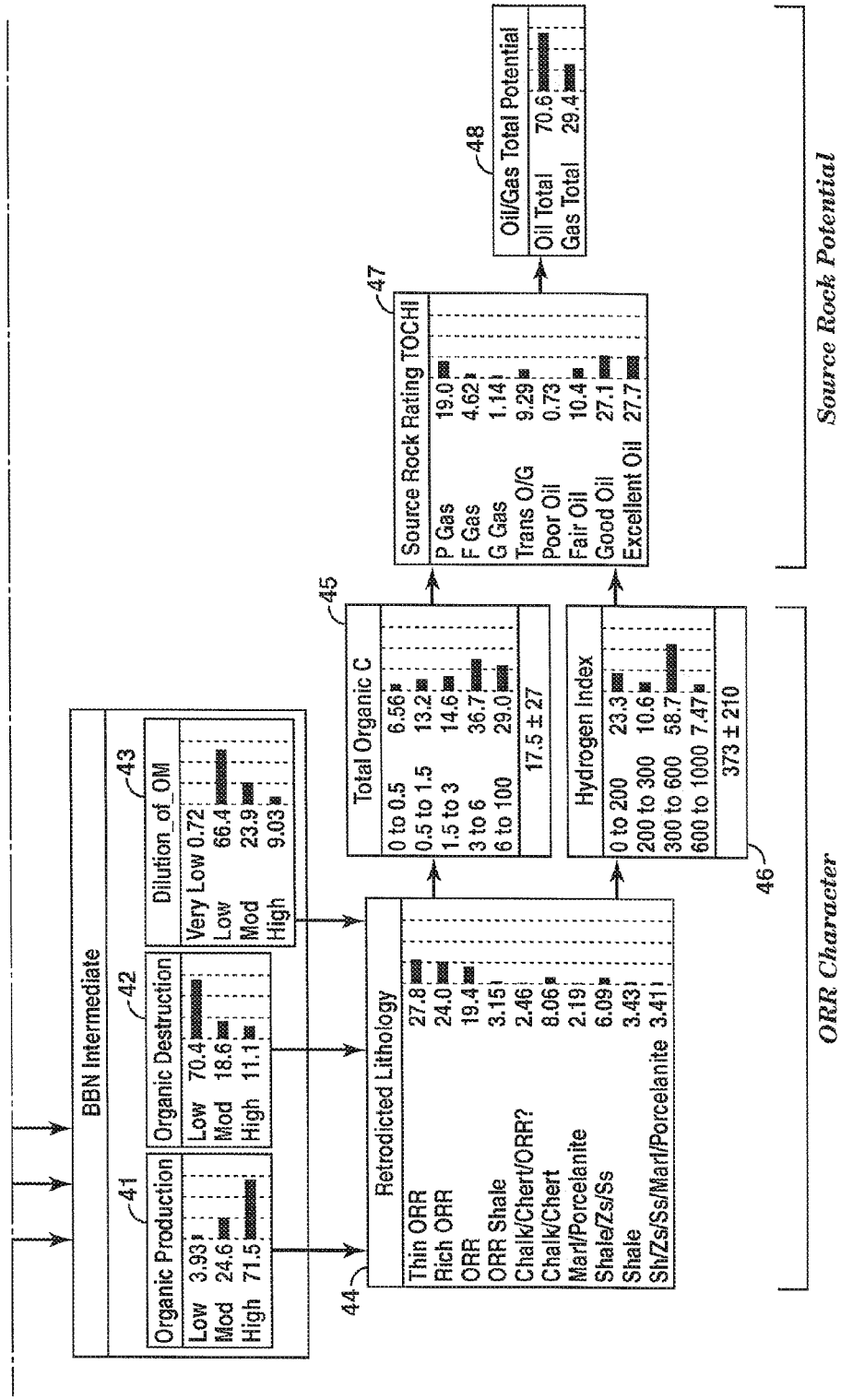
Figure 5A:
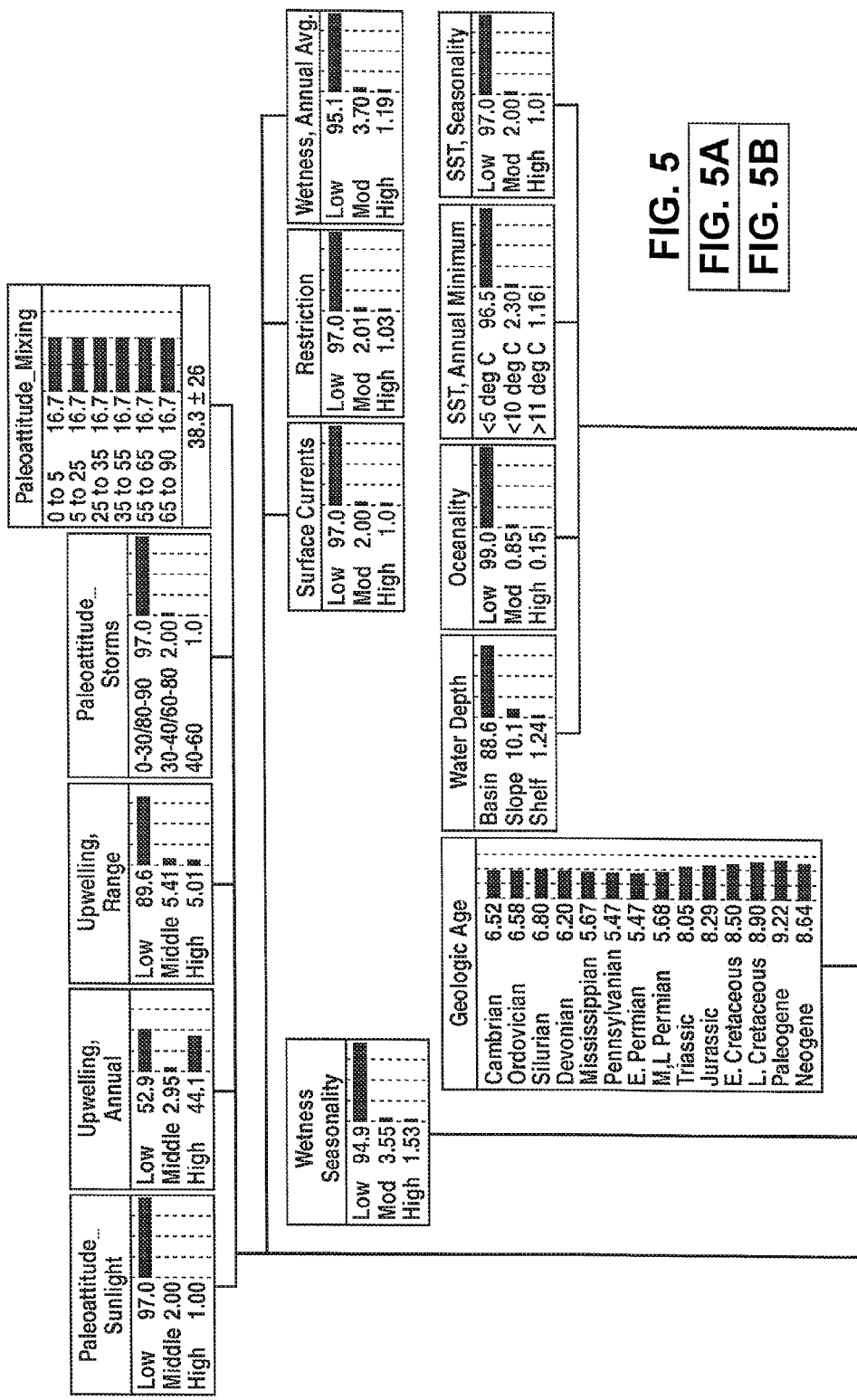
FIG. 5 is an example of a portion of the Bayesian network of FIG. 3 showing the retrodiction of geological age, paleogeography, and paleoenvironmental conditions ("inverse mode").
Figure 5B:
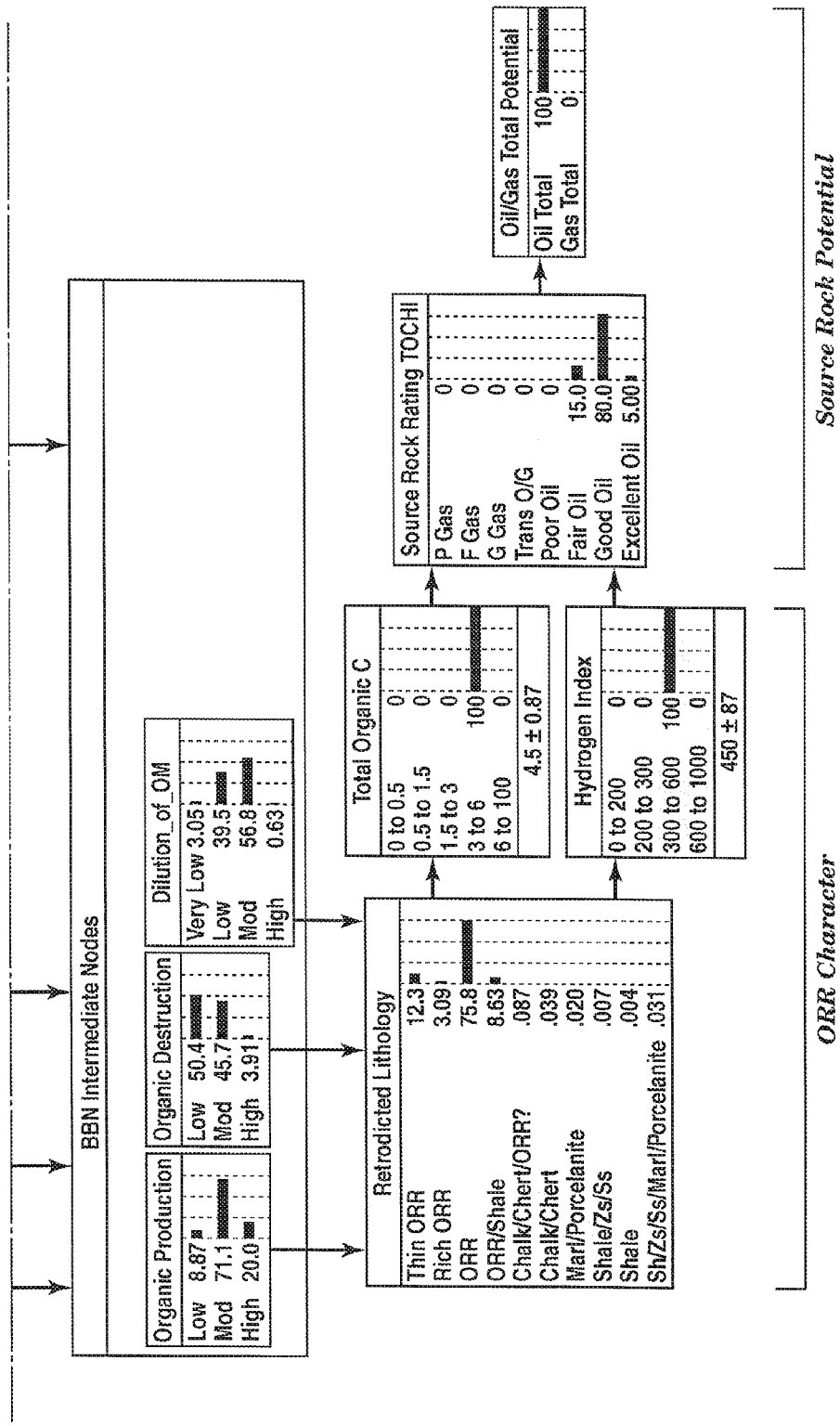
Figures 6, 6A, 6B:
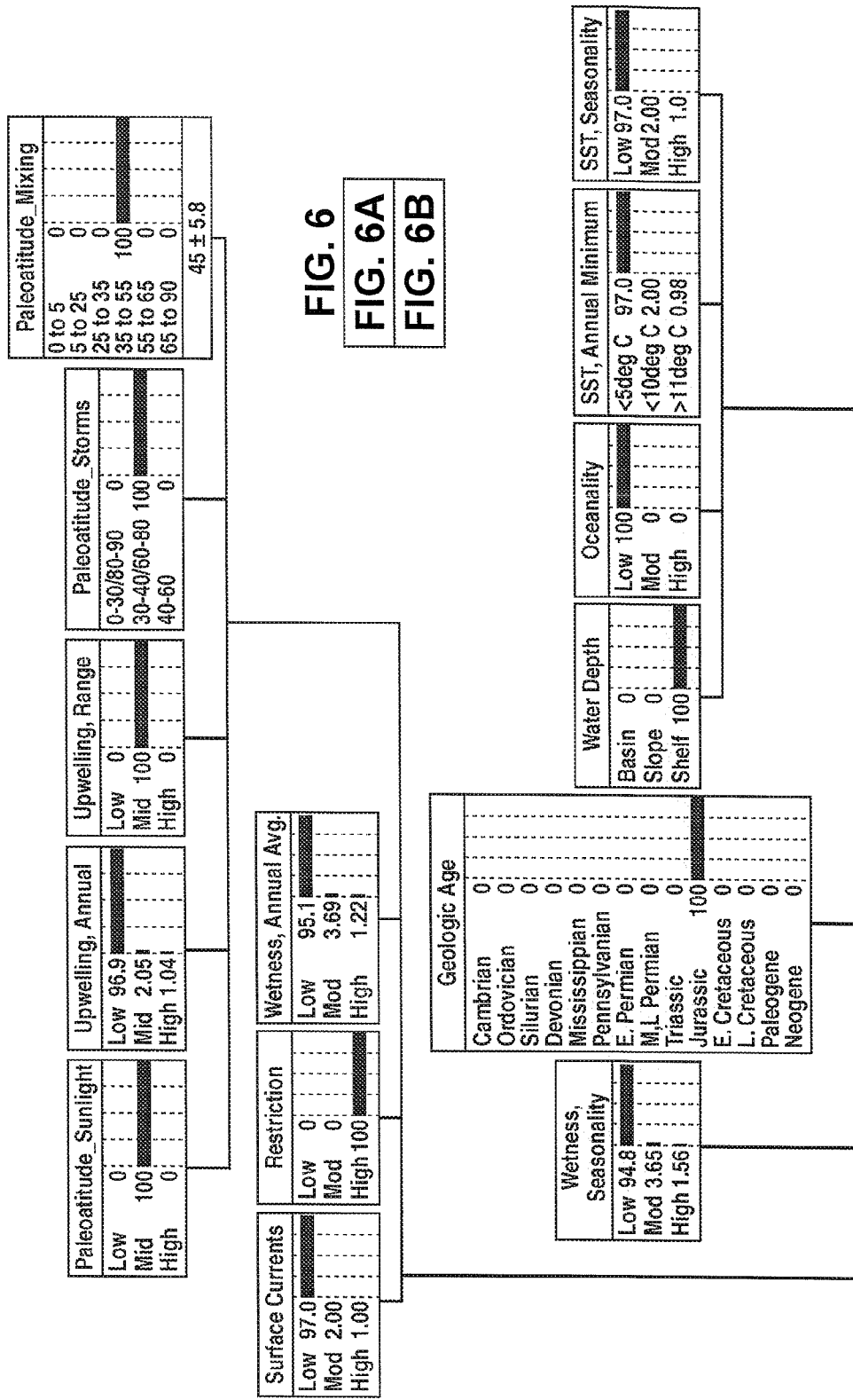
FIG. 6 is an example of a portion of the Bayesian network of FIG. 3 showing the retrodiction of paleoenvironmental conditions ("hybrid forward-inverse mode").
Figure 6B:
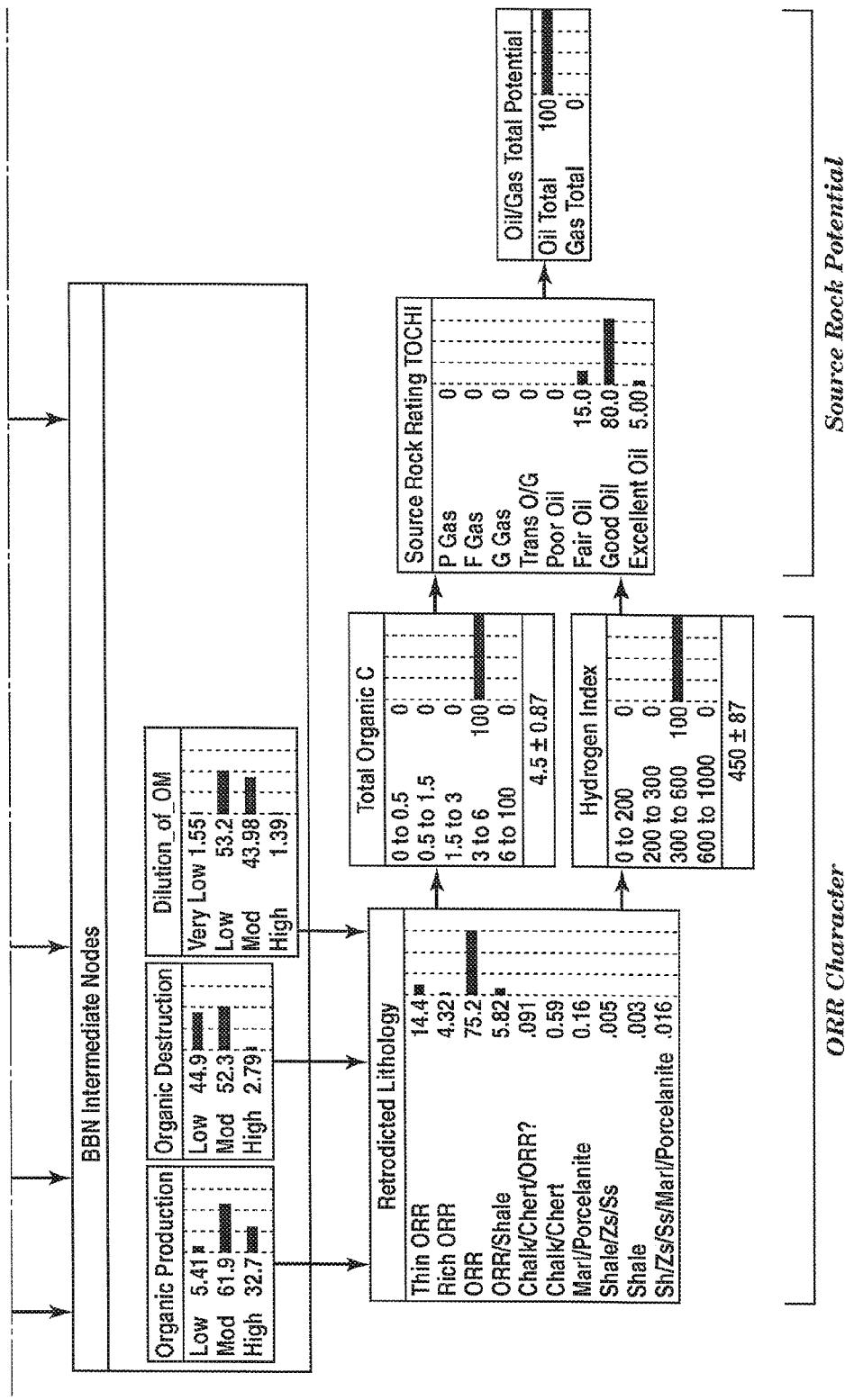

FIG. 4 is a portion of the Bayesian network of FIG. 3, with probability distribution data given for the nodes shown. FIG. 4 illustrates an example of the probability distribution for each state of the output (leaf) node when each input (root) node is set with probability=1 for one state, and all others set to 0 ("forward" mode). The probability distributions shown for the intermediate nodes in FIG. 4 and FIGS. 5 and 6 are intended to be representative of one particular realization of the network state. In actuality, these probabilities are conditional, their distribution depending on the particular state that each parent root node happens to be in. Thus each intermediate node has not one but many (conditional) probability distributions associated with it. The table of node probability distributions presented below in this document is a realistic example of the amount of information needed to embody the functional relations for the causal network connections that enable the software programs that solve Bayesian networks to work.

In this example, it is assumed that the fourteen input nodes have the following values:
1. Paleolatitude Sunlight is 'High',
2. UpwellingAnnAvg is 'High',
3. UpwellingSeasonality is 'Low',
4. Paleolatitude Storms is '40 to 60 ',
5. Paleolatitude Mixing is '35 to 55',
6. Surface Currents is 'High',
7. Restriction is 'High',
8. Wetness, Annual Average is 'Moderate',
9. Wetness, Seasonality is 'Low',
10. Geological Age is 'Jurassic',
11. Water Depth is 'Shelf',
12. Oceanality is 'Low',
13. SeaSurfaceTemperature, Annual Minimum is '>11 degrees', and
14. SeaSurfaceTemperature, Seasonality is 'Low'

FIG. 4 illustrates a retrodiction of source-rock quality. In this example, input nodes Geological Age (node number 310), Paleolatitude, Mixing (305), Paleolatitude, Storms (304), Paleolatitude_Sunlight (301), Restriction (307), Surface Currents (306), Upwelling, Annual Average (302), Upwelling, Seasonality (303), Wetness, Annual Average (308), and Wetness, Seasonality (309) influence the probability distribution for the Production of organic matter intermediate node 41. Input nodes Geological Age (310), Restriction (307), SeaSurfaceTemperature, Annual Average (313), SeaSurfaceTemperature, Seasonality (314), Water Depth (311), Wetness, Annual Average (308), and Wetness, Seasonality (309) influence the probability distribution for the Destruction of organic matter intermediate node 42. Input nodes Geological Age (310), Oceanality (312), Paleolatitude_sunlight (301), Restriction (307), Water Depth (311), Wetness, Annual Average (308), and Wetness, Seasonality (309) influence the probability distribution for the Dilution of organic matter node 43. Organic-Matter Production, Organic-Matter Destruction, and Dilution of Organic Matter are convolved to determine the probability distribution for the states of Retrodicted Lithology 44, Total Organic Carbon 45, Hydrogen Index 46, Source-Rock Rating 47, and the final Oil/Gas Total Potential 48. The three BBN intermediate nodes 41-43 shown in FIG. 4 as the only intermediate nodes correspond to nodes 344, 346 and 347 in FIG. 3; however, FIG. 3 also has many other intermediate nodes upstream of those three nodes, and thus is a more typical and accurate example BBN than FIG. 4.

Figure 7:
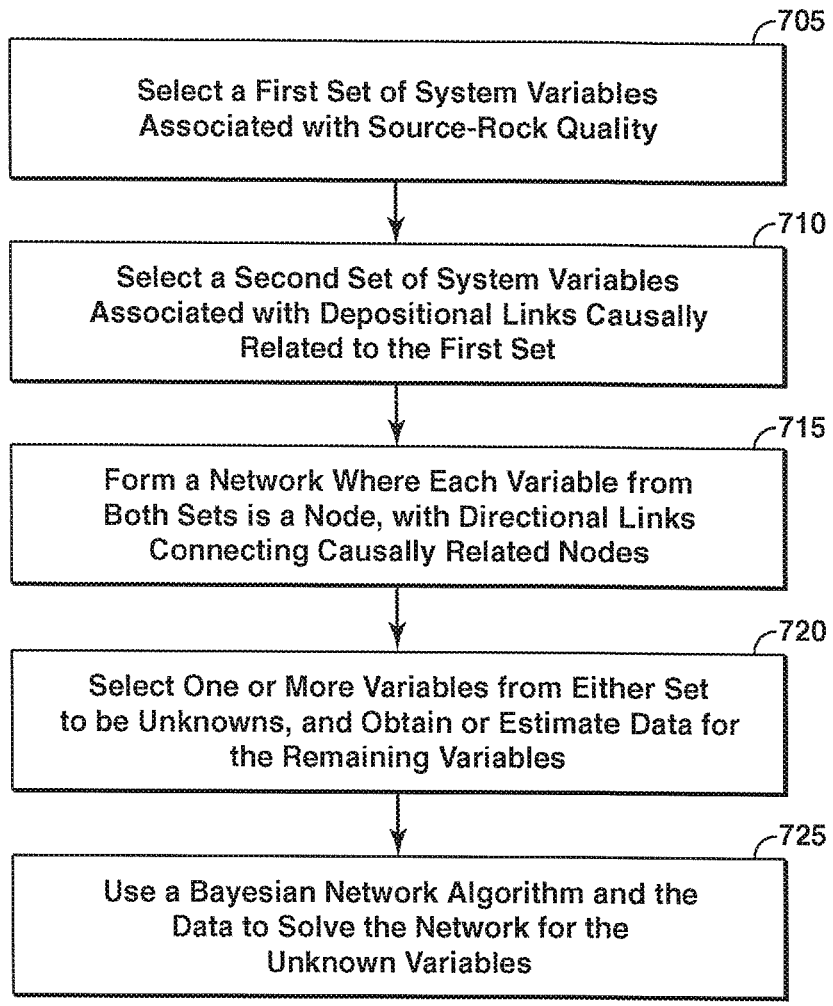
FIG. 7 is a flow chart showing basic steps in the present inventive method.

FIG. 7 is a flow chart of basic steps in the present inventive method. Applied to the forward mode exercise of FIG. 4, the first set of system variables selected in step 705 are the variables representative of source rock quality in the network diagram of FIG. 4, which are the variables associated with the bottom five nodes. The second set of system variables selected at step 710 are the variables associated with all other nodes in FIG. 4. The network formed at step 715, with directional links connecting causally related nodes, is shown in FIG. 4. The network contains nodes representing both the first and the second sets of variables, their associated data, and quality appraisals if any are made. The network also contains intermediate nodes that may be situated between the first set of nodes and the second set of nodes. The network also includes directional links connecting interdependent nodes. The directional links preferably honor known causality relations. The meaning and significance of honoring known causality relations is explained in WO-2006/112,864. The variables selected to be "known" in step 720 are the fourteen input nodes, and their estimated data are given in the list above and shown also in FIG. 4. In many cases, this may involve estimating a probability distribution for some or all of the known variables. As data for the known variables are gathered, the probability distribution estimates may become more refined. The quality, or reliability, of selected data may then be appraised. Appraising quality of selected data is optional and may occur for all, some, or none of the obtained or estimated data. A Bayesian network algorithm is then applied at step 725 to the data and quality information to solve the network for the remaining variables (the "unknown" variables) and their associated uncertainties. Software available from any of several commercial vendors, such as the NETICA product from Norsys Software Corp., allows construction of Bayesian networks with many interrelated nodes, with each node capable of having many states, and solution of the network for unknown variables. The values and associated uncertainties for the "unknown" variables in this example are shown in FIG. 4. In such manner, a retrodictive source-rock quality model is developed.

The network diagram of FIG. 5 illustrates an example of the system run in inverse mode with the probability distribution shown in FIG. 5 for each state of the input (root) nodes when each of the main output (leaf) nodes is set with probability=1 for one state, and all others set to 0. In this example, it is assumed (step 1615 in FIG. 16) that the two main output nodes have the following values:
1. TOC is '3 to 6%',
2. HI is '300 to 600 mgHC/gC'

This is part of step 720 in the FIG. 7 flow chart of basic steps in the present inventive method. All other variables in FIG. 5 are considered unknowns to be solved for. FIG. 5 is the network selected at step 715, and illustrates a retrodiction of paleoenvironmental conditions. In this example, the output nodes TOC and HI influence the probability distribution for the input nodes through convolution of the intermediate nodes including Organic-Matter Production, Organic-Matter Destruction, and Dilution of Organic Matter.

The first set of system variables selected at step 705 are the nodes in FIG. 5 associated with source rock quality, which are the bottom five nodes in the network daigram, including TOC and HI. The second set of system variables selected at step 710 are the variables corresponding to all other nodes in the network diagram. They are causally related to the first set as can be seen by the directional connecting lines, and they all pertain to depositional setting. The probability distribution data shown in FIG. 5 for the nodes representing unknown variables are retrodicted (step 725) by the Bayesian network of FIG. 5, given the data estimated for TOC and HI. A data appraisal step such as discussed above is an optional step that is not applicable for this exercise where it is assumed that the TOC and HI data are completely known.

FIG. 6 illustrates an example of the model run in hybrid forward-inverse mode, resulting in the probability distribution for each state of the paleoenvironmental-condition input (root) nodes when each output (leaf) node and each geological-age and paleogeography input (root) node is set with probability=1 for one state, and all others set to 0. This represents a case where some sample data and some information about the depositional setting are available. Typically, information about geological age and paleogeography is more readily obtained from commonly available exploration data than information about paleoenvironmental conditions.

In this example, it is assumed that the nine main output and geological-age and paleogeography input (root) nodes have the following values:
1. TOC is '3 to 6%',
2. HI is '300 to 600 mgHC/gC'
3. Paleolatitude Sunlight is 'Middle',
4. Paleolatitude Storms is '30 to 40/60 to 80',
5. Paleolatitude Mixing is '35 to 55',
6. Restriction is 'High',
7. Geological Age is 'Jurassic',
8. Water Depth is 'Shelf', and
9. Oceanality is 'Low.'

FIG. 6 illustrates a retrodiction of paleoenvironmental conditions. In this example, the output nodes TOC and HI and geological-age and paleogeography input (root) nodes influence the probability distribution for the paleoenvironmental-condition input (root) nodes through convolution of the intermediate nodes including Organic-Matter Production, Organic-Matter Destruction, and Dilution of Organic Matter. Retrodictions are made for the paleoenvironmental conditions Upwelling, Annual; Upwelling, Range; Surface Currents, Wetness-Seasonality, Wetness-Annual Average, SST-Annual Minimum, and SS T-Seasonality.

Referring to the inventive method flow chart of FIG. 7, selection of a first set (step 705) and a second set (710) of variables is the same selection made in the previous example since the selected network diagram (FIG. 6, step 715) contains the same variables as the diagram of FIG. 5. The variables chosen to be "known" at step 720 are the nine variables for which a single state is specified in the list above, i.e., TOC, HI, and the paleogeographic and geological-age variables included in the FIG. 6 network diagram. At step 720, the data listed above (in this case, a single value for each variable) are assigned to the "known" variables. Note that in this example, "known" variables are selected from each of the two sets of variables, TOC and HI from the first set and the seven geological-age and paleogeography input (root) nodes from the second set. As stated above, the network formed in step 715 is that of FIG. 6, where the values are predicted (step 725) for the paleoenvironmental conditions are shown along with their probability distributions which indicate the uncertainties associated with the predictions. Values may also be predicted, and in fact are predicted in FIG. 6, for any other nodes in the network for which data are not provided at step 720; these variables in this example are the BBN intermediate nodes, retrodicted lithology, source rock rating, and oil/gas total potential.

Figure 8:
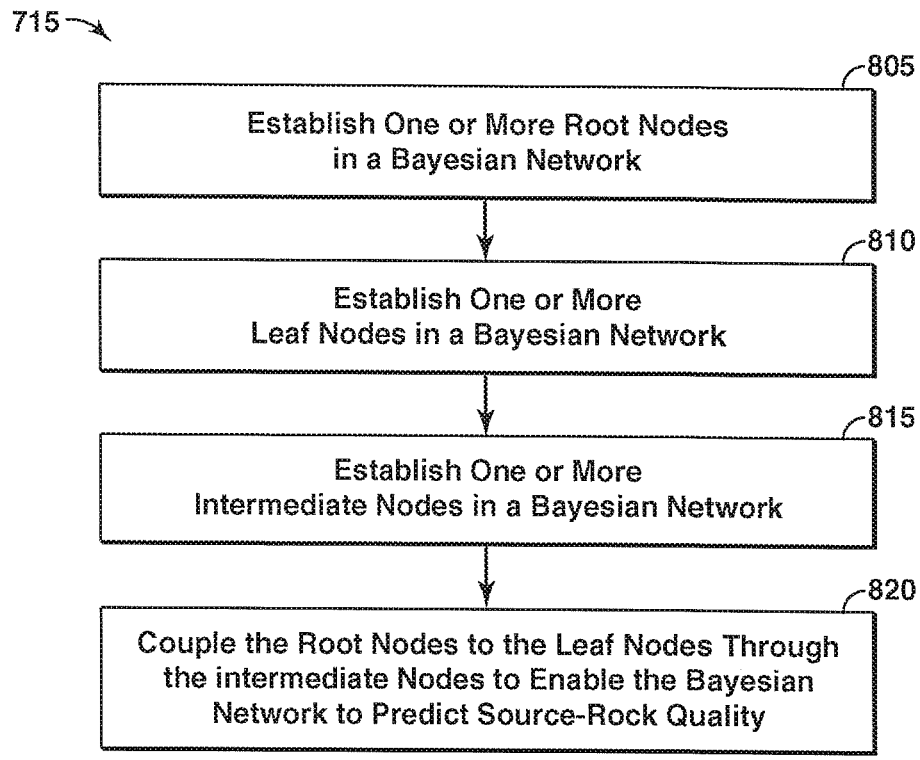
FIG. 8 is a flow chart showing basic steps in the development of a Bayesian network to retrodict source-rock quality or paleoenvironmental conditions.

FIG. 8 is a flow chart showing basic steps in forming a network (step 715). The steps include establishing one or more root nodes in a Bayesian network (step 805), establishing one or more leaf nodes (step 810) and one or more intermediate nodes (step 815). The root nodes are coupled to the leaf nodes through the intermediate nodes to enable the Bayesian network to retrodict source-rock quality (step 820).

Figure 9:
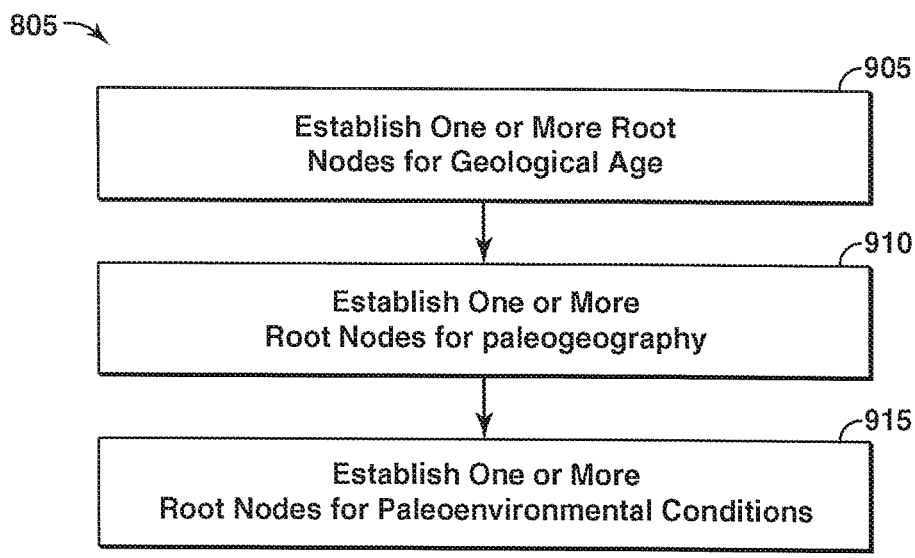
FIG. 9 is a flow chart showing steps in establishing root nodes in a Bayesian network.

An example of establishing one or more root nodes in a Bayesian network (step 805), is presented in the flow chart of FIG. 9 and includes establishing one or more root nodes for geological age (step 905), establishing one or more root nodes for paleogeography (step 910), and establishing one or more root nodes for paleoenvironmental conditions (step 915). The order in which steps such as 905-915 or 805-815 are performed does not matter.

Figure 10:
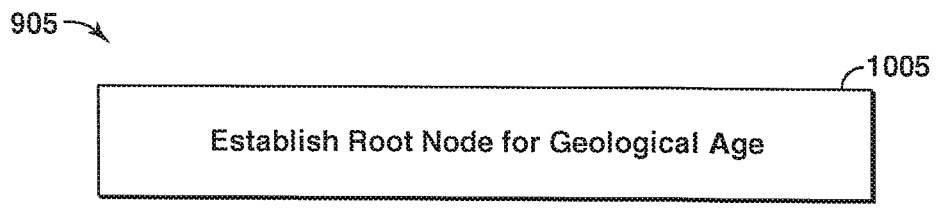
FIG. 10 illustrates an embodiment of the present invention in which a single root node is established for the variable geologic age.

An example of establishing one or more root nodes for geological age (step 905; also 210) is presented for completeness in FIG. 10—in this case establishing a single root node for geological age (step 1005). Other geological age factors might include, for example, such variables as the evolutionary stage of planktonic organisms, or the evolutionary stage of land plants.

Figure 11:
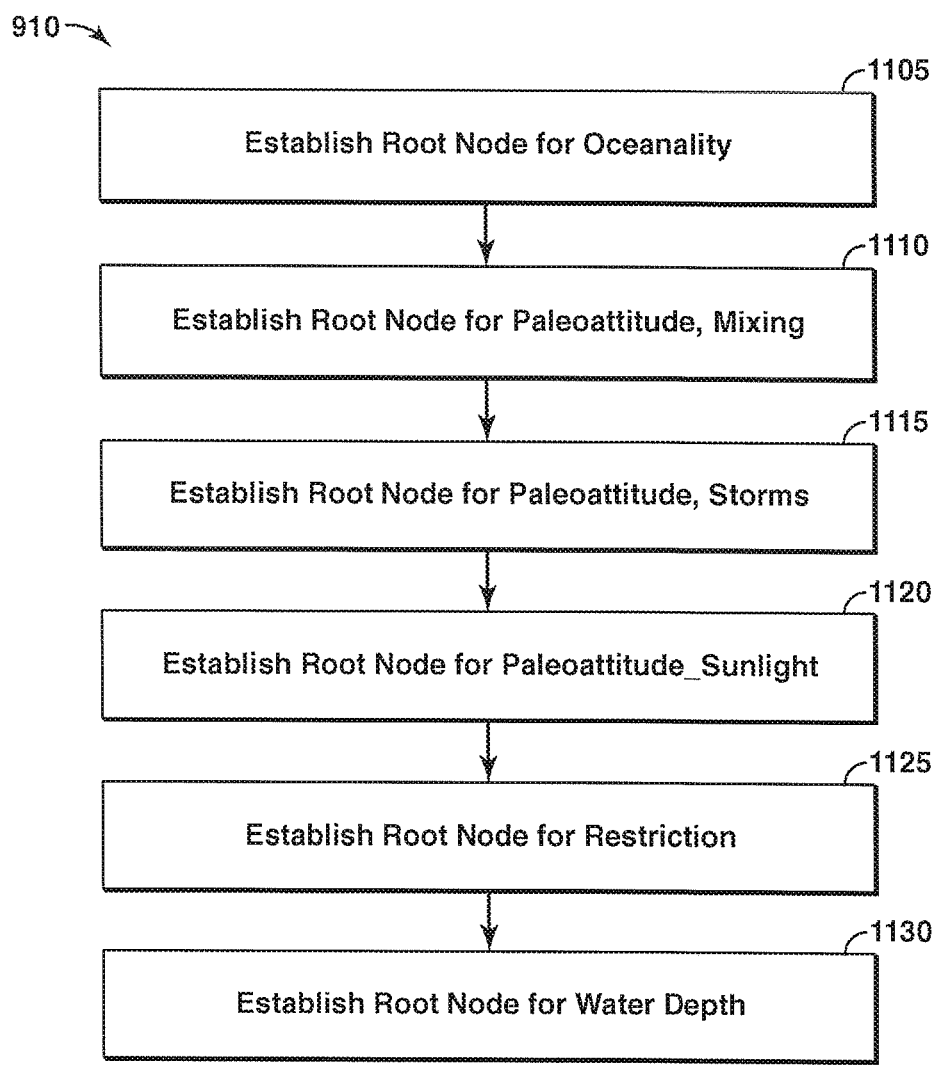
FIG. 11 illustrates an example where several root nodes are established for paleogeography.

An example of establishing one or more root nodes for paleogeography (step 910; also 215), shown in more detail in Table 3 and FIG. 11, includes establishing a root node for Oceanality (step 1105), establishing a root node for Paleolatitude, Mixing (step 1110), establishing a root node for Paleolatitude, Storms (step 1115), establishing a root node for Paleolatitude Sunlight (step 1120), establishing a root node for Restriction (step 1125), and establishing a root node for Water Depth (step 1130).

TABLE 3

Components of Input Nodes

| | | |
|---|---|---|
| Paleogeography | (215) | Oceanality |
| | | Paleolatitude, Mixing |
| | | Paleolatitude, Storms |
| | | Paleolatitude_Sunlight |
| | | Restriction |
| | | Water Depth |
| Paleoenvironmental Conditions | (220) | SeaSurfaceTemperature, Annual Average |
| | | SeaSurfaceTemperature, Seasonality |
| | | Surface Currents |
| | | Upwelling, Annual Average |
| | | Upwelling, Range |
| | | Wetness, Annual Average |
| | | Wetness, Seasonality |

Figure 12:
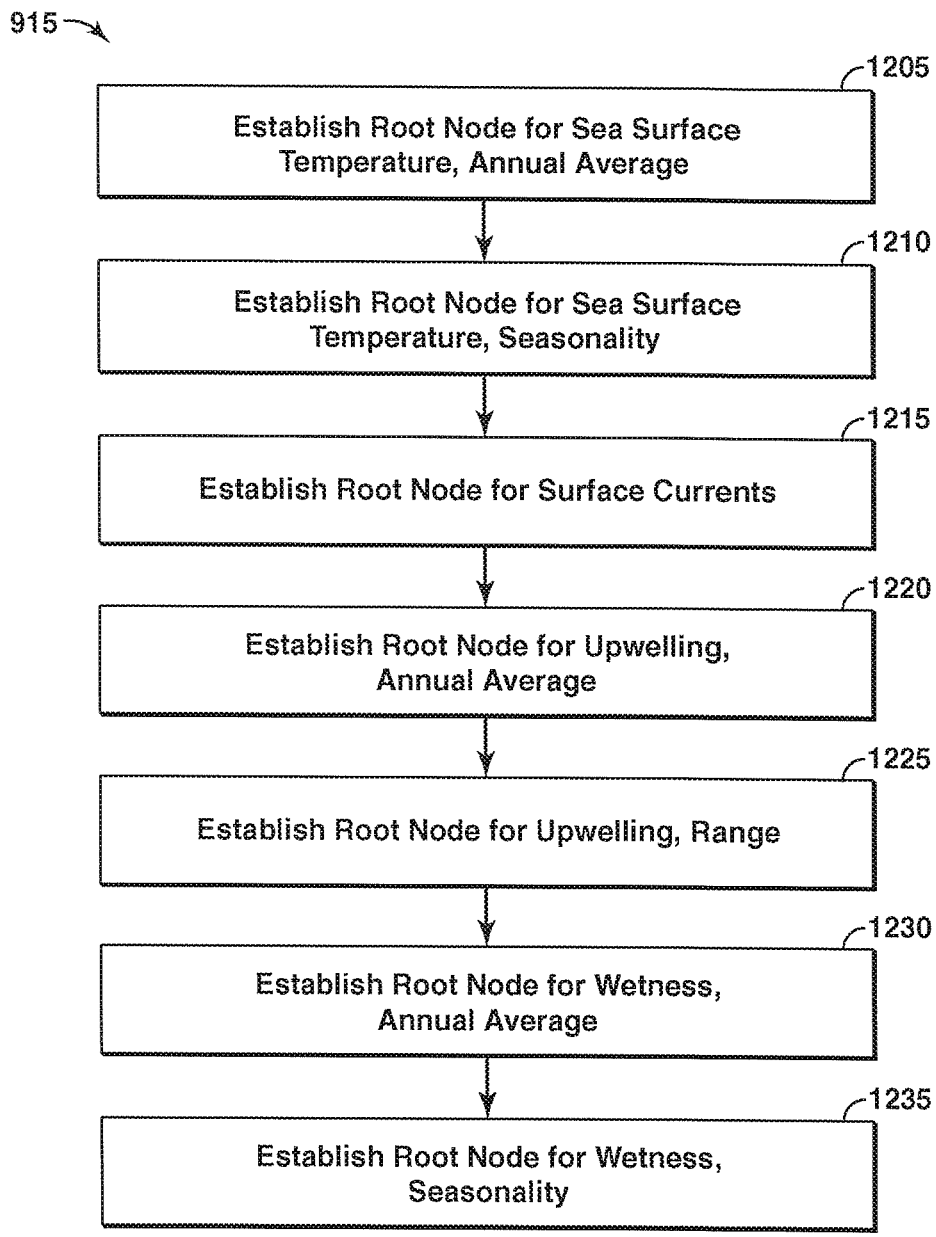
FIG. 12 illustrates an example where several root nodes are established for paleoenvironmental conditions.

An example of establishing one or more root nodes for paleoenvironmental conditions (step 915; also 220), shown in more detail in Table 3 and FIG. 12, includes establishing a root node for SeaSurfaceTemperature, Annual Average (step 1205), establishing a root node for SeaSurfaceTemperature, Seasonality (step 1210), establishing a root node for Surface Currents (step 1215), establishing a root node for Upwelling, Annual Average (step 1220), establishing a root node for Upwelling, Range (step 1225), establishing a root node for Wetness, Annual Average (step 1230), and establishing a root node for Wetness, Seasonality (step 1235).

Figure 13:
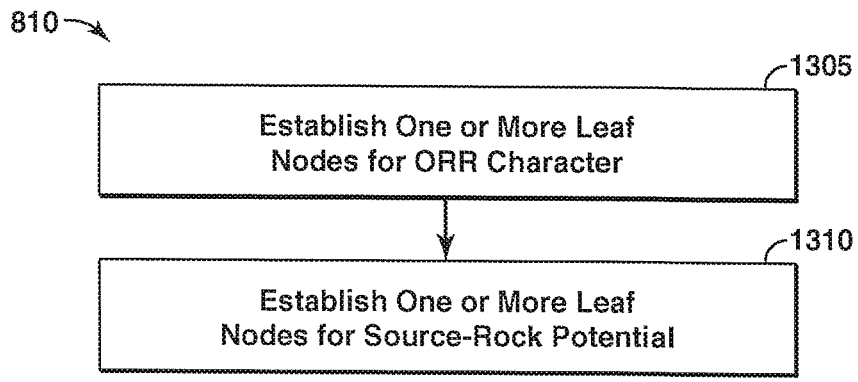
FIG. 13 illustrates an example of establishing leaf nodes in a Bayesian network to retrodict source-rock quality or paleoenvironmental conditions.

An example of establishing one or more leaf nodes in the Bayesian network (step 810), shown in more detail in FIG. 13, includes establishing one or more leaf nodes for ORR character (step 1305) and establishing one or more leaf nodes for source-rock potential (step 1310).

Figure 14:
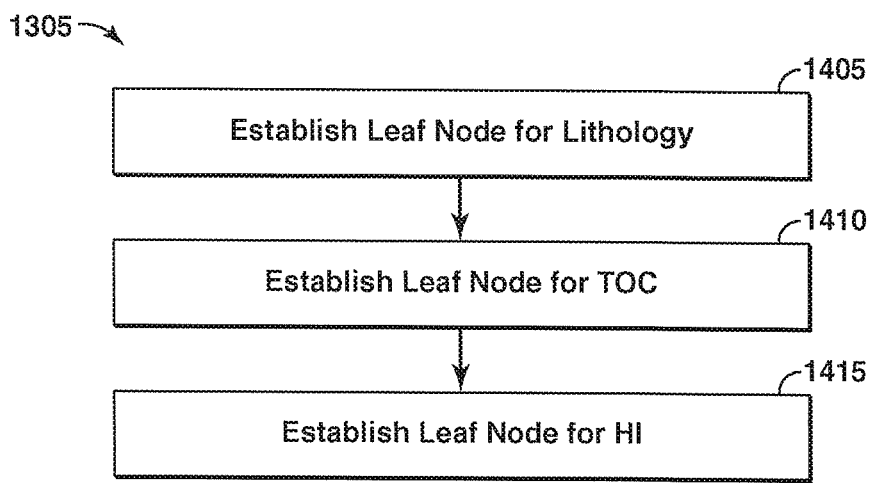
FIG. 14 gives examples of leaf nodes representing ORR character.

An example of establishing one or more leaf nodes for ORR character (step 1305), shown in more detail in FIG. 14, includes establishing a leaf node for each of: Retrodicted Lithology (step 1405, Total Organic C (TOC) (step 1410), and Hydrogen Index (HI) (step 1415).

Figure 15:
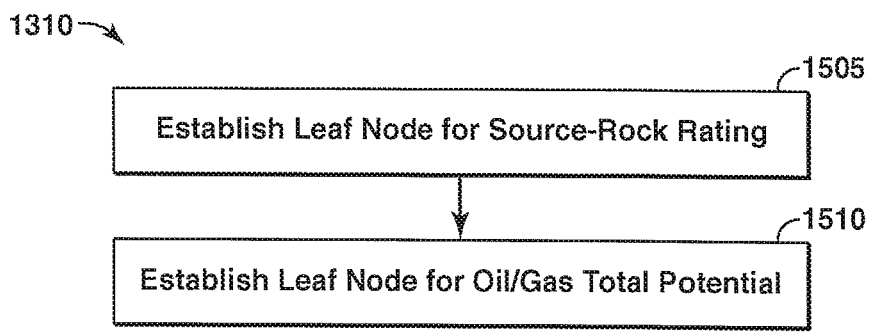
FIG. 15 gives examples of leaf nodes representing source-rock potential.

An example of establishing one or more leaf nodes for source-rock potential (step 1310), shown in more detail in FIG. 15, includes establishing a leaf node for each of: Source-Rock Rating (step 1505), and Oil/Gas Total Potential (step 1510).

The advantages of the present inventive method include:
(1) The invention can explicitly implement both aspects of geological controls on source character: processes and contingencies. Models that do not include contingencies lack an essential component of how natural systems operate and misrepresent those natural systems by implicitly assuming that all processes are available to operate equally in time and space. Contingencies are represented in the present inventive method both by nodes such as Geological Age, paleogeographic setting, paleogeographic restriction, and climate mode and by the probability distributions in certain nodes, including such nodes as Biogenic Supply Rate-Pelagic, Biogenic Supply Rate-Benthic, and Consumer Population which are functions of geological age and organic production rates, because different biological organisms were present at different geological ages.

Existing source rock quality predictive schemes do not change the processes within their models to account for the evolution of various primary producers or consumer organisms through geological time; instead, they implicitly assume that a process that can occur today is directly applicable throughout all geological time without modification. Such existing methods do not use Bayesian Belief algorithms, and therefore they would not have a geological age node, or any node. But they can be examined for whether they have a corresponding feature, and they do not appear to have such. They make no modification to their predictive processes to account for geological age. Each of these schemes uses various types of paleogeographic maps and paleoclimatic simulations for particular geological times, but apply the same processes for every reconstruction.

(2) The present invention can explicitly incorporate a wide range of processes in multiple pathways to the accumulation of potential source rocks. Existing models emphasize primary organic production or organic preservation to the exclusion of other processes or rely on a single linear/serial pathway from primary organic production to accumulation of potential source rocks. The present inventive method can implement a full range of natural processes, whereas other models use empirically determined proxies for essential natural mechanisms.

Figure 16:
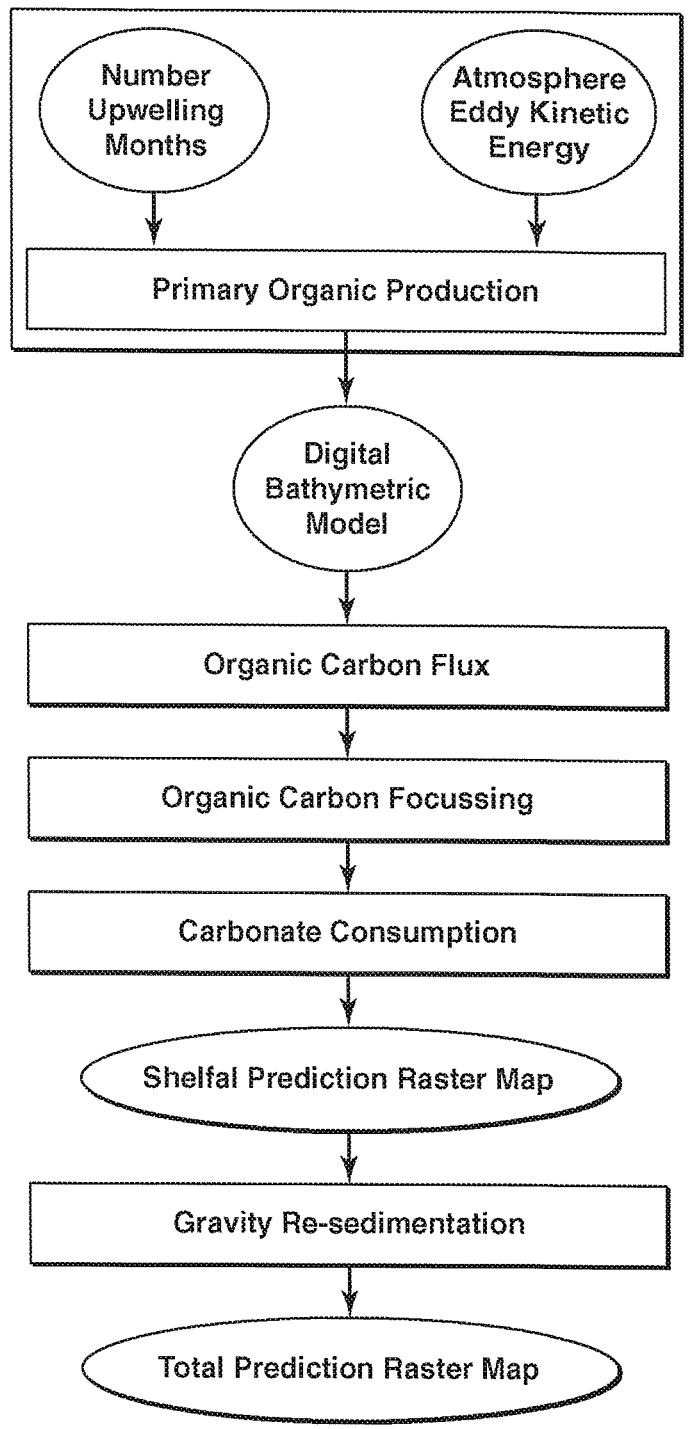
FIG. 16 is a flowchart illustrating the predictive method proposed by the Merlin project.
Figure 17:
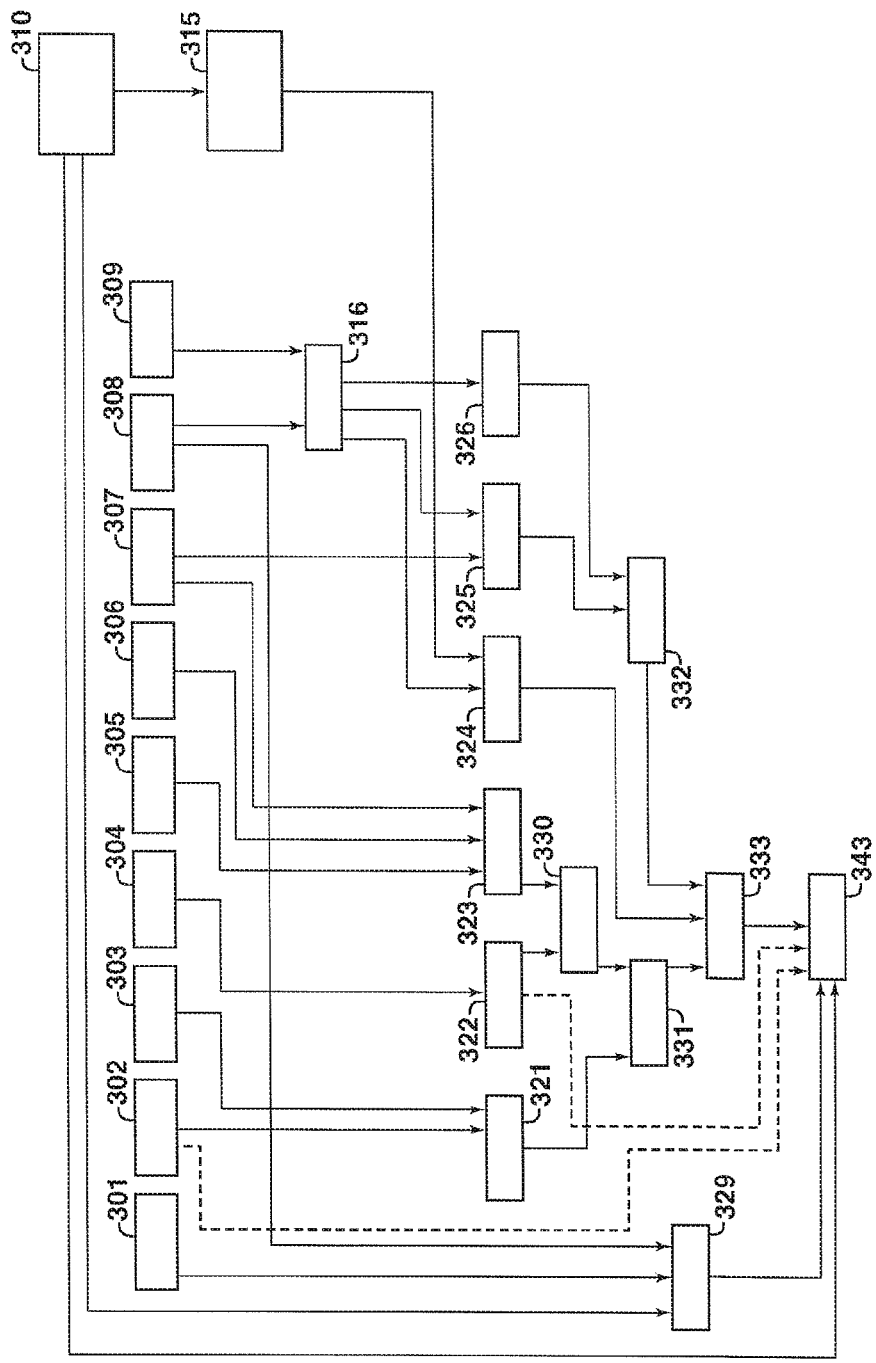
FIG. 17 compares Merlin proposed method to the present inventive method with respect to organic production.

(3) The invention can explicitly incorporate non-linearity in essential processes and the non-linear interactions of processes. As an example of non-linearity incorporated into the present inventive method, FIG. 3 shows numerous paths by which a system can achieve high Marine Organic Production 343, as embodied in the probability table for the Marine Organic Production node. For example, three such paths are 302-321-331-333-343; 304-322-330-331-333-343; and 305-323-330-331-333-343. These paths and many more are outlined in Table 4. In addition, the probability distribution functions for most nodes are non-linear (e.g., probability state tables for intermediate nodes in the Tables I-1 to I-37 that follow). From observation of such tables, the probability typically varies non-linearly with the change in state. In contrast, FIG. 16 is a flow chart of the "Merlin Predictive Methodology.", and Table 5 is a table with the one linear path to the highest prediction of Organic Carbon Production. The diagram and table clearly indicate a linear workflow. Also, probability distributions for variable data play no part in existing predictive schemes such as Merlin. FIG. 17 reproduces a portion of FIG. 3 showing all pathways in the network that influence the node/variable Organic Production, which is equivalent to the quantity called Organic Carbon Production in the Merlin flowchart of FIG. 16. Connecting arcs 171 and 172 are added to FIG. 17 to show—in terms of flow and interdependency even though the methodologies are different—the simple linear path Merlin would substitute for the interdependency and alternative pathways of the present invention as represented by the network of FIG. 17.

TABLE 4

Examples of Multiple Non-Linear Paths to Highest Predicted

| | Components of Nutrients, Circulation | | | | | | |
|---|---|---|---|---|---|---|---|
| Upwelling + | Cyclonic Mixing + | Water Mass Mixing = | Nutrients, Circulation | Nutrients, Other | Runoff | Insolation | Geological Age |
| High | High | Low | =High | High | High | High | L. Cretaceous |
| High | High | Low | =High | High | High | High | Paleogene |
| High | High | Low | =High | High | High | High | Neogene |
| High | High | Moderate | =High | High | High | High | L. Cretaceous |
| High | High | Moderate | =High | High | High | High | Paleogene |
| High | High | Moderate | =High | High | High | High | Neogene |
| High | High | High | =High | High | High | High | L. Cretaceous |
| High | High | High | =High | High | High | High | Palcogene |
| High | High | High | =High | High | High | High | Neogene |
| High | Low | High | =High | High | High | High | L. Cretaceous |
| High | Low | High | =High | High | High | High | Paleogene |
| High | Low | High | =High | High | High | High | Neogene |
| High | Moderate | Moderate | =High | High | High | High | L. Cretaceous |
| High | Moderate | Moderate | =High | High | High | High | Paleogene |
| High | Moderate | Moderate | =High | High | High | High | Neogene |
| High | Moderate | High | =High | High | High | High | L. Cretaceous |
| High | Moderate | High | =High | High | High | High | Paleogene |
| High | Moderate | High | =High | High | High | High | Neogene |
| High | Moderate | High | =High | High | High | High | L. Cretaceous |
| High | Moderate | High | =High | High | High | High | Paleogene |
| High | Moderate | High | =High | High | High | High | Neogene |

TABLE 5

Example of Single Linear Path to Highest Total Organic Carbon Production (Merlin prediction process)

| Months of Upwelling | + | Atmospheric Eddy Kinetic Energy | = | Total Organic Carbon Production |
|---|---|---|---|---|
| 12 months (250) | + | High (75) | = | High (325 mg C/m²/year) |

(4) The invention can predict source-rock lithology as well as TOC and HI contents. Lithology may be defined as the physical character of a rock. Existing predictive methods do not predict lithology; instead, they assume the rock is a shale or mudstone and only predict the TOC and/or HI of the assumed shale. The present inventive method can predict lithology because it can include a full range of processes and contingencies that affect the deposition of the rock and the organic matter therein. The Lithology node in the BBN diagrams such as 44 in FIG. 4 is how that information may be captured.

(5) The invention can be run in at least 3 modes (see Table 1): 1) Forward, from geological age, paleogeography, and paleoenvironmental conditions to source-rock quality; 2) Inverse, from source-rock quality to geological age, paleogeography, and paleoenvironmental conditions; and 3) Hybrid forward-inverse, from geological age, paleogeography, and source-rock quality to paleoenvironmental conditions.

(6) The invention can provide probabilities of occurrence of source-rock quality output nodes as a confidence metric.

(7) The invention can track retrodiction at each stage with confidence probabilities as diagnostics for evaluating validity of prediction. The states of all intermediate nodes are available to assess pathway to prediction.

(8) The invention propagates input changes upstream as well as downstream which allows checks to be made on the reasonableness of input changes.

(9) The invention propagates modifications or additions to the network throughout the network automatically. This makes it easy to change the network structure and evaluate exactly the results of such changes by comparison with not only the final output nodes, but with all intermediate nodes. This enables a quantitative assessment of the effects of network modifications across the entire network.

(10) The invention can be used to make predictions for: 1) a single location (e.g., a proposed well site), 2) a series of locations across a geological province, 3) an area with similar geological properties, or 4) on a map basis, either as a series of grid points or polygons (areas with similar attributes).

(11) In the invention, calibration data automatically (i.e., without manual intervention) changes probability relations, dynamically adapting network to a particular setting or geological age; this is particularly useful for running on polygons or map grid points.

(12) The invention can quantify appropriateness or closeness of match of an analogous depositional setting or data set as well as use network to select an appropriate analog quantitatively by assessing the match of input and intermediate node states.

The present inventive method is preferably practiced with the aid of a computer, i.e. it is computer implemented. Predictions or retrodictions for the states of designated nodes, and their associated probability distributions, can be downloaded or saved to memory, in the course of being used for such real-world purposes as evaluating the potential of an area to contain hydrocarbon source rocks.

Although the present invention has been described with reference to various example embodiment thereof, those skilled in the art will know of various changes in form that may be made without departing from the scope of the claimed invention as defined in the appended claims. For example, the person skilled in the art will recognize that nodes of marginal impact could be added to the network with little effect on the value of the network even if such nodes have non-causal connections. Further, while the tables following this paragraph and before the claims describe one embodiment of the invention, other embodiments of the invention are within the claims, including those with different probability distributions for the variables, different states for the variables, different variables, different Bayesian network nodes and interconnection, and approaches other than Bayesian networks for addressing full joint probability of domain variables. A person experienced in this field will recognize that the present inventive method can readily be applied, without further descriptive instruction, to predict or retrodict not just source rock quality, but also observed characteristics of other hydrocarbon system elements such as hydrocarbon seal rocks, coals, and carbonate reservoir rocks. All such variations will be deemed included in the appended claims.

A skilled artisan will further recognize that the present inventive method can be applied to systems where the production mechanism is weathering and erosion instead of biological growth; an example of this could be predicting sand grain composition and sand texture.

Description of Nodes

Tables A1-A4

TABLE A1

Root Nodes of the Network

| Node Name | Definition |
| --- | --- |
| Paleolatitude_Sunlight | Paleolatitude classes that determine the amount of sunlight reaching the earth's surface to fuel primary production of organic matter. |
| UpwellingAnnAvg | Annual average intensity of upwelling that provides nutrients for primary production of organic matter. |
| UpwellingSeasonality | Annual range of upwelling intensity that provides nutrients for primary production of organic matter. |
| Paleolatitude_Storms | Paleolatitude classes that determine the annual average amount of storm mixing and upwelling that supply nutrients to fuel primary production of organic matter. |
| Paleolatitude_Mixing | Paleolatitude classes that determine the annual average amount of water-mass mixing and upwelling that supply nutrients to fuel primary production of organic matter. |
| Surface Currents | Intensity of wind-induced surface currents that contribute to water mass mixing that contributes nutrients to fuel primary production of organic matter. |
| Restriction | Measure of the tortuosity of connection to the open ocean as a function of paleogeography. Restriction inhibits destruction of organic matter by decreasing influx of oxygen-rich open-ocean waters and enhancing oceanographic conditions for water-column stratification and evaporative cross flow. |

TABLE A1-continued

Root Nodes of the Network

| Node Name | Definition |
| --- | --- |
| Wetness, Annual Average | Annual average amount of precipitation-evaporation that affects organic-matter production through runoff, evaporative cross flow, and aeolian input, destruction through influence on water-column stratification, and dilution through controls on clastic sediment supply from land. |
| Wetness, Seasonality | Annual range in the amount of precipitation-evaporation that affects organic-matter production through runoff, evaporative cross flow, and aeolian input, destruction through influence on water-column stratification, and especially dilution through controls on clastic sediment supply from land. |
| Geological Age | Age of the interval of interest in millions of years. Geological age affects destruction and dilution through eustatic sea level and climate mode (icehouse, transition, hothouse). |
| Water Depth | Depth of water column that affects destruction through the distance organic matter travels from near surface to ocean floor as well as through effects on oxidant supply. Affects dilution through influence on chemical and biological sediment supply rates (i.e., benthic carbonates most likely to grow in shallow water depths. |
| Oceanality | Oceanality is a measure of distance from shoreline towards the center of the ocean. Calculated as the orthogonal distance from shoreline at each grid node. Affects destruction rates through influences on linear sedimentation rate (i.e., linear sedimentation rate generally decreases with increasing distance offshore). |
| SeaSurfaceTemperature, Annual Minimum | Annual minimum of sea-surface temperature that affects destruction through influence on development of water-column stratification. |
| SeaSurfaceTemperature, Seasonality | Annual range of sea-surface temperatures defined as summer temperature minus winter temperature. Affects destruction through influence on development of water-column stratification. | cf. FIG. 3 for a picture of network structure.

TABLE A2

Intermediate Nodes of the Network

| Node Name | Definition |
| --- | --- |
| Geologic Age_Plants | Age of the interval of interest in millions of years or geological period name. Geological age affects the character and distribution of land plants that in turn influences soil formation and erosional yield of clastics. These clastics are an important part of the dilution processes. |
| Water Supply | Total amount of water supplied by precipitation in excess of evaporation. Estimated as a combination of Wetness, Annual Average and Wetness, Seasonality node states. |
| Climate Mode | Estimate of the climate state of the earth during a particular period of earth history (e.g., Icehouse, Transition, Hothouse). |
| Eustatic Sea Level | Level of global sea level as a function of geological age. Rising and high eustatic sea levels are associated with observed source rocks. |
| Proximity to Land | Estimate of how far offshore a particular area is. Used to estimate sedimentation rates. |
| Sea Level Effects | Combination of effects of magnitude and rate of change of sea level on organic-matter destruction through oxidant supply. |
| Upwelling | Estimate of the vertical component of near-surface ocean currents induced by wind stress. Influences primary organic production through recycling nutrients into photic zone. |
| Cyclonic Mixing | Estimate of the vertical component of near-surface ocean currents induced by divergence of winds at the core of cyclonic storms (atmospheric low pressure systems). Influences primary organic production through recycling nutrients into photic zone. |
| Water Mass Mixing | Estimate of the vertical component of near-surface ocean currents induced by mixing of water masses of different densities and temperatures. Influences primary organic production through advecting nutrients into photic zone. |
| Runoff | Estimate of amount of excess precipitation over evaporation and infiltration available to carry coarse-grained clastics, fine-grained clastics, and nutrients from land into the ocean. Affects primary organic-matter production and dilution. |
| Evaporative Cross Flow | Estimate of the amount of nutrients supplied by evaporative cross flow-advective flows induced by evaporation in relatively restricted shelfal areas (Evaporation produces more dense water that sinks and drags surface waters into the area.) Affects supply of nutrients to fuel primary organic-matter production. |

TABLE A2-continued

Intermediate Nodes of the Network

| Node Name | Definition |
|---|---|
| Aeolian Input | Estimate of amount of nutrients supplied from land by wind transport. Process can be especially important for such limiting trace nutrients as iron. Affects supply of nutrients to fuel primary organic-matter production. |
| Deep Water Oxygenation | Oxygen content of deep waters that affect destruction of organic matter while on the sea floor and buried shallowly. |
| Water Column Stratification | Estimate of the stability of density stratification of the water column (due to thermal and/or chemical conditions). Stable water-column stratification inhibits resupply of oxygen through the water column by wind mixing at the sea surface, thereby decreasing destruction of organic matter. |
| Insolation | Total amount of sunlight reaching the surface of the earth annually. Sunlight provides the primary energy input for primary organic production. |
| Mixing, Total | Total amount of nutrients supplied by all mixing processes. Defined as combination of cyclonic and water-mass mixing. |
| Nutrients, Circulation | Total amount of nutrients supplied by all circulation processes. Defined as combination of Mixing, Total and Upwelling. |
| Nutrients, Other | Total amount of nutrients supplied by all other (non-circulation) processes. Defined as combination of Evaporative Cross Flow and Aeolian Input. |
| Nutrient Supply | Total amount of nutrient supply available to fuel primary organic-matter production. Defined by the combination of Nutrients, Circulation and Nutrients, Other. |
| Consumer Population | Estimate of size and effect of population of metazoan organisms that consume organic matter in the water column and in the sediment column. Important component of destruction processes. |
| Oxidant Supply | Supply rate of oxidants, including oxygen, sulfate, and iron. Oxidant supply rate is an important control on the ability of organisms to consume organic matter as well as on direct mineralization (destruction). |
| Clastic Transport Rate | Rate of transport of clastic materials to the depositional site as a function of eustatic sea level and precipitation amount and seasonal variation. This is a measure of the ability of the depositional sediment to move material generated upstream. |
| Clastic Supply Rate | Rate of supply of clastic materials to the depositional site as a function of clastic transport rate and land-plant influence. Land-plant influence controls the yield of clastic materials and clastic transport rate controls the delivery of clastic materials to the depositional site. |
| Chemical Supply Rate | Rate of supply of chemical materials (such as anhydrite, halite, sylvite, etc.) that dilute organic matter. Influenced by climatic wetness, geographic restriction, and water depth. |
| Biogenic Supply Rate-Benthic | Rate of supply of non-hydrogen-rich benthic biogenic material (such as calcite and aragonite in shells, corals, bryozoans, etc. that grow on a sea or lake bed) that dilute organic matter. Influenced mainly by water depth and annual minimum sea-surface temperature. |
| Biogenic Supply Rate-Pelagic | Rate of supply of non-hydrogen-rich pelagic biogenic material (such as calcite and aragonite in tests of foraminifera, coccolithophorids, diatom, etc. that grow in the photic zone of the water column of a sea or lake) that dilute organic matter. Influenced by all the same factors as Organic Matter Production, along with geological age. Geological age controls the type of pelagic organisms that occur and produce non-hydrogen-rich biogenic material. |
| Biogenic Supply Rate Total | Rate of supply of non-hydrogen-rich biogenic material (such as calcite and aragonite) of all organisms growing at a depositional site that dilute organic matter. Defined as the combination of Biogenic Supply Rate-Benthic and Biogenic Supply Rate-Pelagic. |
| Linear Sed Rate | Linear Sedimentation Rate is the rate of accumulation of sediment measured in a vertical plane. Defined as thickness of sediment divided by time duration of accumulation, typically reported in centimeters per thousand years (cm/ky) or meters per million years (m/My). |
| Marine Organic Production | Total amount of primary organic-matter production by marine processes. |
| Organic Production | Total amount of primary organic-matter production from all sources. |
| Destruction Processes | Combined magnitude of destruction of organic matter as a function of Consumer Population and Oxidant Supply. |
| Organic Destruction | Total amount of destruction of organic matter as a function of destruction processes and linear sedimentation rate. |
| Dilution of OM | Total amount of dilution of organic matter as a combination of clastic, chemical, and biological sediment supply. |

TABLE A2-continued

Intermediate Nodes of the Network

| Node Name | Definition |
|---|---|
| Retrodicted Lithology* | Lithology predicted from the interaction of production, destruction, and dilution processes. One of the key outputs of the network. |
| Total Organic C* | Amount of total organic carbon content defined as grams of organic carbon per grams of rock. Organic carbon content is a key attribute of a potential hydrocarbon source rock. |
| Hydrogen Index* | Estimate of hydrogen content of potential source rock, defined as milligrams of hydrocarbon divided by grams of organic carbon. Hydrogen index is a key attribute of a potential hydrocarbon source rock. |
| Source Rock Rating TOCHI* | Rating of potential source rock as a function of total organic carbon (TOC) and hydrogen index (HI). Rating states range from Poor Gas to Excellent Oil potential. In general, rocks with higher TOC and HI are more likely to yield oil. |

*indicates nodes that are key outputs of the system and may be considered also as Leaf Nodes

TABLE A3

Leaf Node of the Network

| Node Name | Definition |
|---|---|
| Oil/Gas Total Potential | Total potential of source rock in terms of oil versus gas source rock rating. Its two states are Oil Potential and Gas Potential. Oil Potential is a combination of Oil/Gas Transition, Poor Oil, Fair Oil, Good Oil, and Excellent Oil probability states from the parent Source Rock Rating TOCHI node. Gas Potential is a combination of Oil/Gas Transition, Poor Gas, Fair Gas, and Good Gas probability states from the parent Source Rock Rating TOCHI node. | cf. FIG. 3 for a picture of network structure.

TABLE A4

Network Structure

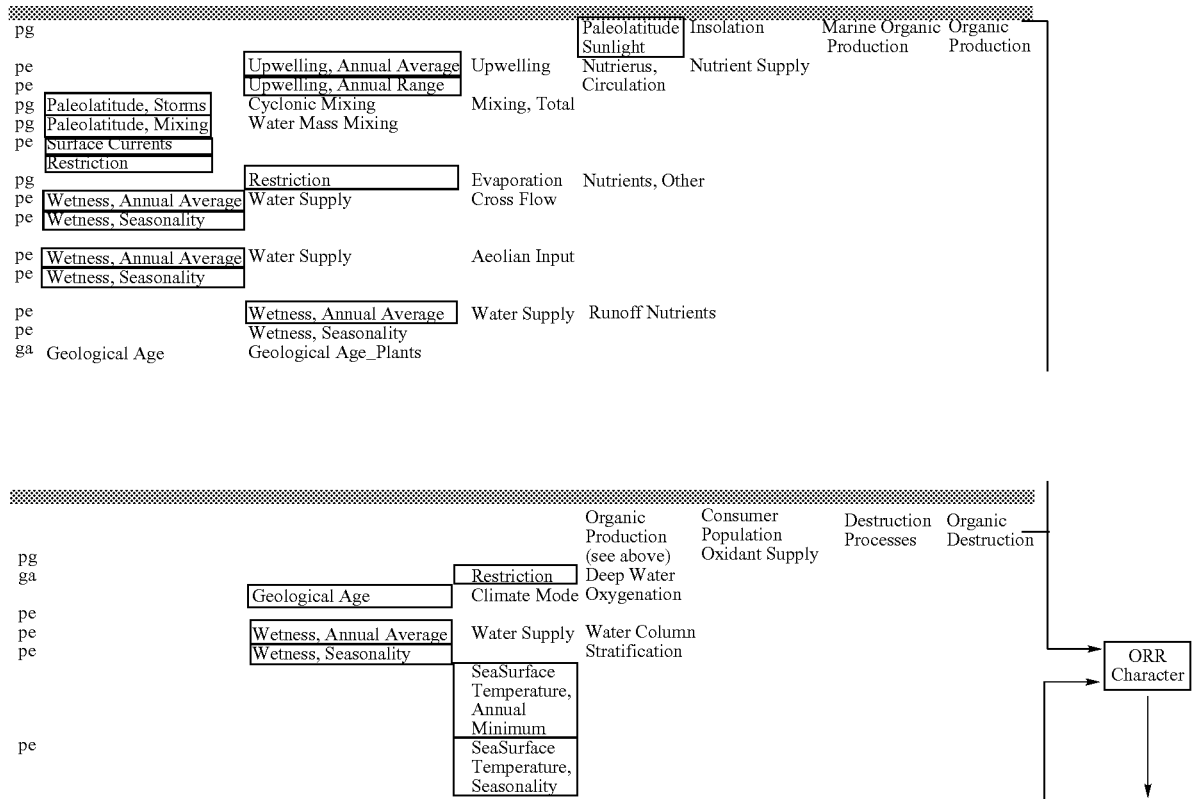

TABLE A4-continued

Network Structure

| | | | | | | | Source Rock Potential |
|---|---|---|---|---|---|---|---|
| ga | Geological Age | Eustatic Sea Level | Sea Level Effects | | | | |
| pg | | Water Depth | | | | | |
| ga | | Eustatic Sea Level | Clastic Transport Rate | Clastic Supply Rate | Linear Sedimentation Rate | Organic Dilution | |
| pe | | Wetness, Annual Average | | | | | |
| pe | | Wetness, Seasonality | | | | | |
| ga | | Geological Age | Geological Age_Plants | | | | |
| pg | | Restriction | Evaporative Cross Flow | Chemical Supply Rate | | | |
| pe | Wetness, Annual Average | Water Supply | | | | | |
| pe | Wetness, Seaonality | | | | | | |
| pg | | | Water Depth | | | | |
| pg | | Water Depth | Biogenic Supply Rate-Benthic | Biogenic Supply Rate Total | | | |
| pg | | SeaSurface Temperature, Annual Minimum | | | | | |
| | | Organic Production (see above) | Biogenic Supply Rate-Pelagic | | | | |
| | | Geological Age | | | | | |
| pg | | | Water Depth | Proximity to Land | | | |
| pg | | | Oceanality | | | | |

Input Factor Type | Root Node (input) | | intermediate node ga = Geological Age,
pg = Paleogeography,
pe = Paleo-environmental conditions Node States Tables B1-B3

TABLE B1

Root-Node States

| Node Name | Node State | Definition |
|---|---|---|
| Paleolatitude_Sunlight | Low | 0 to 30° latitude |
| | Middle | 30 to 60° latitude |
| | High | 60 to 90° latitude |
| UpwellingAnnAvg | Low | −51 to 0 m/day vertical velocity |
| | Middle | 0 to 10 m/day vertical velocity |
| | High | >10 m/day vertical velocity |
| UpwellingSeasonality | Low | 0 to 4 m/day vertical velocity difference between summer and winter upwelling intensity |
| | Middle | 4 to 12 m/day vertical velocity difference between summer and winter upwelling intensity |
| | High | >12 m/day vertical velocity difference between summer and winter upwelling intensity |
| Paleolatitude_Storms | 0-30/80-90° | Latitudes as shown at left |
| | 30-40/60-80° | Latitudes as shown at left |
| | 40-60° | Latitudes as shown at left |
| Paleolatitude_Mixing | 0.5° | Latitudes as shown at left |
| | 5-25° | Latitudes as shown at left |
| | 25-35° | Latitudes as shown at left |
| | 35-55° | Latitudes as shown at left |
| | 55-65° | Latitudes as shown at left |
| | 65-90° | Latitudes as shown at left |
| Surface Currents | Low | 0 to 37 cm/s |
| | Middle | 38 to 78 cm/s |
| | High | >78 cm/s |
| Restriction | Low | <50 grid cells in the shortest direction to the nearest open ocean |
| | Middle | 50-85 grid cells in the shortest direction to the nearest open ocean |
| | High | >85 grid cells in the shortest direction to the nearest open ocean |
| Wetness, Annual Average | Low | <20 cm/year |
| | Middle | 20-200 cm/year |
| | High | >200 cm/year |
| Wetness, Seasonality | Low | <5% change from summer to winter |
| | Middle | 5 to 20% change from summer to winter |
| | High | >20% change from summer to winter |
| Geological Age | Cambrian | 570 to 510 million years before present |
| | Orovician | 510 to 439 million years before present |

TABLE B1-continued

Root-Node States

| Node Name | Node State | Definition |
| --- | --- | --- |
| | Silurian | 439 to 408.5 million years before present |
| | Devonian | 408.5 to 362.5 million years before present |
| | Mississippian | 362.5 to 322.8 million years before present |
| | Pennsylvanian | 322.8 to 290 million years before present |
| | E. Permian | 290 to 256.1 million years before present |
| | M. L. Permian | 256.1 to 248.2 million years before present |
| | Triassic | 248.2 to 205.7 million years before present |
| | Jurassic | 205.7 to 144.2 million years before present |
| | E. Cretaceous | 144.2 to 98.9 million years before present |
| | L. Cretaceous | 98.9 to 65 million years before present |
| | Paleogene | 65 to 23.8 million years before present |
| | Neogene | <23.8 million years before present |
| Water Depth | Shelf | <200 m deep |
| | Slope | 200 to 2000 m deep |
| | Basin | >2000 m deep |
| Oceanality | Low | <4% of the value at the ocean center |
| | Mod | 4% to 12% of the value at the ocean center |
| | High | >12% of the value at the ocean center |
| SeaSurface Temperature, Annual Minimum | <5° C. | temperatures as at left |
| | <10° C. | temperatures as at left |
| | >11° C. | temperatures as at left |
| SeaSurface Temperature, Seasonality | Low | <4% change from summer to winter |
| | Mod | 4 to 12% change from summer to winter |
| | High | >12% change from summer to winter |

TABLE B2

Intermediate Node-States

| Node Name | Node State | Definition |
| --- | --- | --- |
| Geologic Age_Plants | Cambrian-Silurian | 570 to 408.5 million years before present |
| | Devonian | 408.5 to 362.5 million years before present |
| | Mississippian-Triassic | 362.5 to 205.7 million years before present |
| | Jurassic-Paleogene | 205.7 to 23.8 million years before present |
| | Neogene | <23.8 million years before present |
| Water Supply | Low | Equivalent to rainfall <20 cm/year & low seasonality |
| | Moderate | Equivalent to rainfall 20 to 200 cm/year & moderate seasonality |
| | High | Equivalent to rainfall >200 cm/year & low seasonality |
| Climate Mode | Hothouse | Climate mode with low equator to pole temperature gradient |
| | Transition | Climate mode with intermideate equator to pole temperature gradient |
| | Icehouse | Climate mode with high equator to pole temperature gradient |
| Eustatic Sea Level | Rapid Fall | >100 m/kyr |
| | Fall | 100 to 10 m/kyr |
| | Stable | <10 m/kyr |
| | Rise | 100 to 10 m/kyr |
| | Rapid Rise | >100 m/kyr |
| Proximity to Land | Low | Shelf water depth & Low oceanality |
| | Moderate | Shelf water depth & High oceanality |
| | High | Shelf water depth & High oceanality |
| Sea Level Effects | Negative | Rapid sea level fall & any water depth |
| | Neutral | Shelf water depth & rapid fall to fall sea level change |
| | Positive | Shelf water depth & rapid sea level rise |
| Upwelling | Low | Low Upwelling Annual Average & Low Upwelling Annual Range |
| | Middle | Middle Upwelling Annual Average & Low Upwelling Annual Range |
| | High | High Upwelling Annual Average & Low Upwelling Annual Range |
| Cyclonic Mixing | Low | Paleolatitude, Storms = 0-30/80-90° |
| | Moderate | Paleolatitude, Storms = 30-40/60-80° |
| | High | Paleolatitude, Storms = 40-60° |
| Water Mass Mixing | Low | Low restriction, Low surface currents, & Paleolatitude, Mixing = 65-90° |
| | Moderate | Moderate restriction, Moderate surface currents, & Paleolatitude, Mixing = 0-5° |
| | High | High restriction, High surface currents, & Paleolatitude, Mixing = 55-65° |
| Runoff | Low | Low water supply & Geological Age Plants = Cambrian-Silurian |
| | Middle | Moderate water supply & Geological Age Plants = Devonian |
| | High | High water supply & Geological Age Plants = Neogene |
| Evaporative Cross Flow | Low | Low restriction & Low water supply |
| | Moderate | Low restriction & High water supply |
| | High | High restriction & Low water supply |
| Aeolian Input | Low | High water supply |
| | Middle | Moderate water supply |
| | High | Low water supply |

TABLE B2-continued

Intermediate Node-States

| Node Name | Node State | Definition |
|---|---|---|
| Deep Water Oxygenation | Low | Hothouse climate mode & High restriction |
| | Moderate | Transition climate mode & Moderate restriction |
| | High | Icehouse climate mode & Low restriction |
| Water Column Stratification | Low | Sea surface temperature annual minimum <5° C. & any SST seasonality & any water supply |
| | Moderate | Sea surface temperature annual minimum <10° C. & moderate SST seasonality & low water supply |
| | High | Sea surface temperature annual minimum <11° C. & low SST seasonality & low water supply |
| Insolation | Low | High Wetness, Annual Average & High Paleolatitude, Sunlight |
| | Moderate | Low Wetness, Annual Average & High Paleolatitude, Sunlight |
| | High | Low Wetness, Annual Average & Low Paleolatitude, Sunlight |
| Mixing, Total | Low | Low Water Mass Mixing & Low Cyclonic Mixing |
| | Moderate | Moderate Water Mass Mixing & Moderate Cyclonic Mixing |
| | High | High Water Mass Mixing & High Cyclonic Mixing |
| Nutrients, Circulation | Low | Low Upwelling & Low Mixing, Total |
| | Moderate | Middle Upwelling & Low Mixing, Total |
| | High | High Upwelling & High Mixing, Total |
| Nutrients, Other | Low | Low Aeolian Input & Low Evaporative Cross Flow |
| | Moderate | Moderate Aeolian Input & Moderate Evaporative Cross Flow |
| | High | High Aeolian Input & High Evaporative Cross Flow |
| Nutrient Supply | Low | Low Nutrients, Circulation & Low Nutrients, Other & Low Runoff |
| | Moderate | Moderate Nutrients, Circulation & Moderate Nutrients, Other & Low Runoff |
| | High | High Nutrients, Circulation & High Nutrients, Other & High Runoff |
| Consumer Population | Low | Low Organic Production |
| | Moderate | Moderate Organic Production |
| | High | High Organic Production |
| Oxidant Supply | Low | High Water Column Stratification & Low Deep Water Oxygenation & +Sea Level Effects |
| | Moderate | Moderate Water Column Stratification & Moderate Deep Water Oxygenation & −Sea Level Effects |
| | High | Low Water Column Stratification & High Deep Water Oxygenation & −Sea Level Effects |
| Clastic Transport Rate | Low | Rapid Rise of Eustatic Sea Level & Low Wetness, Annual Average & Low Wetness, Seasonality |
| | Moderate | Stable Eustatic Sea Level & Moderate Wetness, Annual Average & Low Wetness, Seasonality |
| | High | Rapid Fall of Eustatic Sea Level & High Wetness, Annual Average & High Wetness, Seasonality |
| Clastic Supply Rate | Low | Low ClasticSupplyRate & Geological_Age_Plants = Neogene |
| | Moderate | Moderate ClasticSupplyRate & Geological_Age_Plants = Neogene |
| | High | High ClasticSupplyRate & Geological_Age_Plants = Cambrian-Silurian |
| Chemical Supply Rate | Low | Low Evaporative Cross Flow & Water Depth = Basin |
| | Moderate | High Evaporative Cross Flow & Water Depth = Shelf |
| | High | High Evaporative Cross Flow & Water Depth = Shelf |
| Biogenic Supply Rate-Benthic | Low | Water Depth = Basin & Sea Surface Temperature, Annual Minimum <5° C. |
| | Moderate | Water Depth = Shelf & Sea Surface Temperature, Annual Minimum <10° C. |
| | High | Water Depth = Shelf & Sea Surface Temperature, Annual Minimum <11° C. |
| Biogenic Supply Rate-Benthic | Low | Low Organic Production & Geological Age = Cambrian |
| | Moderate | High Organic Production & Geological Age = Triassic |
| | High | High Organic Production & Geological Age = Neogene |
| Biogenic Supply Rate Total | Low | Low Biogenic Supply Rate-Benthic & Low Biogenic Supply Rate-Benthic |
| | Moderate | Low Biogenic Supply Rate-Benthic & Low Biogenic Supply Rate-Benthic |
| | High | Low Biogenic Supply Rate-Benthic & Low Biogenic Supply Rate-Benthic |
| Linear Sed Rate | V_Low (<5 m/My) | Low Clastic Supply Rate & Low Chemical Supply Rate & Low Biogenic Supply Rate Total & Low Proximity to Land |
| | Low (5-10 m/My) | Moderate Clastic Supply Rate & Moderate Chemical Supply Rate & Low Biogenic Supply Rate Total & Moderate Proximity to Land |
| | Mod (11-75 m/My) | Moderate Clastic Supply Rate & High Chemical Supply Rate & Moderate Biogenic Supply Rate Total & Moderate Proximity to Land |
| | High (76-150 m/My) | Moderate Clastic Supply Rate & High Chemical Supply Rate & High Biogenic Supply Rate Total & High Proximity to Land |
| | V-High (>151 m/My) | High Clastic Supply Rate & High Chemical Supply Rate & High Biogenic Supply Rate Total & High Proximity to Land |
| Marine Organic Production | Low | Low Nutrient Supply & Low Insolation |
| | Moderate | Moderate Nutrient Supply & High Insolation |
| | High | High Nutrient Supply & High Insolation |
| Organic Production | Low | Low Marine Organic Production |
| | Moderate | Moderate Marine Organic Production |
| | High | High Marine Organic Production |
| Destruction Processes | Low | Low Consumer Population & Low Oxidant Supply |
| | Moderate | Moderate Consumer Population & Moderate Oxidant Supply |
| | High | High Consumer Population & High Oxidant Supply |
| Organic Destruction | Low | High Linear Sed Rate & Low Destruction Processes |
| | Moderate | Low Linear Sed Rate & Moderate Destruction Processes |
| | High | V_Low Linear Sed Rate & High Destruction Processes |
| Dilution of OM | V. Low | V_Low Linear Sed Rate |
| | Low | Low Linear Sed Rate |

TABLE B2-continued

Intermediate Node-States

| Node Name | Node State | Definition |
|---|---|---|
| | Moderate | Moderate Linear Sed Rate |
| | High | V_High Linear Sed Rate |
| Retrodicted Lithology | Thin_ORR | Low Organic Production & Low Destruction & Low Dilution of OM |
| | Rich_ORR | Moderate Organic Production & Low Destruction & Low Dilution of OM |
| | ORR | Moderate Organic Production & Moderate Destruction & Low Dilution of OM |
| | ORR_Shale | Moderate Organic Production & Moderate Destruction & Moderate Dilution of OM |
| | Chalk_Chert_ORR | High Organic Production & Low Destruction & Low Dilution of OM |
| | Chalk_Chert | High Organic Production & High Destruction & Low Dilution of OM |
| | Marl_Porcelanite | High Organic Production & High Destruction & Moderate Dilution of OM |
| | Shale_Zs_Ss | Moderate Organic Production & High Destruction & High Dilution of OM |
| | Shale | Moderate Organic Production & High Destruction & Moderate Dilution of OM |
| | Sh_Zs_Ss_Marl_Porcelar | Low Organic Production & High Destruction & High V_Low Dilution of OM |
| Total Organic C (weight %) | 0 to 0.5 | Retrodicted Lithology = Sh_Zs_Ss_Marl_Porcelanite |
| | 0.5 to 1.5 | Retrodicted Lithology = Marl_Porcelanite |
| | 1.5 to 3 | Retrodicted Lithology = Chalk_Chert_ORR |
| | 3 to 6 | Retrodicted Lithology = ORR |
| | 6 to 100 | Retrodicted Lithology = Rich_ORR |
| Hydrogen Index (mgHC/gTOC) | 0 to 200 | Retrodicted Lithology = Sh_Zs_Ss_Marl_Porcelanite |
| | 200 to 300 | Retrodicted Lithology = Chalk_Chert_ORR |
| | 300 to 600 | Retrodicted Lithology = ORR |
| | 600 to 1000 | Retrodicted Lithology = Rich_ORR |
| Source Rock Rating TOCHI | Poor Gas | Total Organic C = 0 to 0.5 & Hydrogen Index = 0 to 200 |
| | Fair Gas | Total Organic C = 1.5 to 3 & Hydrogen Index = 0 to 200 |
| | Good Gas | Total Organic C > 6 & Hydrogen Index = 0 to 200 |
| | Transition Oil-Gas | Total Organic C = 3 to 6 & Hydrogen Index = 200 to 300 |
| | Poor Oil | Total Organic C = 0.5 to 1.5 & Hydrogen Index = 300 to 600 |
| | Fair Oil | Total Organic C = 1.5 to 3 & Hydrogen Index = 300 to 600 |
| | Good Oil | Total Organic C = 1.5 to 3 & Hydrogen Index > 600 |
| | Excellent Oil | Total Organic C > 6 & Hydrogen Index > 600 |

TABLE B3

Leaf-Node States

| Node Name | Node State | Definition |
|---|---|---|
| Oil-Gas Total Potential | Oil Total | Poor oil + Fair oil + Good oil + Excellent oil + [0.5 × (Transition Oil-Gas)] |
| | Gas Total | Poor gas + Fair gas + Good oil + [0.5 × (Transition Oil-Gas)] |

Node Probability Distribution

Tables R1-R14, I1-I37

TABLE R1

Probability Table for Root Node "Paleolatitude_Sunlight"

| paleolat_sunlight | Low | Mod | High |
|---|---|---|---|
| 0 to 30 | 0.97 | 0.02 | 0.01 |
| 30 to 60 | 0.02 | 0.97 | 0.01 |
| 60 to 90 | 0.01 | 0.02 | 0.97 |

TABLE R2

Probability Table for Root Node "Upwelling, Annual Average"

| aupwell | Low | Mod | High |
|---|---|---|---|
| −50 to −3 | 0.97 | 0.02 | 0.01 |
| −3 to 12 | 0.02 | 0.97 | 0.01 |
| 12 to 99 | 0.01 | 0.02 | 0.97 |

TABLE R3

Probability Table for Root Node "UpwellingSeasonality"

| delta_upwelling | Low | Mod | High |
|---|---|---|---|
| −50 to 4 | 0.97 | 0.02 | 0.01 |
| 4 to 20 | 0.02 | 0.97 | 0.01 |
| 20 to 99 | 0.01 | 0.02 | 0.97 |

TABLE R4

Probability Table for Root Node "Paleolatitude, Storms"

| paleolat_storms | 0-30/80-90 | 30-40/60-80 | 40-60 |
|---|---|---|---|
| 0 to 30 | 0.97 | 0.02 | 0.01 |
| 30 to 40 | 0.01 | 0.97 | 0.02 |
| 40 to 60 | 0.01 | 0.02 | 0.97 |
| 60 to 80 | 0.01 | 0.97 | 0.02 |
| 80 to 90 | 0.97 | 0.02 | 0.01 |

TABLE R5

Probability Table for Root Node "Paleolatitude_Mixing"

| Paleolatitude_Mixing | 0 to 5 | 5 to 25 | 25 to 35 | 35 to 55 | 55 to 65 | 65 to 90 |
|---|---|---|---|---|---|---|
| | 0.166667 | 0.166667 | 0.166667 | 0.166667 | 0.166667 | 0.166667 |

TABLE R6

Probability Table for Root Node "Surface Currents"

| awater_vectors | Low | Mod | High |
|---|---|---|---|
| 0 to 37 | 0.97 | 0.02 | 0.01 |
| 37 to 78 | 0.02 | 0.97 | 0.01 |
| 78 to 128 | 0.01 | 0.02 | 0.97 |

TABLE R7

Probability Table for Root Node "Restriction"

| srestrict | Low | Mod | High |
|---|---|---|---|
| −150 to 50 | 0.97 | 0.02 | 0.01 |
| 50 to 85 | 0.02 | 0.97 | 0.01 |
| 85 to 199 | 0.01 | 0.02 | 0.97 |

TABLE R8

Probability Table for Root Node "Wetness, Annual Average"

| awet | Low | Mod | High |
|---|---|---|---|
| −50 to 2 | 0.97 | 0.02 | 0.01 |
| 2 to 20 | 0.02 | 0.97 | 0.01 |
| 20 to 99 | 0.01 | 0.02 | 0.97 |

TABLE R9

Probability Table for Root Node "Wetness, Seasonality"

| delta_wet | Low | Mod | High |
|---|---|---|---|
| −1 to 4 | 0.97 | 0.02 | 0.01 |
| 4 to 17 | 0.02 | 0.97 | 0.01 |
| 17 to 99 | 0.01 | 0.02 | 0.97 |

TABLE R10

Probability Table for Root Node "Geological Age"

| Geologic_Age | Cambrian Silurian | Devonian | Miss Triassic | Jurassic Paleogene | Neogene |
|---|---|---|---|---|---|
| Cambrian | 1 | 0 | 0 | 0 | 0 |
| Ordovician | 1 | 0 | 0 | 0 | 0 |
| Silurian | 1 | 0 | 0 | 0 | 0 |
| Devonian | 0 | 1 | 0 | 0 | 0 |
| Mississippian | 0 | 0 | 1 | 0 | 0 |
| Pennsylvanian | 0 | 0 | 1 | 0 | 0 |
| E. Permian | 0 | 0 | 1 | 0 | 0 |
| M, L Permian | 0 | 0 | 1 | 0 | 0 |
| Triassic | 0 | 0 | 1 | 0 | 0 |
| Jurassic | 0 | 0 | 0 | 1 | 0 |
| E. Cretaceous | 0 | 0 | 0 | 1 | 0 |
| L. Cretaceous | 0 | 0 | 0 | 1 | 0 |
| Paleogene | 0 | 0 | 0 | 1 | 0 |
| Neoene | 0 | 0 | 0 | 0 | 1 |

TABLE R11

Probability Table for Root Node "Water Depth"

| GRIDCODE | Basin | Slope | Shelf |
|---|---|---|---|
| 0 to 1.5 | 0.9 | 0.09 | 0.01 |
| 1.5 to 3 | 0.01 | 0.02 | 0.97 |

TABLE R12

Probability Table for Root Node "Oceanality"

| ocean_map | Low | Mod | High |
|---|---|---|---|
| −1 to 4 | 0.97 | 0.02 | 0.01 |
| 4 to 12 | 0.02 | 0.97 | 0.01 |
| 12 to 99 | 0.01 | 0.02 | 0.97 |

TABLE R13

Probability Table for Root Node "SeaSurfaceTemperature, Annual Minimum"

| aseatemp | <5 deg C. | <10 deg C. | >11 deg C. |
|---|---|---|---|
| −9 to 5 | 0.97 | 0.02 | 0.01 |
| 5 to 10 | 0.02 | 0.97 | 0.01 |
| 10 to 99 | 0.01 | 0.02 | 0.97 |

TABLE R14

Probability Table for Root Node "SeaSurfaceTemperature, Seasonality"

| delta_seatmp | Low | Mod | High |
|---|---|---|---|
| −1 to 4 | 0.97 | 0.02 | 0.01 |
| 4 to 12 | 0.02 | 0.97 | 0.01 |
| 12 to 99 | 0.01 | 0.02 | 0.97 |

TABLE I-1

Probability Table for Node "Geologic Age_Plants"

| Geologic_Age | Cambrian Silurian | Devonian | Miss Triassic | Jurassic Paleogene | Neogene |
|---|---|---|---|---|---|
| Cambrian | 1 | 0 | 0 | 0 | 0 |
| Ordovician | 1 | 0 | 0 | 0 | 0 |
| Silurian | 1 | 0 | 0 | 0 | 0 |
| Devonian | 0 | 1 | 0 | 0 | 0 |
| Mississippian | 0 | 0 | 1 | 0 | 0 |
| Pennsylvanian | 0 | 0 | 1 | 0 | 0 |
| E. Permian | 0 | 0 | 1 | 0 | 0 |
| M, L Permian | 0 | 0 | 1 | 0 | 0 |
| Triassic | 0 | 0 | 1 | 0 | 0 |
| Jurassic | 0 | 0 | 0 | 1 | 0 |
| E. Cretaceous | 0 | 0 | 0 | 1 | 0 |
| L. Cretaceous | 0 | 0 | 0 | 1 | 0 |
| Paleogene | 0 | 0 | 0 | 1 | 0 |
| Neogene | 0 | 0 | 0 | 0 | 1 |

TABLE I-2

Probability Table for Node "Water Supply"

| Wetness, Seasonality | Wetness, Annual Avg | Low | Mod | High |
|---|---|---|---|---|
| Low | Low | 0.95 | 0.04 | 0.01 |
| Low | Mod | 0.03 | 0.95 | 0.02 |
| Low | High | 0.01 | 0.04 | 0.95 |
| Mod | Low | 0.9 | 0.07 | 0.03 |
| Mod | Mod | 0.025 | 0.95 | 0.025 |
| Mod | High | 0.03 | 0.07 | 0.9 |
| High | Low | 0.9 | 0.07 | 0.03 |
| High | Mod | 0.1 | 0.85 | 0.05 |
| High | High | 0.05 | 0.1 | 0.85 |

TABLE I-3

Probability Table for Node "Climate Mode"

| Geologic_Age | Hothouse | Transition | Icehouse |
|---|---|---|---|
| Cambrian | 0.1 | 0.8 | 0.1 |
| Ordovician | 0.1 | 0.7 | 0.2 |
| Silurian | 0.15 | 0.7 | 0.15 |
| Devonian | 0.3 | 0.5 | 0.2 |
| Mississippian | 0.1 | 0.7 | 0.2 |
| Pennsylvanian | 0.05 | 0.1 | 0.85 |
| E. Permian | 0.05 | 0.15 | 0.8 |
| M, L Permian | 0.2 | 0.6 | 0.2 |
| Triassic | 0.15 | 0.7 | 0.15 |
| Jurassic | 0.8 | 0.15 | 0.05 |
| E. Cretaceous | 0.7 | 0.25 | 0.05 |
| L. Cretaceous | 0.9 | 0.07 | 0.03 |
| Paleogene | 0.85 | 0.1 | 0.05 |
| Neogene | 0.05 | 0.6 | 0.35 |

TABLE I-4

Probability Table for Node "Eustatic Sea Level"

| Geologic_Age | rapid fall | fall | stable | rise | rapid rise |
|---|---|---|---|---|---|
| Cambrian | 0.003 | 0.003 | 0.004 | 0.19 | 0.8 |
| Ordovician | 0.003 | 0.003 | 0.004 | 0.8 | 0.19 |
| Silurian | 0.02 | 0.8 | 0.06 | 0.1 | 0.02 |
| Devonian | 0.02 | 0.8 | 0.06 | 0.1 | 0.02 |
| Mississippian | 0.02 | 0.8 | 0.06 | 0.1 | 0.02 |
| Pennsylvanian | 0.01 | 0.09 | 0.8 | 0.09 | 0.01 |
| E. Permian | 0.01 | 0.09 | 0.8 | 0.09 | 0.01 |
| M, L Permian | 0.02 | 0.8 | 0.06 | 0.1 | 0.02 |
| Triassic | 0.01 | 0.09 | 0.8 | 0.09 | 0.01 |
| Jurassic | 0.04 | 0.04 | 0.02 | 0.8 | 0.1 |
| E. Cretaceous | 0.04 | 0.04 | 0.02 | 0.8 | 0.1 |
| L. Cretaceous | 0.01 | 0.09 | 0.8 | 0.09 | 0.01 |
| Paleogene | 0.02 | 0.8 | 0.06 | 0.1 | 0.02 |
| Neogene | 0.4 | 0.2 | 0.1 | 0.2 | 0.1 |

TABLE I-5

Probability Table for Node "Proximity to Land"

| Water Depth | Oceanality | Low | Mod | High |
|---|---|---|---|---|
| Basin | Low | 0.2 | 0.7 | 0.1 |
| Slope | Mod | 0.8 | 0.19 | 0.01 |
| Shelf | High | 0.99 | 0.0075 | 0.0025 |
| Basin | Low | 0.08 | 0.9 | 0.02 |
| Slope | Mod | 0.1 | 0.85 | 0.05 |
| Shelf | High | 0.97 | 0.02 | 0.01 |
| Basin | Low | 0.0025 | 0.0075 | 0.99 |
| Slope | Mod | 0.02 | 0.08 | 0.9 |
| Shelf | High | 0.05 | 0.15 | 0.8 |

TABLE I-6

Probability Table for Node "Sea Level Effects"

| EustaticSeaLevel | Water Depth | Negative | Neutral | Positive |
|---|---|---|---|---|
| rapid fall | Basin | 0.6 | 0.1 | 0.3 |
| rapid fall | Slope | 0.7 | 0.1 | 0.2 |
| rapid fall | Shelf | 0.6 | 0.3 | 0.1 |
| fall | Basin | 0.1 | 0.15 | 0.75 |
| fall | Slope | 0.2 | 0.1 | 0.7 |
| fall | Shelf | 0.1 | 0.3 | 0.6 |
| stable | Basin | 0.05 | 0.15 | 0.8 |
| stable | Slope | 0.05 | 0.1 | 0.85 |
| stable | Shelf | 0.03 | 0.07 | 0.9 |
| rise | Basin | 0.15 | 0.1 | 0.75 |
| rise | Slope | 0.03 | 0.07 | 0.9 |
| rise | Shelf | 0.01 | 0.04 | 0.95 |
| rapid rise | Basin | 0.15 | 0.1 | 0.75 |
| rapid rise | Slope | 0.03 | 0.07 | 0.9 |
| rapid rise | Shelf | 0.0025 | 0.0075 | 0.99 |

TABLE I-7

Probability Table for Node "Upwelling"

| Upwelling, Annual | Upwelling, range | Low | Middle | High |
|---|---|---|---|---|
| Low | Low | 0.95 | 0.04 | 0.01 |
| Low | Middle | 0.8 | 0.15 | 0.05 |
| Low | High | 0.7 | 0.2 | 0.1 |
| Mod | Low | 0.02 | 0.95 | 0.03 |
| Mod | Middle | 0.1 | 0.85 | 0.05 |
| Mod | High | 0.1 | 0.75 | 0.15 |
| High | Low | 0.01 | 0.04 | 0.95 |
| High | Middle | 0.05 | 0.1 | 0.85 |
| High | High | 0.1 | 0.15 | 0.75 |

TABLE I-8

Probability Table for Node "Cyclonic Mixing"

| Paleolatitude_Storms | Low | Mod | High |
|---|---|---|---|
| 0-30/80-90 | 0.9 | 0.07 | 0.03 |
| 30-40/60-80 | 0.03 | 0.9 | 0.07 |
| 40-60 | 0.0025 | 0.0075 | 0.99 |

TABLE I-9

Probability Table for Node "Water Mass Mixing"

| Restriction | Surface Currents | Paleolatitude_Mixing | Low | Mod | High |
|---|---|---|---|---|---|
| Low | Low | 0 to 5 | 0.85 | 0.1 | 0.05 |
| Low | Low | 5 to 25 | 0.9 | 0.07 | 0.03 |
| Low | Low | 25 to 35 | 0.85 | 0.1 | 0.05 |
| Low | Low | 35 to 55 | 0.9 | 0.07 | 0.03 |
| Low | Low | 55 to 65 | 0.85 | 0.1 | 0.05 |
| Low | Low | 65 to 90 | 0.9 | 0.07 | 0.03 |
| Low | Mod | 0 to 5 | 0.8 | 0.15 | 0.05 |
| Low | Mod | 5 to 25 | 0.85 | 0.1 | 0.05 |
| Low | Mod | 25 to 35 | 0.8 | 0.15 | 0.05 |
| Low | Mod | 35 to 55 | 0.85 | 0.1 | 0.05 |
| Low | Mod | 55 to 65 | 0.8 | 0.15 | 0.05 |
| Low | Mod | 65 to 90 | 0.85 | 0.1 | 0.05 |
| Low | High | 0 to 5 | 0.75 | 0.2 | 0.05 |
| Low | High | 5 to 25 | 0.8 | 0.15 | 0.05 |
| Low | High | 25 to 35 | 0.75 | 0.2 | 0.05 |
| Low | High | 35 to 55 | 0.8 | 0.15 | 0.05 |
| Low | High | 55 to 65 | 0.75 | 0.2 | 0.05 |
| Low | High | 65 to 90 | 0.8 | 0.15 | 0.05 |
| Mod | Low | 0 to 5 | 0.8 | 0.15 | 0.05 |
| Mod | Low | 5 to 25 | 0.85 | 0.1 | 0.05 |

TABLE I-9-continued

Probability Table for Node "Water Mass Mixing"

| Restriction | Surface Currents | Paleolatitude_Mixing | Low | Mod | High |
|---|---|---|---|---|---|
| Mod | Low | 25 to 35 | 0.8 | 0.15 | 0.05 |
| Mod | Low | 35 to 55 | 0.85 | 0.1 | 0.05 |
| Mod | Low | 55 to 65 | 0.8 | 0.15 | 0.05 |
| Mod | Low | 65 to 90 | 0.85 | 0.1 | 0.05 |
| Mod | Mod | 0 to 5 | 0.1 | 0.7 | 0.2 |
| Mod | Mod | 5 to 25 | 0.2 | 0.65 | 0.15 |
| Mod | Mod | 25 to 35 | 0.1 | 0.7 | 0.2 |
| Mod | Mod | 35 to 55 | 0.2 | 0.65 | 0.15 |
| Mod | Mod | 55 to 65 | 0.1 | 0.7 | 0.2 |
| Mod | Mod | 65 to 90 | 0.2 | 0.65 | 0.15 |
| Mod | High | 0 to 5 | 0.01 | 0.04 | 0.95 |
| Mod | High | 5 to 25 | 0.03 | 0.07 | 0.9 |
| Mod | High | 25 to 35 | 0.01 | 0.04 | 0.95 |
| Mod | High | 35 to 55 | 0.03 | 0.07 | 0.9 |
| Mod | High | 55 to 65 | 0.01 | 0.04 | 0.95 |
| Mod | High | 65 to 90 | 0.03 | 0.07 | 0.9 |
| High | Low | 0 to 5 | 0.65 | 0.3 | 0.05 |
| High | Low | 5 to 25 | 0.7 | 0.25 | 0.05 |
| High | Low | 25 to 35 | 0.65 | 0.3 | 0.05 |
| High | Low | 35 to 55 | 0.7 | 0.25 | 0.05 |
| High | Low | 55 to 65 | 0.65 | 0.3 | 0.05 |
| High | Low | 65 to 90 | 0.7 | 0.25 | 0.05 |
| High | Mod | 0 to 5 | 0.55 | 0.35 | 0.1 |
| High | Mod | 5 to 25 | 0.6 | 0.3 | 0.1 |
| High | Mod | 25 to 35 | 0.55 | 0.35 | 0.1 |
| High | Mod | 35 to 55 | 0.6 | 0.3 | 0.1 |
| High | Mod | 55 to 65 | 0.55 | 0.35 | 0.1 |
| High | Mod | 65 to 90 | 0.6 | 0.3 | 0.1 |
| High | High | 0 to 5 | 0.45 | 0.4 | 0.15 |
| High | High | 5 to 25 | 0.5 | 0.35 | 0.15 |
| High | High | 25 to 35 | 0.45 | 0.4 | 0.15 |
| High | High | 35 to 55 | 0.5 | 0.35 | 0.15 |
| High | High | 55 to 65 | 0.45 | 0.4 | 0.15 |
| High | High | 65 to 90 | 0.5 | 0.35 | 0.15 |

TABLE I-10

Probability Table for Node "Runoff"

| WaterSupply | Geologic_Age_Plants | Low | Middle | High |
|---|---|---|---|---|
| Low | Cambrian Silurian | 0.95 | 0.04 | 0.01 |
| Low | Devonian | 0.9 | 0.08 | 0.02 |
| Low | Miss Triassic | 0.81 | 0.16 | 0.03 |
| Low | Jurassic Paleogene | 0.76 | 0.2 | 0.04 |
| Low | Neogene | 0.7 | 0.25 | 0.05 |
| Mod | Cambrian Silurian | 0.02 | 0.95 | 0.03 |
| Mod | Devonian | 0.02 | 0.95 | 0.03 |
| Mod | Miss Triassic | 0.02 | 0.94 | 0.04 |
| Mod | Jurassic Paleogene | 0.02 | 0.93 | 0.05 |
| Mod | Neogene | 0.02 | 0.88 | 0.1 |
| High | Cambrian Silurian | 0.01 | 0.09 | 0.9 |
| High | Devonian | 0.01 | 0.09 | 0.9 |
| High | Miss Triassic | 0.01 | 0.09 | 0.9 |
| High | Jurassic Paleogene | 0.01 | 0.04 | 0.95 |
| High | Neogene | 0.01 | 0.04 | 0.95 |

TABLE I-11

Probability Table for Node "Evaporative Cross Flow"

| Restriction | WaterSupply | Low | Mod | High |
|---|---|---|---|---|
| Low | Low | 0.25 | 0.65 | 0.1 |
| Low | Mod | 0.25 | 0.65 | 0.1 |
| Low | High | 0.25 | 0.65 | 0.1 |
| Mod | Low | 0.05 | 0.2 | 0.75 |
| Mod | Mod | 0.05 | 0.2 | 0.75 |
| Mod | High | 0.05 | 0.2 | 0.75 |
| High | Low | 0.03 | 0.07 | 0.9 |
| High | Mod | 0.03 | 0.07 | 0.9 |
| High | High | 0.03 | 0.07 | 0.9 |

TABLE I-12

Probability Table for Node "Aeolian Input"

| WaterSupply | Low | Mod | High |
|---|---|---|---|
| Low | 0.03 | 0.07 | 0.9 |
| Mod | 0.15 | 0.75 | 0.1 |
| High | 0.9 | 0.07 | 0.03 |

TABLE I-13

Probability Table for Node "Deep Water Oxygenation"

| ClimateMode | Restriction | Low | Mod | High |
|---|---|---|---|---|
| Hothouse | Low | 0.7 | 0.2 | 0.1 |
| Hothouse | Mod | 0.75 | 0.2 | 0.05 |
| Hothouse | High | 0.85 | 0.12 | 0.03 |
| Transition | Low | 0.25 | 0.5 | 0.25 |
| Transition | Mod | 0.25 | 0.5 | 0.25 |
| Transition | High | 0.6 | 0.25 | 0.15 |
| Icehouse | Low | 0.01 | 0.04 | 0.95 |
| Icehouse | Mod | 0.05 | 0.15 | 0.8 |
| Icehouse | High | 0.65 | 0.25 | 0.1 |

TABLE I-14

Probability Table for Node "Water Column Stratification"

| SST, Annual Minimum | SST, Seasonality | Water Supply | Low | Mod | High |
|---|---|---|---|---|---|
| <5 deg C. | Low | Low | 0.95 | 0.03 | 0.02 |
| <5 deg C. | Low | Mod | 0.95 | 0.03 | 0.02 |
| <5 deg C. | Low | High | 0.95 | 0.03 | 0.02 |
| <5 deg C. | Mod | Low | 0.95 | 0.03 | 0.02 |
| <5 deg C. | Mod | Mod | 0.95 | 0.03 | 0.02 |
| <5 deg C. | Mod | High | 0.95 | 0.03 | 0.02 |
| <5 deg C. | High | Low | 0.95 | 0.03 | 0.02 |
| <5 deg C. | High | Mod | 0.95 | 0.03 | 0.02 |
| <5 deg C. | High | High | 0.95 | 0.03 | 0.02 |
| <10 deg C. | Low | Low | 0.03 | 0.07 | 0.9 |
| <10 deg C. | Low | Mod | 0.05 | 0.1 | 0.85 |
| <10 deg C. | Low | High | 0.1 | 0.1 | 0.8 |
| <10 deg C. | Mod | Low | 0.03 | 0.9 | 0.07 |
| <10 deg C. | Mod | Mod | 0.05 | 0.85 | 0.1 |
| <10 deg C. | Mod | High | 0.1 | 0.8 | 0.1 |
| <10 deg C. | High | Low | 0.6 | 0.3 | 0.1 |
| <10 deg C. | High | Mod | 0.5 | 0.4 | 0.1 |
| <10 deg C. | High | High | 0.4 | 0.4 | 0.2 |
| >11 deg C. | Low | Low | 0.005 | 0.005 | 0.99 |
| >11 deg C. | Low | Mod | 0.005 | 0.005 | 0.99 |
| >11 deg C. | Low | High | 0.01 | 0.01 | 0.98 |
| >11 deg C. | Mod | Low | 0.01 | 0.04 | 0.95 |
| >11 deg C. | Mod | Mod | 0.03 | 0.07 | 0.9 |
| >11 deg C. | Mod | High | 0.05 | 0.1 | 0.85 |
| >11 deg C. | High | Low | 0.03 | 0.07 | 0.9 |
| >11 deg C. | High | Mod | 0.02 | 0.05 | 0.93 |
| >11 deg C. | High | High | 0.01 | 0.03 | 0.96 |

TABLE I-15

Probability Table for Node "Insolation"

| Wetness, Annual Avg | Paleolatitude_sunlight | Geologic_Age | Low | Mod | High |
|---|---|---|---|---|---|
| Low | Low | Cambrian | 0.01 | 0.05 | 0.94 |
| Low | Low | Ordovician | 0.01 | 0.05 | 0.94 |
| Low | Low | Silurian | 0.01 | 0.05 | 0.94 |
| Low | Low | Devonian | 0.01 | 0.04 | 0.95 |
| Low | Low | Mississippian | 0.01 | 0.04 | 0.95 |
| Low | Low | Pennsylvanian | 0.01 | 0.04 | 0.95 |
| Low | Low | E. Permian | 0.01 | 0.03 | 0.96 |
| Low | Low | M, L Permian | 0.01 | 0.03 | 0.96 |
| Low | Low | Triassic | 0.01 | 0.03 | 0.96 |
| Low | Low | Jurassic | 0.01 | 0.03 | 0.97 |
| Low | Low | E. Cretaceous | 0.01 | 0.03 | 0.97 |
| Low | Low | L. Cretaceous | 0.01 | 0.03 | 0.97 |
| Low | Low | Paleogene | 0.005 | 0.01 | 0.99 |
| Low | Low | Neogene | 0.005 | 0.01 | 0.99 |
| Low | Middle | Cambrian | 0.02 | 0.07 | 0.91 |
| Low | Middle | Ordovician | 0.02 | 0.07 | 0.91 |
| Low | Middle | Silurian | 0.02 | 0.07 | 0.91 |
| Low | Middle | Devonian | 0.02 | 0.06 | 0.92 |
| Low | Middle | Mississippian | 0.02 | 0.06 | 0.92 |
| Low | Middle | Pennsylvanian | 0.02 | 0.06 | 0.92 |
| Low | Middle | E. Permian | 0.01 | 0.06 | 0.93 |
| Low | Middle | M, L Permian | 0.01 | 0.06 | 0.93 |
| Low | Middle | Triassic | 0.01 | 0.06 | 0.93 |
| Low | Middle | Jurassic | 0.01 | 0.05 | 0.94 |
| Low | Middle | E. Cretaceous | 0.01 | 0.05 | 0.94 |
| Low | Middle | L. Cretaceous | 0.01 | 0.05 | 0.94 |
| Low | Middle | Paleogene | 0.01 | 0.04 | 0.95 |
| Low | Middle | Neogene | 0.01 | 0.04 | 0.95 |
| Low | High | Cambrian | 0.05 | 0.15 | 0.8 |
| Low | High | Ordovician | 0.05 | 0.15 | 0.8 |
| Low | High | Silurian | 0.05 | 0.15 | 0.8 |
| Low | High | Devonian | 0.05 | 0.14 | 0.81 |
| Low | High | Mississippian | 0.05 | 0.14 | 0.81 |
| Low | High | Pennsylvanian | 0.05 | 0.14 | 0.81 |
| Low | High | E. Permian | 0.05 | 0.13 | 0.82 |
| Low | High | M, L Permian | 0.05 | 0.13 | 0.82 |
| Low | High | Triassic | 0.05 | 0.13 | 0.82 |
| Low | High | Jurassic | 0.05 | 0.12 | 0.83 |
| Low | High | E. Cretaceous | 0.05 | 0.12 | 0.83 |
| Low | High | L. Cretaceous | 0.05 | 0.12 | 0.83 |
| Low | High | Paleogene | 0.05 | 0.11 | 0.84 |
| Low | High | Neogene | 0.05 | 0.11 | 0.84 |
| Mod | Low | Cambrian | 0.02 | 0.07 | 0.91 |
| Mod | Low | Ordovician | 0.02 | 0.07 | 0.91 |
| Mod | Low | Silurian | 0.02 | 0.07 | 0.91 |
| Mod | Low | Devonian | 0.02 | 0.06 | 0.92 |
| Mod | Low | Mississippian | 0.02 | 0.06 | 0.92 |
| Mod | Low | Pennsylvanian | 0.02 | 0.06 | 0.92 |
| Mod | Low | E. Permian | 0.01 | 0.06 | 0.93 |
| Mod | Low | M, L Permian | 0.01 | 0.06 | 0.93 |
| Mod | Low | Triassic | 0.01 | 0.06 | 0.93 |
| Mod | Low | Jurassic | 0.01 | 0.05 | 0.94 |
| Mod | Low | E. Cretaceous | 0.01 | 0.05 | 0.94 |
| Mod | Low | L. Cretaceous | 0.01 | 0.05 | 0.94 |
| Mod | Low | Paleogene | 0.01 | 0.04 | 0.95 |
| Mod | Low | Neogene | 0.01 | 0.04 | 0.95 |
| Mod | Middle | Cambrian | 0.04 | 0.1 | 0.86 |
| Mod | Middle | Ordovician | 0.04 | 0.1 | 0.86 |
| Mod | Middle | Silurian | 0.04 | 0.1 | 0.86 |
| Mod | Middle | Devonian | 0.04 | 0.09 | 0.87 |
| Mod | Middle | Mississippian | 0.04 | 0.09 | 0.87 |
| Mod | Middle | Pennsylvanian | 0.04 | 0.09 | 0.87 |
| Mod | Middle | E. Permian | 0.03 | 0.09 | 0.88 |
| Mod | Middle | M, L Permian | 0.03 | 0.09 | 0.88 |
| Mod | Middle | Triassic | 0.03 | 0.09 | 0.88 |
| Mod | Middle | Jurassic | 0.03 | 0.08 | 0.89 |
| Mod | Middle | E. Cretaceous | 0.03 | 0.08 | 0.89 |
| Mod | Middle | L. Cretaceous | 0.03 | 0.08 | 0.89 |
| Mod | Middle | Paleogene | 0.03 | 0.07 | 0.9 |
| Mod | Middle | Neogene | 0.03 | 0.07 | 0.9 |
| Mod | High | Cambrian | 0.06 | 0.13 | 0.81 |
| Mod | High | Ordovician | 0.06 | 0.13 | 0.81 |
| Mod | High | Silurian | 0.06 | 0.13 | 0.81 |
| Mod | High | Devonian | 0.06 | 0.12 | 0.82 |
| Mod | High | Mississippian | 0.06 | 0.12 | 0.82 |
| Mod | High | Pennsylvanian | 0.06 | 0.12 | 0.82 |
| Mod | High | E. Permian | 0.05 | 0.12 | 0.83 |
| Mod | High | M, L Permian | 0.05 | 0.12 | 0.83 |
| Mod | High | Triassic | 0.05 | 0.12 | 0.83 |
| Mod | High | Jurassic | 0.05 | 0.11 | 0.84 |
| Mod | High | E. Cretaceous | 0.05 | 0.11 | 0.84 |
| Mod | High | L. Cretaceous | 0.05 | 0.11 | 0.84 |
| Mod | High | Paleogene | 0.05 | 0.1 | 0.85 |
| Mod | High | Neogene | 0.05 | 0.1 | 0.85 |
| High | Low | Cambrian | 0.03 | 0.08 | 0.89 |
| High | Low | Ordovician | 0.03 | 0.08 | 0.89 |
| High | Low | Silurian | 0.03 | 0.08 | 0.89 |
| High | Low | Devonian | 0.03 | 0.07 | 0.9 |
| High | Low | Mississippian | 0.03 | 0.07 | 0.9 |
| High | Low | Pennsylvanian | 0.03 | 0.07 | 0.9 |
| High | Low | E. Permian | 0.02 | 0.07 | 0.91 |
| High | Low | M, L Permian | 0.02 | 0.07 | 0.91 |
| High | Low | Triassic | 0.02 | 0.07 | 0.91 |
| High | Low | Jurassic | 0.02 | 0.06 | 0.92 |
| High | Low | E. Cretaceous | 0.02 | 0.06 | 0.92 |
| High | Low | L. Cretaceous | 0.02 | 0.06 | 0.92 |
| High | Low | Paleogene | 0.02 | 0.05 | 0.93 |
| High | Low | Neogene | 0.02 | 0.05 | 0.93 |
| High | Middle | Cambrian | 0.05 | 0.1 | 0.85 |
| High | Middle | Ordovician | 0.05 | 0.1 | 0.85 |
| High | Middle | Silurian | 0.05 | 0.1 | 0.85 |
| High | Middle | Devonian | 0.05 | 0.09 | 0.86 |
| High | Middle | Mississippian | 0.05 | 0.09 | 0.86 |
| High | Middle | Pennsylvanian | 0.05 | 0.09 | 0.86 |
| High | Middle | E. Permian | 0.04 | 0.09 | 0.87 |
| High | Middle | M, L Permian | 0.04 | 0.09 | 0.87 |
| High | Middle | Triassic | 0.04 | 0.09 | 0.87 |
| High | Middle | Jurassic | 0.04 | 0.08 | 0.88 |
| High | Middle | E. Cretaceous | 0.04 | 0.08 | 0.88 |
| High | Middle | L. Cretaceous | 0.04 | 0.08 | 0.88 |
| High | Middle | Paleogene | 0.04 | 0.07 | 0.89 |
| High | Middle | Neogene | 0.04 | 0.07 | 0.89 |
| High | High | Cambrian | 0.07 | 0.12 | 0.81 |
| High | High | Ordovician | 0.07 | 0.12 | 0.81 |
| High | High | Silurian | 0.07 | 0.12 | 0.81 |
| High | High | Devonian | 0.06 | 0.12 | 0.82 |
| High | High | Mississippian | 0.06 | 0.12 | 0.82 |
| High | High | Pennsylvanian | 0.06 | 0.12 | 0.82 |
| High | High | E. Permian | 0.05 | 0.12 | 0.83 |
| High | High | M, L Permian | 0.05 | 0.12 | 0.83 |
| High | High | Triassic | 0.05 | 0.12 | 0.83 |
| High | High | Jurassic | 0.05 | 0.11 | 0.84 |
| High | High | E. Cretaceous | 0.05 | 0.11 | 0.84 |
| High | High | L. Cretaceous | 0.05 | 0.11 | 0.84 |
| High | High | Paleogene | 0.05 | 0.1 | 0.85 |
| High | High | Neogene | 0.05 | 0.1 | 0.85 |

TABLE I-16

Probability Table for Node "Mixing, Total"

| Water Mass Mixing | Cyclonic Mixing | Low | Mod | High |
|---|---|---|---|---|
| Low | Low | 0.9 | 0.07 | 0.03 |
| Low | Mod | 0.05 | 0.9 | 0.05 |
| Low | High | 0.03 | 0.07 | 0.9 |
| Mod | Low | 0.03 | 0.9 | 0.07 |
| Mod | Mod | 0.005 | 0.99 | 0.005 |
| Mod | High | 0.02 | 0.03 | 0.95 |
| High | Low | 0.03 | 0.07 | 0.9 |
| High | Mod | 0.01 | 0.04 | 0.95 |
| High | High | 0.0025 | 0.0075 | 0.99 |

TABLE I-17

Probability Table for Node "Nutrients, Circulation"

| Upwelling | Mixing, Total | Low | Mod | High |
|---|---|---|---|---|
| Low | Low | 0.85 | 0.1 | 0.05 |
| Low | Mod | 0.5 | 0.45 | 0.05 |
| Low | High | 0.3 | 0.6 | 0.1 |
| Middle | Low | 0.03 | 0.9 | 0.07 |
| Middle | Mod | 0.05 | 0.35 | 0.6 |
| Middle | High | 0.03 | 0.17 | 0.8 |
| High | Low | 0.01 | 0.04 | 0.95 |
| High | Mod | 0.005 | 0.025 | 0.97 |
| High | High | 0.0025 | 0.0075 | 0.99 |

TABLE I-18

Probability Table for Node "Nutrients, Other"

| Aeolian Input | EvaporativeCrossFlow | Low | Mod | High |
|---|---|---|---|---|
| Low | Low | 0.95 | 0.04 | 0.01 |
| Low | Mod | 0.1 | 0.85 | 0.05 |
| Low | High | 0.05 | 0.1 | 0.85 |
| Mod | Low | 0.8 | 0.15 | 0.05 |
| Mod | Mod | 0.05 | 0.9 | 0.05 |
| Mod | High | 0.03 | 0.07 | 0.9 |
| High | Low | 0.15 | 0.8 | 0.05 |
| High | Mod | 0.05 | 0.15 | 0.8 |
| High | High | 0.01 | 0.04 | 0.95 |

TABLE I-19

Probability Table for Node "Nutrient Supply"

| Nutrients, Circulation | Nutrients, Other | Runoff | Low | Mod | High |
|---|---|---|---|---|---|
| Low | Low | Low | 0.97 | 0.02 | 0.01 |
| Low | Low | Middle | 0.9 | 0.07 | 0.03 |
| Low | Low | High | 0.8 | 0.15 | 0.05 |
| Low | Mod | Low | 0.65 | 0.3 | 0.05 |
| Low | Mod | Middle | 0.2 | 0.75 | 0.05 |
| Low | Mod | High | 0.15 | 0.8 | 0.05 |
| Low | High | Low | 0.2 | 0.75 | 0.05 |
| Low | High | Middle | 0.15 | 0.8 | 0.05 |
| Low | High | High | 0.1 | 0.85 | 0.05 |
| Mod | Low | Low | 0.1 | 0.85 | 0.05 |
| Mod | Low | Middle | 0.05 | 0.7 | 0.25 |
| Mod | Low | High | 0.03 | 0.75 | 0.22 |
| Mod | Mod | Low | 0.03 | 0.7 | 0.27 |
| Mod | Mod | Middle | 0.02 | 0.8 | 0.18 |
| Mod | Mod | High | 0.01 | 0.8 | 0.19 |
| Mod | High | Low | 0.05 | 0.75 | 0.2 |
| Mod | High | Middle | 0.03 | 0.65 | 0.32 |
| Mod | High | High | 0.01 | 0.59 | 0.4 |
| High | Low | Low | 0.05 | 0.15 | 0.8 |
| High | Low | Middle | 0.03 | 0.12 | 0.85 |
| High | Low | High | 0.03 | 0.07 | 0.9 |
| High | Mod | Low | 0.03 | 0.12 | 0.85 |
| High | Mod | Middle | 0.03 | 0.07 | 0.9 |
| High | Mod | High | 0.02 | 0.03 | 0.95 |
| High | High | Low | 0.01 | 0.04 | 0.95 |
| High | High | Middle | 0.01 | 0.04 | 0.95 |
| High | High | High | 0.0025 | 0.0075 | 0.99 |

TABLE I-20

Probability Table for Node "Consumer Population"

| OrganicProduction | Geologic_Age | Low | Mod | High |
|---|---|---|---|---|
| Low | Cambrian | 0.9 | 0.09 | 0.01 |
| Low | Ordovician | 0.9 | 0.09 | 0.01 |
| Low | Silurian | 0.85 | 0.1 | 0.05 |
| Low | Devonian | 0.85 | 0.1 | 0.05 |
| Low | Mississippian | 0.85 | 0.1 | 0.05 |
| Low | Pennsylvanian | 0.85 | 0.1 | 0.05 |
| Low | E. Permian | 0.85 | 0.1 | 0.05 |
| Low | M,L Permian | 0.85 | 0.1 | 0.05 |
| Low | Triassic | 0.85 | 0.1 | 0.05 |
| Low | Jurassic | 0.85 | 0.1 | 0.05 |
| Low | E. Cretaceous | 0.85 | 0.1 | 0.05 |
| Low | L. Cretaceous | 0.85 | 0.1 | 0.05 |
| Low | Paleogene | 0.85 | 0.1 | 0.05 |
| Low | Neogene | 0.85 | 0.1 | 0.05 |
| Mod | Cambrian | 0.06 | 0.87 | 0.07 |
| Mod | Ordovician | 0.06 | 0.87 | 0.07 |
| Mod | Silurian | 0.03 | 0.9 | 0.07 |
| Mod | Devonian | 0.03 | 0.9 | 0.07 |
| Mod | Mississippian | 0.03 | 0.9 | 0.07 |
| Mod | Pennsylvanian | 0.03 | 0.9 | 0.07 |
| Mod | E. Permian | 0.03 | 0.9 | 0.07 |
| Mod | M,L Permian | 0.03 | 0.9 | 0.07 |
| Mod | Triassic | 0.03 | 0.9 | 0.07 |
| Mod | Jurassic | 0.03 | 0.9 | 0.07 |
| Mod | E. Cretaceous | 0.03 | 0.9 | 0.07 |
| Mod | L. Cretaceous | 0.03 | 0.9 | 0.07 |
| Mod | Paleogene | 0.03 | 0.9 | 0.07 |
| Mod | Neogene | 0.03 | 0.9 | 0.07 |
| High | Cambrian | 0.04 | 0.06 | 0.9 |
| High | Ordovician | 0.04 | 0.06 | 0.9 |
| High | Silurian | 0.02 | 0.03 | 0.95 |
| High | Devonian | 0.02 | 0.03 | 0.95 |
| High | Mississippian | 0.02 | 0.03 | 0.95 |
| High | Pennsylvanian | 0.02 | 0.03 | 0.95 |
| High | E. Permian | 0.02 | 0.03 | 0.95 |
| High | M,L Permian | 0.02 | 0.03 | 0.95 |
| High | Triassic | 0.02 | 0.03 | 0.95 |
| High | Jurassic | 0.02 | 0.03 | 0.95 |
| High | E. Cretaceous | 0.02 | 0.03 | 0.95 |
| High | L. Cretaceous | 0.02 | 0.03 | 0.95 |
| High | Paleogene | 0.02 | 0.03 | 0.95 |
| High | Neogene | 0.02 | 0.03 | 0.95 |

TABLE I-21

Probability Table for Node "Oxidant Supply"

| Water Column Stratification | Deep Water Oxygenation | Sea Level Effects | Low | Mod | High |
|---|---|---|---|---|---|
| Low | Low | Negative | 0.05 | 0.8 | 0.15 |
| Low | Low | Neutral | 0.1 | 0.7 | 0.2 |
| Low | Low | Positive | 0.25 | 0.15 | 0.6 |
| Low | Mod | Negative | 0.1 | 0.2 | 0.7 |
| Low | Mod | Neutral | 0.05 | 0.15 | 0.8 |
| Low | Mod | Positive | 0.03 | 0.07 | 0.9 |
| Low | High | Negative | 0.02 | 0.03 | 0.95 |
| Low | High | Neutral | 0.02 | 0.03 | 0.95 |
| Low | High | Positive | 0.03 | 0.07 | 0.9 |
| Mod | Low | Negative | 0.75 | 0.2 | 0.05 |
| Mod | Low | Neutral | 0.75 | 0.2 | 0.05 |
| Mod | Low | Positive | 0.8 | 0.15 | 0.05 |
| Mod | Mod | Negative | 0.07 | 0.9 | 0.03 |
| Mod | Mod | Neutral | 0.07 | 0.9 | 0.03 |
| Mod | Mod | Positive | 0.05 | 0.85 | 0.1 |
| Mod | High | Negative | 0.03 | 0.12 | 0.85 |
| Mod | High | Neutral | 0.05 | 0.1 | 0.85 |
| Mod | High | Positive | 0.05 | 0.2 | 0.75 |
| High | Low | Negative | 0.9 | 0.07 | 0.03 |
| High | Low | Neutral | 0.95 | 0.04 | 0.01 |
| High | Low | Positive | 0.99 | 0.0075 | 0.0025 |
| High | Mod | Negative | 0.8 | 0.15 | 0.05 |
| High | Mod | Neutral | 0.85 | 0.1 | 0.05 |

TABLE I-21-continued

Probability Table for Node "Oxidant Supply"

| Water Column Stratification | Deep Water Oxygenation | Sea Level Effects | Low | Mod | High |
|---|---|---|---|---|---|
| High | Mod | Positive | 0.87 | 0.1 | 0.03 |
| High | High | Negative | 0.02 | 0.8 | 0.18 |
| High | High | Neutral | 0.1 | 0.7 | 0.2 |
| High | High | Positive | 0.1 | 0.2 | 0.7 |

TABLE I-22

Probability Table or Node "Clastic Transport Rate"

| Eustatic Sea Level | Wetness, Annual Avg | Wetness, Seasonality | Low | Mod | High |
|---|---|---|---|---|---|
| rapid fall | Low | Low | 0.9 | 0.07 | 0.03 |
| rapid fall | Low | Mod | 0.05 | 0.8 | 0.15 |
| rapid fall | Low | High | 0.05 | 0.15 | 0.8 |
| rapid fall | Mod | Low | 0.05 | 0.8 | 0.15 |
| rapid fall | Mod | Mod | 0.05 | 0.25 | 0.7 |
| rapid fall | Mod | High | 0.03 | 0.07 | 0.9 |
| rapid fall | High | Low | 0.7 | 0.2 | 0.1 |
| rapid fall | High | Mod | 0.05 | 0.15 | 0.8 |
| rapid fall | High | High | 0.005 | 0.005 | 0.99 |
| fall | Low | Low | 0.95 | 0.04 | 0.01 |
| fall | Low | Mod | 0.05 | 0.7 | 0.25 |
| fall | Low | High | 0.02 | 0.18 | 0.8 |
| fall | Mod | Low | 0.05 | 0.85 | 0.1 |
| fall | Mod | Mod | 0.05 | 0.35 | 0.6 |
| fall | Mod | High | 0.03 | 0.12 | 0.85 |
| fall | High | Low | 0.7 | 0.2 | 0.1 |
| fall | High | Mod | 0.1 | 0.2 | 0.7 |
| fall | High | High | 0.005 | 0.015 | 0.98 |
| stable | Low | Low | 0.97 | 0.02 | 0.01 |
| stable | Low | Mod | 0.1 | 0.7 | 0.2 |
| stable | Low | High | 0.05 | 0.25 | 0.7 |
| stable | Mod | Low | 0.05 | 0.9 | 0.05 |
| stable | Mod | Mod | 0.1 | 0.3 | 0.6 |
| stable | Mod | High | 0.03 | 0.12 | 0.85 |
| stable | High | Low | 0.7 | 0.25 | 0.05 |
| stable | High | Mod | 0.05 | 0.15 | 0.8 |
| stable | High | High | 0.01 | 0.04 | 0.95 |
| rise | Low | Low | 0.98 | 0.015 | 0.005 |
| rise | Low | Mod | 0.15 | 0.8 | 0.05 |
| rise | Low | High | 0.1 | 0.2 | 0.7 |
| rise | Mod | Low | 0.15 | 0.8 | 0.05 |
| rise | Mod | Mod | 0.2 | 0.3 | 0.5 |
| rise | Mod | High | 0.15 | 0.2 | 0.65 |
| rise | High | Low | 0.7 | 0.2 | 0.1 |
| rise | High | Mod | 0.1 | 0.2 | 0.7 |
| rise | High | High | 0.03 | 0.07 | 0.9 |
| rapid rise | Low | Low | 0.99 | 0.005 | 0.005 |
| rapid rise | Low | Mod | 0.25 | 0.7 | 0.05 |
| rapid rise | Low | High | 0.2 | 0.2 | 0.6 |
| rapid rise | Mod | Low | 0.15 | 0.8 | 0.05 |
| rapid rise | Mod | Mod | 0.25 | 0.25 | 0.5 |
| rapid rise | Mod | High | 0.15 | 0.15 | 0.7 |
| rapid rise | High | Low | 0.8 | 0.1 | 0.1 |
| rapid rise | High | Mod | 0.15 | 0.15 | 0.7 |
| rapid rise | High | High | 0.05 | 0.15 | 0.8 |

TABLE I-23

Probability Table for Node "Clastic Supply Rate"

| ClasticSupplyRate | Geologic_Age_Plants | Low | Middle | High |
|---|---|---|---|---|
| Low | Cambrian Silurian | 0.7 | 0.25 | 0.05 |
| Low | Devonian | 0.76 | 0.2 | 0.04 |
| Low | Miss Triassic | 0.81 | 0.16 | 0.03 |
| Low | Jurassic Paleogene | 0.9 | 0.08 | 0.02 |
| Low | Neogene | 0.95 | 0.04 | 0.01 |
| Mod | Cambrian Silurian | 0.02 | 0.88 | 0.1 |
| Mod | Devonian | 0.02 | 0.93 | 0.05 |
| Mod | Miss Triassic | 0.02 | 0.94 | 0.04 |
| Mod | Jurassic Paleogene | 0.02 | 0.95 | 0.03 |
| Mod | Neogene | 0.02 | 0.95 | 0.03 |
| High | Cambrian Silurian | 0.01 | 0.04 | 0.95 |
| High | Devonian | 0.01 | 0.04 | 0.95 |
| High | Miss Triassic | 0.01 | 0.09 | 0.9 |
| High | Jurassic Paleogene | 0.01 | 0.09 | 0.9 |
| High | Neogene | 0.01 | 0.09 | 0.9 |

TABLE I-24

Probability Table for Node "Chemical Supply Rate"

| EvaporativeCrossFlow | Water Depth | Low | Mod | High |
|---|---|---|---|---|
| Low | Basin | 0.99 | 0.0075 | 0.0025 |
| Low | Slope | 0.98 | 0.015 | 0.005 |
| Low | Shelf | 0.9 | 0.09 | 0.01 |
| Mod | Basin | 0.98 | 0.015 | 0.005 |
| Mod | Slope | 0.95 | 0.04 | 0.01 |
| Mod | Shelf | 0.8 | 0.19 | 0.01 |
| High | Basin | 0.95 | 0.04 | 0.01 |
| High | Slope | 0.9 | 0.09 | 0.01 |
| High | Shelf | 0.05 | 0.35 | 0.6 |

TABLE I-25

Probability Table or Node "Biogenic Supply Rate-Benthic"

| Water Depth | SSTAnnMin | Geologic_Age | Low | Mod | High |
|---|---|---|---|---|---|
| Basin | <5 deg C. | Cambrian | 0.95 | 0.04 | 0.01 |
| Basin | <5 deg C. | Ordovician | 0.9 | 0.09 | 0.01 |
| Basin | <5 deg C. | Silurian | 0.9 | 0.09 | 0.01 |
| Basin | <5 deg C. | Devonian | 0.9 | 0.09 | 0.01 |
| Basin | <5 deg C. | Mississippian | 0.95 | 0.04 | 0.01 |
| Basin | <5 deg C. | Pennsylvanian | 0.95 | 0.04 | 0.01 |
| Basin | <5 deg C. | E. Permian | 0.95 | 0.04 | 0.01 |
| Basin | <5 deg C. | M, L Permian | 0.9 | 0.09 | 0.01 |
| Basin | <5 deg C. | Triassic | 0.9 | 0.09 | 0.01 |
| Basin | <5 deg C. | Jurassic | 0.9 | 0.09 | 0.01 |
| Basin | <5 deg C. | E. Cretaceous | 0.9 | 0.09 | 0.01 |
| Basin | <5 deg C. | L. Cretaceous | 0.9 | 0.09 | 0.01 |
| Basin | <5 deg C. | Paleogene | 0.95 | 0.04 | 0.01 |
| Basin | <5 deg C. | Neogene | 0.9 | 0.09 | 0.01 |
| Basin | <10 deg C. | Cambrian | 0.95 | 0.04 | 0.01 |
| Basin | <10 deg C. | Ordovician | 0.9 | 0.09 | 0.01 |
| Basin | <10 deg C. | Silurian | 0.9 | 0.09 | 0.01 |
| Basin | <10 deg C. | Devonian | 0.9 | 0.09 | 0.01 |
| Basin | <10 deg C. | Mississippian | 0.95 | 0.04 | 0.01 |
| Basin | <10 deg C. | Pennsylvanian | 0.95 | 0.04 | 0.01 |
| Basin | <10 deg C. | E. Permian | 0.95 | 0.04 | 0.01 |
| Basin | <10 deg C. | M, L Permian | 0.9 | 0.09 | 0.01 |
| Basin | <10 deg C. | Triassic | 0.9 | 0.09 | 0.01 |
| Basin | <10 deg C. | Jurassic | 0.9 | 0.09 | 0.01 |
| Basin | <10 deg C. | E. Cretaceous | 0.9 | 0.09 | 0.01 |
| Basin | <10 deg C. | L. Cretaceous | 0.9 | 0.09 | 0.01 |
| Basin | <10 deg C. | Paleogene | 0.95 | 0.04 | 0.01 |
| Basin | <10 deg C. | Neogene | 0.9 | 0.09 | 0.01 |
| Basin | >11 deg C. | Cambrian | 0.9 | 0.09 | 0.01 |
| Basin | >11 deg C. | Ordovician | 0.9 | 0.09 | 0.01 |
| Basin | >11 deg C. | Silurian | 0.9 | 0.09 | 0.01 |
| Basin | >11 deg C. | Devonian | 0.9 | 0.09 | 0.01 |
| Basin | >11 deg C. | Mississippian | 0.9 | 0.09 | 0.01 |
| Basin | >11 deg C. | Pennsylvanian | 0.9 | 0.09 | 0.01 |
| Basin | >11 deg C. | E. Permian | 0.9 | 0.09 | 0.01 |
| Basin | >11 deg C. | M, L Permian | 0.9 | 0.09 | 0.01 |
| Basin | >11 deg C. | Triassic | 0.9 | 0.09 | 0.01 |
| Basin | >11 deg C. | Jurassic | 0.9 | 0.09 | 0.01 |
| Basin | >11 deg C. | E. Cretaceous | 0.9 | 0.09 | 0.01 |

TABLE I-25-continued

Probability Table or Node "Biogenic Supply Rate-Benthic"

| Water Depth | SSTAnnMin | Geologic_Age | Low | Mod | High |
|---|---|---|---|---|---|
| Basin | >11 deg C. | L. Cretaceous | 0.9 | 0.09 | 0.01 |
| Basin | >11 deg C. | Paleogene | 0.9 | 0.09 | 0.01 |
| Basin | >11 deg C. | Neogene | 0.9 | 0.09 | 0.01 |
| Slope | <5 deg C. | Cambrian | 0.95 | 0.04 | 0.01 |
| Slope | <5 deg C. | Ordovician | 0.9 | 0.09 | 0.01 |
| Slope | <5 deg C. | Silurian | 0.9 | 0.09 | 0.01 |
| Slope | <5 deg C. | Devonian | 0.9 | 0.09 | 0.01 |
| Slope | <5 deg C. | Mississippian | 0.95 | 0.04 | 0.01 |
| Slope | <5 deg C. | Pennsylvanian | 0.95 | 0.04 | 0.01 |
| Slope | <5 deg C. | E. Permian | 0.95 | 0.04 | 0.01 |
| Slope | <5 deg C. | M, L Permian | 0.9 | 0.09 | 0.01 |
| Slope | <5 deg C. | Triassic | 0.9 | 0.09 | 0.01 |
| Slope | <5 deg C. | Jurassic | 0.9 | 0.09 | 0.01 |
| Slope | <5 deg C. | E. Cretaceous | 0.9 | 0.09 | 0.01 |
| Slope | <5 deg C. | L. Cretaceous | 0.9 | 0.09 | 0.01 |
| Slope | <5 deg C. | Paleogene | 0.95 | 0.04 | 0.01 |
| Slope | <5 deg C. | Neogene | 0.9 | 0.09 | 0.01 |
| Slope | <10 deg C. | Cambrian | 0.85 | 0.135 | 0.015 |
| Slope | <10 deg C. | Ordovician | 0.8 | 0.17 | 0.03 |
| Slope | <10 deg C. | Silurian | 0.8 | 0.17 | 0.03 |
| Slope | <10 deg C. | Devonian | 0.8 | 0.17 | 0.03 |
| Slope | <10 deg C. | Mississippian | 0.85 | 0.135 | 0.015 |
| Slope | <10 deg C. | Pennsylvanian | 0.85 | 0.135 | 0.015 |
| Slope | <10 deg C. | E. Permian | 0.85 | 0.135 | 0.015 |
| Slope | <10 deg C. | M, L Permian | 0.8 | 0.17 | 0.03 |
| Slope | <10 deg C. | Triassic | 0.8 | 0.17 | 0.03 |
| Slope | <10 deg C. | Jurassic | 0.8 | 0.17 | 0.03 |
| Slope | <10 deg C. | E. Cretaceous | 0.8 | 0.17 | 0.03 |
| Slope | <10 deg C. | L. Cretaceous | 0.8 | 0.17 | 0.03 |
| Slope | <10 deg C. | Paleogene | 0.85 | 0.135 | 0.015 |
| Slope | <10 deg C. | Neogene | 0.8 | 0.17 | 0.03 |
| Slope | >11 deg C. | Cambrian | 0.79 | 0.18 | 0.03 |
| Slope | >11 deg C. | Ordovician | 0.75 | 0.2 | 0.05 |
| Slope | >11 deg C. | Silurian | 0.75 | 0.2 | 0.05 |
| Slope | >11 deg C. | Devonian | 0.75 | 0.2 | 0.05 |
| Slope | >11 deg C. | Mississippian | 0.79 | 0.18 | 0.03 |
| Slope | >11 deg C. | Pennsylvanian | 0.79 | 0.18 | 0.03 |
| Slope | >11 deg C. | E. Permian | 0.79 | 0.18 | 0.03 |
| Slope | >11 deg C. | M, L Permian | 0.75 | 0.2 | 0.05 |
| Slope | >11 deg C. | Triassic | 0.75 | 0.2 | 0.05 |
| Slope | >11 deg C. | Jurassic | 0.75 | 0.2 | 0.05 |
| Slope | >11 deg C. | E. Cretaceous | 0.75 | 0.2 | 0.05 |
| Slope | >11 deg C. | L. Cretaceous | 0.75 | 0.2 | 0.05 |
| Slope | >11 deg C. | Paleogene | 0.79 | 0.18 | 0.03 |
| Slope | >11 deg C. | Neogene | 0.75 | 0.2 | 0.05 |
| Shelf | <5 deg C. | Cambrian | 0.95 | 0.04 | 0.01 |
| Shelf | <5 deg C. | Ordovician | 0.9 | 0.07 | 0.03 |
| Shelf | <5 deg C. | Silurian | 0.9 | 0.07 | 0.03 |
| Shelf | <5 deg C. | Devonian | 0.9 | 0.07 | 0.03 |
| Shelf | <5 deg C. | Mississippian | 0.95 | 0.04 | 0.01 |
| Shelf | <5 deg C. | Pennsylvanian | 0.95 | 0.04 | 0.01 |
| Shelf | <5 deg C. | E. Permian | 0.95 | 0.04 | 0.01 |
| Shelf | <5 deg C. | M, L Permian | 0.9 | 0.07 | 0.03 |
| Shelf | <5 deg C. | Triassic | 0.9 | 0.07 | 0.03 |
| Shelf | <5 deg C. | Jurassic | 0.9 | 0.07 | 0.03 |
| Shelf | <5 deg C. | E. Cretaceous | 0.9 | 0.07 | 0.03 |
| Shelf | <5 deg C. | L. Cretaceous | 0.9 | 0.07 | 0.03 |
| Shelf | <5 deg C. | Paleogene | 0.95 | 0.04 | 0.01 |
| Shelf | <5 deg C. | Neogene | 0.9 | 0.07 | 0.03 |
| Shelf | <10 deg C. | Cambrian | 0.2 | 0.75 | 0.05 |
| Shelf | <10 deg C. | Ordovician | 0.15 | 0.8 | 0.05 |
| Shelf | <10 deg C. | Silurian | 0.15 | 0.8 | 0.05 |
| Shelf | <10 deg C. | Devonian | 0.15 | 0.8 | 0.05 |
| Shelf | <10 deg C. | Mississippian | 0.2 | 0.75 | 0.05 |
| Shelf | <10 deg C. | Pennsylvanian | 0.2 | 0.75 | 0.05 |
| Shelf | <10 deg C. | E. Permian | 0.2 | 0.75 | 0.05 |
| Shelf | <10 deg C. | M, L Permian | 0.15 | 0.8 | 0.05 |
| Shelf | <10 deg C. | Triassic | 0.15 | 0.8 | 0.05 |
| Shelf | <10 deg C. | Jurassic | 0.15 | 0.8 | 0.05 |
| Shelf | <10 deg C. | E. Cretaceous | 0.15 | 0.8 | 0.05 |
| Shelf | <10 deg C. | L. Cretaceous | 0.15 | 0.8 | 0.05 |
| Shelf | <10 deg C. | Paleogene | 0.2 | 0.75 | 0.05 |
| Shelf | <10 deg C. | Neogene | 0.15 | 0.8 | 0.05 |
| Shelf | >11 deg C. | Cambrian | 0.05 | 0.15 | 0.8 |
| Shelf | >11 deg C. | Ordovician | 0.03 | 0.07 | 0.9 |
| Shelf | >11 deg C. | Silurian | 0.03 | 0.07 | 0.9 |
| Shelf | >11 deg C. | Devonian | 0.03 | 0.07 | 0.9 |
| Shelf | >11 deg C. | Mississippian | 0.05 | 0.15 | 0.8 |
| Shelf | >11 deg C. | Pennsylvanian | 0.05 | 0.15 | 0.8 |
| Shelf | >11 deg C. | E. Permian | 0.05 | 0.15 | 0.8 |
| Shelf | >11 deg C. | M, L Permian | 0.03 | 0.07 | 0.9 |
| Shelf | >11 deg C. | Triassic | 0.03 | 0.07 | 0.9 |
| Shelf | >11 deg C. | Jurassic | 0.03 | 0.07 | 0.9 |
| Shelf | >11 deg C. | E. Cretaceous | 0.03 | 0.07 | 0.9 |
| Shelf | >11 deg C. | L. Cretaceous | 0.03 | 0.07 | 0.9 |
| Shelf | >11 deg C. | Paleogene | 0.05 | 0.15 | 0.8 |
| Shelf | >11 deg C. | Neogene | 0.03 | 0.07 | 0.9 |

TABLE I-26

Probability Table for Node "Biogenic Supply Rate-Pelagic"

| OrganicProduction | Geologic_Age | Low | Mod | High |
|---|---|---|---|---|
| Low | Cambrian | 0.9 | 0.09 | 0.01 |
| Low | Ordovician | 0.9 | 0.09 | 0.01 |
| Low | Silurian | 0.9 | 0.09 | 0.01 |
| Low | Devonian | 0.9 | 0.09 | 0.01 |
| Low | Mississippian | 0.9 | 0.09 | 0.01 |
| Low | Pennsylvanian | 0.9 | 0.09 | 0.01 |
| Low | E. Permian | 0.9 | 0.09 | 0.01 |
| Low | M,L Permian | 0.9 | 0.09 | 0.01 |
| Low | Triassic | 0.9 | 0.09 | 0.01 |
| Low | Jurassic | 0.9 | 0.09 | 0.01 |
| Low | E. Cretaceous | 0.9 | 0.09 | 0.01 |
| Low | L. Cretaceous | 0.9 | 0.09 | 0.01 |
| Low | Paleogene | 0.9 | 0.09 | 0.01 |
| Low | Neogene | 0.9 | 0.09 | 0.01 |
| Mod | Cambrian | 0.9 | 0.09 | 0.01 |
| Mod | Ordovician | 0.9 | 0.09 | 0.01 |
| Mod | Silurian | 0.9 | 0.09 | 0.01 |
| Mod | Devonian | 0.9 | 0.09 | 0.01 |
| Mod | Mississippian | 0.9 | 0.09 | 0.01 |
| Mod | Pennsylvanian | 0.9 | 0.09 | 0.01 |
| Mod | E. Permian | 0.9 | 0.09 | 0.01 |
| Mod | M,L Permian | 0.9 | 0.09 | 0.01 |
| Mod | Triassic | 0.9 | 0.09 | 0.01 |
| Mod | Jurassic | 0.9 | 0.09 | 0.01 |
| Mod | E. Cretaceous | 0.9 | 0.09 | 0.01 |
| Mod | L. Cretaceous | 0.9 | 0.09 | 0.01 |
| Mod | Paleogene | 0.9 | 0.09 | 0.01 |
| Mod | Neogene | 0.9 | 0.09 | 0.01 |
| High | Cambrian | 0.9 | 0.09 | 0.01 |
| High | Ordovician | 0.9 | 0.09 | 0.01 |
| High | Silurian | 0.9 | 0.09 | 0.01 |
| High | Devonian | 0.85 | 0.14 | 0.01 |
| High | Mississippian | 0.85 | 0.14 | 0.01 |
| High | Pennsylvanian | 0.85 | 0.14 | 0.01 |
| High | E. Permian | 0.85 | 0.14 | 0.01 |
| High | M,L Permian | 0.85 | 0.14 | 0.01 |
| High | Triassic | 0.1 | 0.3 | 0.6 |
| High | Jurassic | 0.05 | 0.25 | 0.7 |
| High | E. Cretaceous | 0.05 | 0.2 | 0.75 |
| High | L. Cretaceous | 0.05 | 0.15 | 0.8 |
| High | Paleogene | 0.02 | 0.13 | 0.85 |
| High | Neogene | 0.01 | 0.09 | 0.9 |

TABLE I-27

Probability Table for Node "Biogenic Supply Rate Total"

| Biogenic Supply Rate-Pelagic | Biogenic Supply Rate-Benthic | Low | Mod | High |
|---|---|---|---|---|
| Low | Low | 0.9 | 0.09 | 0.01 |
| Low | Mod | 0.9 | 0.09 | 0.01 |
| Low | High | 0.9 | 0.09 | 0.01 |
| Mod | Low | 0.9 | 0.09 | 0.01 |
| Mod | Mod | 0.9 | 0.09 | 0.01 |
| Mod | High | 0.8 | 0.19 | 0.01 |
| High | Low | 0.05 | 0.75 | 0.2 |
| High | Mod | 0.05 | 0.2 | 0.75 |
| High | High | 0.01 | 0.09 | 0.9 |

TABLE I-28

Probability Table for Node "Linear Sed Rate"

| Biogenic Supply Rate Total | Chemical Supply Rate | Clastic Supply Rate | Proximity to Land | V_Low (<5 m/My) | Low (5-10 m/My) | Mod (11/75 m/My) | High (76-150 m/My) | V_High (>151 m/My) |
|---|---|---|---|---|---|---|---|---|
| Low | Low | Low | Low | 0.99 | 0.0025 | 0.0025 | 0.0025 | 0.0025 |
| Low | Low | Low | Mod | 0.9 | 0.07 | 0.01 | 0.01 | 0.01 |
| Low | Low | Low | High | 0.9 | 0.07 | 0.01 | 0.01 | 0.01 |
| Low | Low | Mod | Low | 0.9 | 0.07 | 0.01 | 0.01 | 0.01 |
| Low | Low | Mod | Mod | 0.01 | 0.07 | 0.9 | 0.01 | 0.01 |
| Low | Low | Mod | High | 0.01 | 0.07 | 0.9 | 0.01 | 0.01 |
| Low | Low | High | Low | 0.85 | 0.12 | 0.01 | 0.01 | 0.01 |
| Low | Low | High | Mod | 0.01 | 0.02 | 0.7 | 0.2 | 0.07 |
| Low | Low | High | High | 0.01 | 0.02 | 0.7 | 0.2 | 0.07 |
| Low | Mod | Low | Low | 0.95 | 0.03 | 0.0125 | 0.005 | 0.0025 |
| Low | Mod | Low | Mod | 0.9 | 0.05 | 0.02 | 0.02 | 0.01 |
| Low | Mod | Low | High | 0.8 | 0.1 | 0.07 | 0.02 | 0.01 |
| Low | Mod | Mod | Low | 0.95 | 0.03 | 0.0125 | 0.005 | 0.0025 |
| Low | Mod | Mod | Mod | 0.01 | 0.1 | 0.85 | 0.03 | 0.01 |
| Low | Mod | Mod | High | 0.01 | 0.1 | 0.85 | 0.03 | 0.01 |
| Low | Mod | High | Low | 0.95 | 0.03 | 0.0125 | 0.005 | 0.0025 |
| Low | Mod | High | Mod | 0.01 | 0.04 | 0.65 | 0.25 | 0.05 |
| Low | Mod | High | High | 0.01 | 0.04 | 0.65 | 0.25 | 0.05 |
| Low | High | Low | Low | 0.95 | 0.03 | 0.0125 | 0.005 | 0.0025 |
| Low | High | Low | Mod | 0.7 | 0.25 | 0.03 | 0.015 | 0.005 |
| Low | High | Low | High | 0.7 | 0.25 | 0.03 | 0.015 | 0.005 |
| Low | High | Mod | Low | 0.95 | 0.03 | 0.0125 | 0.005 | 0.0025 |
| Low | High | Mod | Mod | 0.03 | 0.07 | 0.7 | 0.12 | 0.08 |
| Low | High | Mod | High | 0.03 | 0.07 | 0.7 | 0.12 | 0.08 |
| Low | High | High | Low | 0.95 | 0.03 | 0.0125 | 0.005 | 0.0025 |
| Low | High | High | Mod | 0.01 | 0.04 | 0.6 | 0.3 | 0.05 |
| Low | High | High | High | 0.01 | 0.04 | 0.6 | 0.3 | 0.05 |
| Mod | Low | Low | Low | 0.95 | 0.03 | 0.0125 | 0.005 | 0.0025 |
| Mod | Low | Low | Mod | 0.005 | 0.9 | 0.07 | 0.02 | 0.005 |
| Mod | Low | Low | High | 0.005 | 0.9 | 0.07 | 0.02 | 0.005 |
| Mod | Low | Mod | Low | 0.95 | 0.03 | 0.0125 | 0.005 | 0.0025 |
| Mod | Low | Mod | Mod | 0.01 | 0.15 | 0.8 | 0.03 | 0.01 |
| Mod | Low | Mod | High | 0.01 | 0.15 | 0.8 | 0.03 | 0.01 |
| Mod | Low | High | Low | 0.95 | 0.03 | 0.0125 | 0.005 | 0.0025 |
| Mod | Low | High | Mod | 0.03 | 0.1 | 0.25 | 0.5 | 0.12 |
| Mod | Low | High | High | 0.03 | 0.1 | 0.25 | 0.5 | 0.12 |
| Mod | Mod | Low | Low | 0.95 | 0.03 | 0.0125 | 0.005 | 0.0025 |
| Mod | Mod | Low | Mod | 0.01 | 0.8 | 0.15 | 0.03 | 0.01 |
| Mod | Mod | Low | High | 0.01 | 0.8 | 0.15 | 0.03 | 0.01 |
| Mod | Mod | Mod | Low | 0.95 | 0.03 | 0.0125 | 0.005 | 0.0025 |
| Mod | Mod | Mod | Mod | 0.01 | 0.08 | 0.8 | 0.1 | 0.01 |
| Mod | Mod | Mod | High | 0.01 | 0.08 | 0.8 | 0.1 | 0.01 |
| Mod | Mod | High | Low | 0.95 | 0.03 | 0.0125 | 0.005 | 0.0025 |
| Mod | Mod | High | Mod | 0.01 | 0.09 | 0.2 | 0.6 | 0.1 |
| Mod | Mod | High | High | 0.01 | 0.09 | 0.2 | 0.6 | 0.1 |
| Mod | High | Low | Low | 0.95 | 0.03 | 0.0125 | 0.005 | 0.0025 |
| Mod | High | Low | Mod | 0.01 | 0.75 | 0.2 | 0.03 | 0.01 |
| Mod | High | Low | High | 0.01 | 0.75 | 0.2 | 0.03 | 0.01 |
| Mod | High | Mod | Low | 0.95 | 0.03 | 0.0125 | 0.005 | 0.0025 |
| Mod | High | Mod | Mod | 0.01 | 0.03 | 0.9 | 0.05 | 0.01 |
| Mod | High | Mod | High | 0.01 | 0.03 | 0.9 | 0.05 | 0.01 |
| Mod | High | High | Low | 0.95 | 0.03 | 0.0125 | 0.005 | 0.0025 |
| Mod | High | High | Mod | 0.005 | 0.035 | 0.2 | 0.7 | 0.06 |
| Mod | High | High | High | 0.005 | 0.035 | 0.2 | 0.7 | 0.06 |
| High | Low | Low | Low | 0.95 | 0.03 | 0.0125 | 0.005 | 0.0025 |
| High | Low | Low | Mod | 0.01 | 0.5 | 0.4 | 0.07 | 0.02 |
| High | Low | Low | High | 0.01 | 0.5 | 0.4 | 0.07 | 0.02 |
| High | Low | Mod | Low | 0.95 | 0.03 | 0.0125 | 0.005 | 0.0025 |
| High | Low | Mod | Mod | 0.01 | 0.04 | 0.8 | 0.1 | 0.05 |

TABLE I-28-continued

Probability Table for Node "Linear Sed Rate"

| Biogenic Supply Rate Total | Chemical Supply Rate | Clastic Supply Rate | Proximity to Land | V_Low (<5 m/My) | Low (5-10 m/My) | Mod (11/75 m/My) | High (76-150 m/My) | V_High (>151 m/My) |
|---|---|---|---|---|---|---|---|---|
| High | Low | Mod | High | 0.01 | 0.04 | 0.8 | 0.1 | 0.05 |
| High | Low | High | Low | 0.95 | 0.03 | 0.0125 | 0.005 | 0.0025 |
| High | Low | High | Mod | 0.005 | 0.025 | 0.07 | 0.2 | 0.7 |
| High | Low | High | High | 0.005 | 0.025 | 0.07 | 0.2 | 0.7 |
| High | Mod | Low | Low | 0.95 | 0.03 | 0.0125 | 0.005 | 0.0025 |
| High | Mod | Low | Mod | 0.01 | 0.4 | 0.5 | 0.08 | 0.01 |
| High | Mod | Low | High | 0.01 | 0.4 | 0.5 | 0.08 | 0.01 |
| High | Mod | Mod | Low | 0.95 | 0.03 | 0.0125 | 0.005 | 0.0025 |
| High | Mod | Mod | Mod | 0.005 | 0.025 | 0.7 | 0.2 | 0.07 |
| High | Mod | Mod | High | 0.005 | 0.025 | 0.7 | 0.2 | 0.07 |
| High | Mod | High | Low | 0.95 | 0.03 | 0.0125 | 0.005 | 0.0025 |
| High | Mod | High | Mod | 0.005 | 0.015 | 0.03 | 0.15 | 0.8 |
| High | Mod | High | High | 0.005 | 0.015 | 0.03 | 0.15 | 0.8 |
| High | High | Low | Low | 0.95 | 0.03 | 0.0125 | 0.005 | 0.0025 |
| High | High | Low | Mod | 0.01 | 0.02 | 0.2 | 0.7 | 0.07 |
| High | High | Low | High | 0.01 | 0.02 | 0.2 | 0.7 | 0.07 |
| High | High | Mod | Low | 0.95 | 0.03 | 0.0125 | 0.005 | 0.0025 |
| High | High | Mod | Mod | 0.005 | 0.015 | 0.6 | 0.3 | 0.08 |
| High | High | Mod | High | 0.005 | 0.015 | 0.6 | 0.3 | 0.08 |
| High | High | High | Low | 0.8 | 0.1 | 0.07 | 0.02 | 0.01 |
| High | High | High | Mod | 0.0025 | 0.0075 | 0.02 | 0.07 | 0.9 |
| High | High | High | High | 0.0025 | 0.0075 | 0.02 | 0.07 | 0.9 |

TABLE I-29

Probability Table for Node "Marine Organic Production"

| Nutrient Supply | Insolation | Geologic_Age | Low | Mod | High |
|---|---|---|---|---|---|
| Low | Low | Cambrian | 0.93 | 0.1 | 0.01 |
| Low | Low | Ordovician | 0.93 | 0.1 | 0.01 |
| Low | Low | Silurian | 0.93 | 0.1 | 0.01 |
| Low | Low | Devonian | 0.93 | 0.1 | 0.01 |
| Low | Low | Mississippian | 0.93 | 0.1 | 0.01 |
| Low | Low | Pennsylvanian | 0.93 | 0.1 | 0.01 |
| Low | Low | E. Permian | 0.93 | 0.1 | 0.01 |
| Low | Low | M, L Permian | 0.93 | 0.1 | 0.01 |
| Low | Low | Triassic | 0.93 | 0.1 | 0.01 |
| Low | Low | Jurassic | 0.92 | 0.1 | 0.02 |
| Low | Low | E. Cretaceous | 0.92 | 0.1 | 0.02 |
| Low | Low | L. Cretaceous | 0.90 | 0.1 | 0.03 |
| Low | Low | Paleogene | 0.90 | 0.1 | 0.03 |
| Low | Low | Neogene | 0.90 | 0.1 | 0.03 |
| Low | Mod | Cambrian | 0.88 | 0.1 | 0.02 |
| Low | Mod | Ordovician | 0.88 | 0.1 | 0.02 |
| Low | Mod | Silurian | 0.88 | 0.1 | 0.02 |
| Low | Mod | Devonian | 0.88 | 0.1 | 0.02 |
| Low | Mod | Mississippian | 0.88 | 0.1 | 0.02 |
| Low | Mod | Pennsylvanian | 0.88 | 0.1 | 0.02 |
| Low | Mod | E. Permian | 0.88 | 0.1 | 0.02 |
| Low | Mod | M, L Permian | 0.88 | 0.1 | 0.02 |
| Low | Mod | Triassic | 0.88 | 0.1 | 0.02 |
| Low | Mod | Jurassic | 0.87 | 0.1 | 0.02 |
| Low | Mod | E. Cretaceous | 0.87 | 0.1 | 0.02 |
| Low | Mod | L. Cretaceous | 0.85 | 0.1 | 0.05 |
| Low | Mod | Paleogene | 0.85 | 0.1 | 0.05 |
| Low | Mod | Neogene | 0.85 | 0.1 | 0.05 |
| Low | High | Cambrian | 0.83 | 0.2 | 0.01 |
| Low | High | Ordovician | 0.83 | 0.2 | 0.01 |
| Low | High | Silurian | 0.83 | 0.2 | 0.01 |
| Low | High | Devonian | 0.83 | 0.2 | 0.01 |
| Low | High | Mississippian | 0.83 | 0.2 | 0.01 |
| Low | High | Pennsylvanian | 0.83 | 0.2 | 0.01 |
| Low | High | E. Permian | 0.83 | 0.2 | 0.01 |
| Low | High | M, L Permian | 0.83 | 0.2 | 0.01 |
| Low | High | Triassic | 0.83 | 0.2 | 0.01 |
| Low | High | Jurassic | 0.81 | 0.2 | 0.02 |
| Low | High | E. Cretaceous | 0.81 | 0.2 | 0.02 |
| Low | High | L. Cretaceous | 0.80 | 0.2 | 0.05 |
| Low | High | Paleogene | 0.80 | 0.2 | 0.05 |
| Low | High | Neogene | 0.80 | 0.2 | 0.05 |
| Mod | Low | Cambrian | 0.10 | 0.9 | 0.03 |
| Mod | Low | Ordovician | 0.10 | 0.9 | 0.03 |
| Mod | Low | Silurian | 0.10 | 0.9 | 0.03 |
| Mod | Low | Devonian | 0.10 | 0.9 | 0.03 |
| Mod | Low | Mississippian | 0.10 | 0.9 | 0.03 |
| Mod | Low | Pennsylvanian | 0.10 | 0.9 | 0.03 |
| Mod | Low | E. Permian | 0.10 | 0.9 | 0.03 |
| Mod | Low | M, L Permian | 0.10 | 0.9 | 0.03 |
| Mod | Low | Triassic | 0.10 | 0.9 | 0.03 |
| Mod | Low | Jurassic | 0.05 | 0.9 | 0.06 |
| Mod | Low | E. Cretaceous | 0.05 | 0.9 | 0.06 |
| Mod | Low | L. Cretaceous | 0.03 | 0.9 | 0.07 |
| Mod | Low | Paleogene | 0.03 | 0.9 | 0.07 |
| Mod | Low | Neogene | 0.03 | 0.9 | 0.07 |
| Mod | Mod | Cambrian | 0.05 | 0.9 | 0.02 |
| Mod | Mod | Ordovician | 0.05 | 0.9 | 0.02 |
| Mod | Mod | Silurian | 0.05 | 0.9 | 0.02 |
| Mod | Mod | Devonian | 0.05 | 0.9 | 0.02 |
| Mod | Mod | Mississippian | 0.05 | 0.9 | 0.02 |
| Mod | Mod | Pennsylvanian | 0.05 | 0.9 | 0.02 |
| Mod | Mod | E. Permian | 0.05 | 0.9 | 0.02 |
| Mod | Mod | M, L Permian | 0.05 | 0.9 | 0.02 |
| Mod | Mod | Triassic | 0.05 | 0.9 | 0.02 |
| Mod | Mod | Jurassic | 0.04 | 0.9 | 0.02 |
| Mod | Mod | E. Cretaceous | 0.04 | 0.9 | 0.02 |
| Mod | Mod | L. Cretaceous | 0.03 | 1 | 0.02 |
| Mod | Mod | Paleogene | 0.03 | 1 | 0.02 |
| Mod | Mod | Neogene | 0.03 | 1 | 0.02 |
| Mod | High | Cambrian | 0.02 | 1 | 0.01 |
| Mod | High | Ordovician | 0.02 | 1 | 0.01 |
| Mod | High | Silurian | 0.02 | 1 | 0.01 |
| Mod | High | Devonian | 0.02 | 1 | 0.01 |
| Mod | High | Mississippian | 0.02 | 1 | 0.01 |
| Mod | High | Pennsylvanian | 0.02 | 1 | 0.01 |
| Mod | High | E. Permian | 0.02 | 1 | 0.01 |
| Mod | High | M, L Permian | 0.02 | 1 | 0.01 |
| Mod | High | Triassic | 0.02 | 1 | 0.01 |
| Mod | High | Jurassic | 0.01 | 1 | 0.01 |
| Mod | High | E. Cretaceous | 0.01 | 1 | 0.01 |
| Mod | High | L. Cretaceous | 0.005 | 1 | 0.01 |

TABLE I-29-continued

Probability Table for Node "Marine Organic Production"

| Nutrient Supply | Insolation | Geologic_Age | Low | Mod | High |
|---|---|---|---|---|---|
| Mod | High | Paleogene | 0.005 | 1 | 0.01 |
| Mod | High | Neogene | 0.005 | 1 | 0.01 |
| High | Low | Cambrian | 0.08 | 0.8 | 0.14 |
| High | Low | Ordovician | 0.08 | 0.8 | 0.14 |
| High | Low | Silurian | 0.08 | 0.8 | 0.14 |
| High | Low | Devonian | 0.08 | 0.8 | 0.14 |
| High | Low | Mississippian | 0.08 | 0.8 | 0.14 |
| High | Low | Pennsylvanian | 0.08 | 0.8 | 0.14 |
| High | Low | E. Permian | 0.08 | 0.8 | 0.14 |
| High | Low | M, L Permian | 0.08 | 0.8 | 0.14 |
| High | Low | Triassic | 0.08 | 0.8 | 0.14 |
| High | Low | Jurassic | 0.06 | 0.8 | 0.14 |
| High | Low | E. Cretaceous | 0.06 | 0.8 | 0.14 |
| High | Low | L. Cretaceous | 0.05 | 0.8 | 0.15 |
| High | Low | Paleogene | 0.05 | 0.8 | 0.15 |
| High | Low | Neogene | 0.05 | 0.8 | 0.15 |
| High | Mod | Cambrian | 0.04 | 0.2 | 0.78 |
| High | Mod | Ordovician | 0.04 | 0.2 | 0.78 |
| High | Mod | Silurian | 0.04 | 0.2 | 0.78 |
| High | Mod | Devonian | 0.04 | 0.2 | 0.78 |
| High | Mod | Mississippian | 0.04 | 0.2 | 0.78 |
| High | Mod | Pennsylvanian | 0.04 | 0.2 | 0.78 |
| High | Mod | E. Permian | 0.04 | 0.2 | 0.78 |
| High | Mod | M, L Permian | 0.04 | 0.2 | 0.78 |
| High | Mod | Triassic | 0.04 | 0.2 | 0.78 |
| High | Mod | Jurassic | 0.03 | 0.2 | 0.79 |
| High | Mod | E. Cretaceous | 0.03 | 0.2 | 0.79 |
| High | Mod | L. Cretaceous | 0.02 | 0.2 | 0.8 |
| High | Mod | Paleogene | 0.02 | 0.2 | 0.8 |
| High | Mod | Neogene | 0.02 | 0.2 | 0.8 |
| High | High | Cambrian | 0.02 | 0.2 | 0.83 |
| High | High | Ordovician | 0.02 | 0.2 | 0.83 |
| High | High | Silurian | 0.02 | 0.2 | 0.83 |
| High | High | Devonian | 0.02 | 0.2 | 0.83 |
| High | High | Mississippian | 0.02 | 0.2 | 0.83 |
| High | High | Pennsylvanian | 0.02 | 0.2 | 0.83 |
| High | High | E. Permian | 0.02 | 0.2 | 0.83 |
| High | High | M, L Permian | 0.02 | 0.2 | 0.83 |
| High | High | Triassic | 0.02 | 0.2 | 0.83 |
| High | High | Jurassic | 0.01 | 0.2 | 0.83 |
| High | High | E. Cretaceous | 0.01 | 0.2 | 0.83 |
| High | High | L. Cretaceous | 0.01 | 0.1 | 0.85 |
| High | High | Paleogene | 0.01 | 0.1 | 0.85 |
| High | High | Neogene | 0.01 | 0.1 | 0.85 |

TABLE I-30

Probability Table for Node "Organic Production"

| MarineOrganicProduction | Low | Mod | High |
|---|---|---|---|
| Low | 0.85 | 0.1 | 0.05 |
| Mod | 0.03 | 0.9 | 0.07 |
| High | 0.01 | 0.015 | 0.975 |

TABLE I-31

Probability Table for Node "Destruction Processes"

| ConsumerPopulation | OxidantSupply | Low | Mod | High |
|---|---|---|---|---|
| Low | Low | 0.95 | 0.04 | 0.01 |
| Low | Mod | 0.9 | 0.07 | 0.03 |
| Low | High | 0.2 | 0.7 | 0.1 |
| Mod | Low | 0.7 | 0.2 | 0.1 |
| Mod | Mod | 0.05 | 0.75 | 0.2 |
| Mod | High | 0.05 | 0.55 | 0.4 |
| High | Low | 0.1 | 0.2 | 0.7 |
| High | Mod | 0.05 | 0.15 | 0.8 |
| High | High | 0.01 | 0.04 | 0.95 |

TABLE I-32

Probability Table for Node "Organic Destruction"

| Linear Sed Rate | Destruction Process | Low | Mod | High |
|---|---|---|---|---|
| V_Low (<5 m/My) | Low | 0.03 | 0.12 | 0.85 |
| V_Low (<5 m/My) | Mod | 0.02 | 0.08 | 0.9 |
| V_Low (<5 m/My) | High | 0.01 | 0.04 | 0.95 |
| Low (5-10 m/My) | Low | 0.95 | 0.04 | 0.01 |
| Low (5-10 m/My) | Mod | 0.15 | 0.8 | 0.05 |
| Low (5-10 m/My) | High | 0.05 | 0.15 | 0.8 |
| Mod (11-75 m/My) | Low | 0.95 | 0.04 | 0.01 |
| Mod (11-75 m/My) | Mod | 0.6 | 0.3 | 0.1 |
| Mod (11-75 m/My) | High | 0.4 | 0.35 | 0.25 |
| High (76-150 m/My) | Low | 0.95 | 0.04 | 0.01 |
| High (76-150 m/My) | Mod | 0.75 | 0.2 | 0.05 |
| High (76-150 m/My) | High | 0.2 | 0.4 | 0.4 |
| V_High (151 m/My) | Low | 0.7 | 0.2 | 0.1 |
| V_High (151 m/My) | Mod | 0.6 | 0.3 | 0.1 |
| V_High (151 m/My) | High | 0.1 | 0.4 | 0.5 |

TABLE I-33

Probability Table for Node "Dilution of OM"

| Linear Sed Rate | VeryLow | Low | Mod | High |
|---|---|---|---|---|
| V_Low (<5m/My) | 0.99 | 0.009 | 0.0005 | 0.0005 |
| Low (5-10 m/My) | 0.009 | 0.99 | 0.0005 | 0.0005 |
| Mod (11/75 m/My) | 0.0005 | 0.009 | 0.99 | 0.0005 |
| High (76-150 m/My) | 0.0005 | 0.0005 | 0.049 | 0.95 |
| V_High (>151 m/My) | 0.0005 | 0.0005 | 0.009 | 0.99 |

TABLE I-34

Probability Table for Node "Predicted Lithology"

| Dilution of Organic Matter | Organic Production | Organic Destruction | Thin ORR | Rich ORR | ORR | ORR_Shale | Chalk_Chert_ORR |
|---|---|---|---|---|---|---|---|
| Very Low | Low | Low | 0.005 | 0.0025 | 0.0025 | 0.0025 | 0.005 |
| Very Low | Low | Mod | 0.005 | 0.0025 | 0.0025 | 0.0025 | 0.005 |
| Very Low | Low | High | 0.005 | 0.0025 | 0.0025 | 0.0025 | 0.005 |
| Very Low | Mod | Low | 0.005 | 0.0025 | 0.0025 | 0.0025 | 0.005 |
| Very Low | Mod | Mod | 0.005 | 0.0025 | 0.0025 | 0.0025 | 0.005 |
| Very Low | Mod | High | 0.005 | 0.0025 | 0.0025 | 0.0025 | 0.005 |
| Very Low | High | Low | 0.005 | 0.0025 | 0.0025 | 0.0025 | 0.005 |

TABLE I-34-continued

Probability Table for Node "Predicted Lithology"

| | | | | | | | |
|---|---|---|---|---|---|---|---|
| Very Low | High | Mod | 0.005 | 0.0025 | 0.0025 | 0.0025 | 0.005 |
| Very Low | High | High | 0.005 | 0.0025 | 0.0025 | 0.0025 | 0.005 |
| Low | Low | Low | 0.8 | 0.05 | 0.05 | 0.05 | 0.02 |
| Low | Low | Mod | 0.75 | 0.03 | 0.05 | 0.05 | 0.02 |
| Low | Low | High | 0.005 | 0.005 | 0.01 | 0.02 | 0.01 |
| Low | Mod | Low | 0.02 | 0.9 | 0.03 | 0.01 | 0.01 |
| Low | Mod | Mod | 0.02 | 0.045 | 0.9 | 0.02 | 0.0025 |
| Low | Mod | High | 0.01 | 0.01 | 0.01 | 0.03 | 0.01 |
| Low | High | Low | 0.8 | 0.03 | 0.05 | 0.05 | 0.02 |
| Low | High | Mod | 0.01 | 0.015 | 0.8 | 0.03 | 0.05 |
| Low | High | High | 0.005 | 0.005 | 0.01 | 0.01 | 0.05 |
| Mod | Low | Low | 0.01 | 0.01 | 0.01 | 0.05 | 0.01 |
| Mod | Low | Mod | 0.005 | 0.005 | 0.01 | 0.03 | 0.01 |
| Mod | Low | High | 0.0025 | 0.0025 | 0.0025 | 0.01 | 0.0025 |
| Mod | Mod | Low | 0.02 | 0.045 | 0.9 | 0.02 | 0.0025 |
| Mod | Mod | Mod | 0.005 | 0.03 | 0.05 | 0.9 | 0.0025 |
| Mod | Mod | High | 0.0025 | 0.0025 | 0.0025 | 0.01 | 0.0025 |
| Mod | High | Low | 0.0025 | 0.85 | 0.0025 | 0.0025 | 0.045 |
| Mod | High | Mod | 0.0025 | 0.0025 | 0.85 | 0.0025 | 0.045 |
| Mod | High | High | 0.0025 | 0.0025 | 0.0025 | 0.0025 | 0.035 |
| High | Low | Low | 0.01 | 0.0025 | 0.01 | 0.02 | 0.0025 |
| High | Low | Mod | 0.01 | 0.0025 | 0.01 | 0.01 | 0.0025 |
| High | Low | High | 0.01 | 0.0025 | 0.005 | 0.005 | 0.0025 |
| High | Mod | Low | 0.02 | 0.0025 | 0.01 | 0.02 | 0.0025 |
| High | Mod | Mod | 0.02 | 0.0025 | 0.01 | 0.01 | 0.0025 |
| High | Mod | High | 0.01 | 0.0025 | 0.005 | 0.005 | 0.0025 |
| High | High | Low | 0.165 | 0.005 | 0.004 | 0.0025 | 0.01 |
| High | High | Mod | 0.01 | 0.0025 | 0.0025 | 0.0025 | 0.005 |
| High | High | High | 0.005 | 0.0025 | 0.0025 | 0.0025 | 0.005 |

| Dilution of Organic Matter | Chalk_Chert | Marl_Porcelanite | Shale_Zs_Ss | Shale | Sh_Zs_Marl_Porcelanite |
|---|---|---|---|---|---|
| Very Low | 0.0025 | 0.025 | 0.1 | 0.005 | 0.85 |
| Very Low | 0.0025 | 0.025 | 0.1 | 0.005 | 0.85 |
| Very Low | 0.0025 | 0.025 | 0.1 | 0.005 | 0.85 |
| Very Low | 0.0025 | 0.025 | 0.1 | 0.005 | 0.85 |
| Very Low | 0.0025 | 0.025 | 0.1 | 0.005 | 0.85 |
| Very Low | 0.0025 | 0.025 | 0.1 | 0.005 | 0.85 |
| Very Low | 0.0025 | 0.025 | 0.1 | 0.005 | 0.85 |
| Very Low | 0.0025 | 0.025 | 0.1 | 0.005 | 0.85 |
| Very Low | 0.0025 | 0.025 | 0.1 | 0.005 | 0.85 |
| Low | 0.01 | 0.01 | 0 | 0.01 | 0 |
| Low | 0.02 | 0.02 | 0.02 | 0.04 | 0 |
| Low | 0.01 | 0.02 | 0.06 | 0.8 | 0.06 |
| Low | 0.005 | 0.005 | 0.005 | 0.01 | 0.005 |
| Low | 0.0025 | 0.003 | 0.0025 | 0.0025 | 0.0025 |
| Low | 0.01 | 0.02 | 0.05 | 0.8 | 0.05 |
| Low | 0.03 | 0.005 | 0.005 | 0.005 | 0.005 |
| Low | 0.03 | 0.05 | 0.005 | 0.005 | 0.005 |
| Low | 0.85 | 0.05 | 0.005 | 0.01 | 0.005 |
| Mod | 0.01 | 0.01 | 0.06 | 0.8 | 0.03 |
| Mod | 0.01 | 0.01 | 0.07 | 0.8 | 0.05 |
| Mod | 0.0025 | 0.003 | 0.075 | 0.85 | 0.05 |
| Mod | 0.0025 | 0.003 | 0.0025 | 0.0025 | 0.0025 |
| Mod | 0.0025 | 0.003 | 0.0025 | 0.0025 | 0.0025 |
| Mod | 0.0025 | 0.003 | 0.075 | 0.85 | 0.05 |
| Mod | 0.07 | 0.003 | 0.02 | 0.0025 | 0.0025 |
| Mod | 0.08 | 0.003 | 0.01 | 0.0025 | 0.0025 |
| Mod | 0.09 | 0.85 | 0.01 | 0.0025 | 0.0025 |
| High | 0.0025 | 0.003 | 0.85 | 0.07 | 0.03 |
| High | 0.0025 | 0.003 | 0.85 | 0.08 | 0.03 |
| High | 0.0025 | 0.003 | 0.85 | 0.09 | 0.03 |
| High | 0.0025 | 0.003 | 0.85 | 0.08 | 0.01 |
| High | 0.0025 | 0.003 | 0.85 | 0.08 | 0.02 |
| High | 0.0025 | 0.003 | 0.86 | 0.09 | 0.02 |
| High | 0.0025 | 0.001 | 0.7 | 0.03 | 0.08 |
| High | 0.0025 | 0.03 | 0.09 | 0.005 | 0.85 |
| High | 0.0025 | 0.025 | 0.1 | 0.005 | 0.85 |

TABLE I-35

Probability Table for Node "Total Organic C"

| ORR_Potential | 0 to 0.5 | 0.5 to 1.5 | 1.5 to 3 | 3 to 6 | 6 to 10 |
|---|---|---|---|---|---|
| Thin ORR | 0.0005 | 0.002 | 0.0975 | 0.6 | 0.3 |
| Rich ORR | 0.0005 | 0.002 | 0.0975 | 0.1 | 0.8 |
| ORR | 0.0005 | 0.002 | 0.1475 | 0.8 | 0.05 |
| ORR/Shale | 0.001 | 0.009 | 0.44 | 0.5 | 0.05 |
| Chalk/Chert/ORR? | 0.001 | 0.009 | 0.89 | 0.05 | 0.05 |
| Chalk/Chert | 0.21 | 0.55 | 0.2 | 0.03 | 0.01 |
| Marl/Porcelanite | 0.2 | 0.71 | 0.05 | 0.03 | 0.01 |
| Shale/Zn/Ss | 0.3 | 0.5 | 0.185 | 0.01 | 0.005 |
| Shale | 0.25 | 0.7 | 0.04 | 0.0075 | 0.0025 |
| Sh/Zs/Ss/Marl/Porcelanite | 0.5 | 0.45 | 0.04 | 0.0075 | 0.0025 |

TABLE I-36

Probability Table for Node "Hydrogen Index"

| ORR_Potential | 0 to 200 | 200 to 300 | 300 to 600 | 600 to 1000 |
|---|---|---|---|---|
| Thin ORR | 0.05 | 0.15 | 0.7 | 0.1 |
| Rich ORR | 0.01 | 0.04 | 0.8 | 0.15 |
| ORR | 0.005 | 0.05 | 0.9 | 0.045 |
| ORR/Shale | 0.08 | 0.4 | 0.5 | 0.02 |
| Chalk/Chert/ORR? | 0.19 | 0.6 | 0.2 | 0.01 |
| Chalk/Chert | 0.8 | 0.15 | 0.04 | 0.01 |
| Marl/Porcelanite | 0.9 | 0.07 | 0.025 | 0.005 |
| Shale/Zn/Ss | 0.96 | 0.03 | 0.0075 | 0.0025 |
| Shale | 0.95 | 0.04 | 0.0075 | 0.0025 |
| Sh/Zs/Ss/Marl/Porcelanite | 0.98 | 0.01 | 0.0075 | 0.0025 |

TABLE I-37

Probability Table for Node "Source Rock RatingTOCHI"

| Hydrogen Index | Total Organic C | P Gas | F Gas | G Gas | Trans O/G | Poor Oil | Fair Oil | Good Oil | Excellent Oil |
|---|---|---|---|---|---|---|---|---|---|
| 0 to 200 | 0 to 1.5 | 1 | 0 | 0 | 0 | 0 | 0 | 0 | 0 |
| 0 to 200 | 0.5 to 1.5 | 1 | 0 | 0 | 0 | 0 | 0 | 0 | 0 |
| 0 to 200 | 1.5 to 3 | 0 | 1 | 0 | 0 | 0 | 0 | 0 | 0 |
| 0 to 200 | 3 to 6 | 0 | 0.75 | 0.25 | 0 | 0 | 0 | 0 | 0 |
| 0 to 200 | 6 to 100 | 0 | 0 | 1 | 0 | 0 | 0 | 0 | 0 |
| 200 to 300 | 0 to 1.5 | 1 | 0 | 0 | 0 | 0 | 0 | 0 | 0 |
| 200 to 300 | 0.5 to 1.5 | 0.9 | 0.1 | 0 | 0 | 0 | 0 | 0 | 0 |
| 200 to 300 | 1.5 to 3 | 0 | 0 | 0 | 1 | 0 | 0 | 0 | 0 |
| 200 to 300 | 3 to 6 | 0 | 0 | 0 | 1 | 0 | 0 | 0 | 0 |
| 200 to 300 | 6 to 100 | 0 | 0 | 0 | 1 | 0 | 0 | 0 | 0 |
| 300 to 600 | 0 to 1.5 | 0 | 0 | 0 | 1 | 0 | 0 | 0 | 0 |
| 300 to 600 | 0.5 to 1.5 | 0.1 | 0 | 0 | 0 | 0.8 | 0.1 | 0 | 0 |
| 300 to 600 | 1.5 to 3 | 0 | 0 | 0 | 0 | 0.05 | 0.8 | 0.15 | 0 |
| 300 to 600 | 3 to 6 | 0 | 0 | 0 | 0 | 0 | 0.15 | 0.8 | 0.05 |
| 300 to 600 | 6 to 100 | 0 | 0 | 0 | 0 | 0 | 0 | 0.1 | 0.9 |
| 600 to 1000 | 0 to 1.5 | 0 | 0 | 0 | 0.2 | 0.8 | 0 | 0 | 0 |
| 600 to 1000 | 0.5 to 1.5 | 0 | 0 | 0 | 0 | 0.05 | 0.8 | 0.15 | 0 |
| 600 to 1000 | 1.5 to 3 | 0 | 0 | 0 | 0 | 0 | 0.05 | 0.9 | 0.05 |
| 600 to 1000 | 3 to 6 | 0 | 0 | 0 | 0 | 0 | 0 | 0.1 | 0.9 |
| 600 to 1000 | 6 to 100 | 0 | 0 | 0 | 0 | 0 | 0 | 0 | 1 |

The invention claimed is:

1. A method for relating measurable or observable characteristics of hydrocarbon source rocks to estimated conditions at the time of formation of the hydrocarbon source rocks, comprising:
(a) selecting a first set of variables representing measurable or observable characteristics describing presence, quantity or quality of hydrocarbon source rocks;
(b) selecting a second set of variables representing historical quantities that influence source rock formation, comprising at least one variable representing each of the following three types of influencing factors: (i) geologic age factors; (ii) paleogeographic factors; and (iii) paleoenvironmental conditions, said second set of variables being classifiable according to whether they affect rate of production, destruction or dilution of organic matter that forms hydrocarbon source rocks;
(c) forming a network with nodes comprising both sets of variables, said network having directional links connecting causally-related nodes;
(d) selecting one or more variables from either set to be unknowns and assigning at least one data value to each of the other variables along with associated probabilities of having the respective data values, said values and probabilities being estimated from measurement, observation or inferred indirectly; and
(e) solving the network including the data and probability distributions for at least one of the one or more unknown variables using a Bayesian Network algorithm programmed on a computer and conservation of organic matter expressible as:

organic matter enrichment=production−(destruction+dilution)

and downloading or saving results of solving the network to computer memory or storage.

2. The method of claim 1, wherein the at least one variable representing geologic age factors includes at least geologic age.

3. The method of claim 1, wherein the directional links of the network must honor known causality relationships.

4. The method of claim 1, further comprising:
(f) developing a model for predicting hydrocarbon source rock occurrence, hydrocarbon source rock character, and hydrocarbon source rock distribution based on results of steps (a)-(e), and using the model to predict the one of hydrocarbon source rock occurrence, hydrocarbon source rock character, and hydrocarbon source rock distribution.

5. The method of claim 1, wherein the network nodes consist of at least one input or root node, at least one intermediate node, and at least one output or leaf node.

6. The method of claim 5, wherein the variables for which data and associated probabilities are assigned are root nodes, and the unknown variables solved for include at least one variable representing source rock quality.

7. The method of claim 6, wherein each root node is assigned a single data value or range of data values with probability of unity.

8. The method of claim 1, wherein the variables for which data and associated probabilities are assigned comprise at least one variable representing a presently measurable or observable quantity and the unknown variables solved for include at least one representing paleoenvironmental conditions.

9. The method of claim 8, further comprising assigning, to each variable for which data and associated probabilities are assigned, a single date value or range of data values with probability of unity.

10. The method of claim 1, wherein the variables for which data and associated probabilities are assigned comprise at least one variable representing a presently measurable or observable quantity and at least one variable representing a geologic age factor and at least one variable representing a paleogeographic factor, and wherein the unknown variables solved for include at least one representing paleoenvironmental conditions.

11. The method of claim 10, further comprising assigning, to each variable for which data and associated probabilities are assigned, a single data value or range of data values with probability of unity.

12. The method of claim 1, wherein solving the network including the data and probability distributions for at least one of the one or more unknown variables yields a plurality of possible values for each unknown variable and their corresponding probabilities of occurrence.

13. The method of claim 1, wherein the network including the data and probability distributions includes at least one geological contingency.

14. The method of claim 1, wherein the network including the data and probability distributions includes at least one nonlinear interdependence between nodes.

15. The method of claim 14, wherein the at least one nonlinear interdependence between nodes is evidenced by a plurality of alternative pathways connecting nodes within the network.

16. The method of claim 14, wherein the at least one nonlinear interdependence between nodes is evidenced by a nonlinear probability distribution for at least one node.

17. The method of claim 1, wherein the network including the data and probability distributions includes at least one intermediate or output node that is connected upstream to at least two other intermediate nodes.

18. The method of claim 1, wherein the paleoenvironmental conditions comprise at least one of upwelling annual average, upwelling seasonality, upwelling range; and upwelling annual.

19. A method for relating measurable or observable characteristics of an hydrocarbon system element to estimated conditions at the time of formation , of the hydrocarbon system element, comprising:
(a) selecting a first set of variables representing measurable or observable characteristics of a selected hydrocarbon system element;
(b) selecting a second set of variables representing historical quantities that influence said selected hydrocarbon system element or other geologic parameter, comprising at least one variable representing each of the following three types of influencing factors: (i) geologic age factors; (ii) paleogeographic factors; and (iii) paleoenvironmental conditions, said second set of variables being classifiable according to whether they affect rate of production, destruction or dilution of biogenic material that forms the selected hydrocarbon system element;
(c) forming a network with nodes comprising both sets of variables, said network having directional links connecting causally-related nodes;
(d) selecting one or more variables from either set to be unknowns and assigning at least one data value to each of the other variables along with associated probabilities of having the respective data values, said values and probabilities being estimated from measurement, observation or inferred indirectly; and
(e) solving the network including the data and probability distributions for at least one of the one or more unknown variables using a Bayesian Network algorithm programmed on a computer and conservation of organic matter expressible as:

organic matter enrichment=production−(destruction+dilution)

and downloading or saving results of solving the network computer memory or storage.

20. The method of claim 19, wherein the hydrocarbon system element is selected from a group consisting of hydrocarbon source rocks, hydrocarbon seal rocks, coals, and carbonate reservoir rocks.

21. A method for producing hydrocarbons from a subsurface formation, comprising:
(a) evaluating whether a formation contains hydrocarbon source rocks, wherein said evaluating is performed by steps comprising:
(i) selecting a first set of variables representing measurable or observable characteristics describing presence, quantity or quality of hydrocarbon source rocks;
(ii) selecting a second set of variables representing historical quantities that influence source rock formation, comprising at least one variable representing each of the following three types of influencing factors: (1) geologic age factors; (2) paleogeographic factors; and (3) paleoenvironmental conditions, said second set of variables being classifiable according to whether they affect rate of production, destruction or dilution of organic matter that forms hydrocarbon source rocks;
(iii) forming a network with nodes comprising both sets of variables, said network having directional links connecting causally-related nodes;
(iv) selecting one or more variables from either set to be unknowns and assigning at least one data value to each of the other variables along with associated probabilities of having the respective data values, said values and probabilities being estimated from measurement, observation or inferred indirectly; and
(v) solving the network including the data and probability distributions for at least one of the one or more unknown variables using a Bayesian Network algorithm programmed on a computer and conservation of organic matter expressible as:

organic matter enrichment=production−(destruction+dilution)

and downloading or saving the results to computer memory or storage;

(b) drilling a well into a formation based upon the results of solving the network, and producing hydrocarbons from said well.

* * * * *